(12) United States Patent
Roberts et al.

(10) Patent No.: US 9,487,348 B2
(45) Date of Patent: Nov. 8, 2016

(54) SYSTEMS FOR AND METHODS OF PROVIDING SUPPORT FOR DISPLACEABLE FROZEN CONTENTS IN BEVERAGE AND FOOD RECEPTACLES

(71) Applicant: Meltz, LLC, Ipswich, MA (US)

(72) Inventors: Matthew P. Roberts, Ipswich, MA (US); Paul Kalenian, Santa Fe, NM (US); Douglas M. Hoon, Guilford, CT (US); Karl Winkler, Bedford, MA (US)

(73) Assignee: Meltz, LLC, Ipswich, MA (US)

( * ) Notice: Subject to any disclaimer, the term of this patent is extended or adjusted under 35 U.S.C. 154(b) by 0 days.

(21) Appl. No.: 15/185,744

(22) Filed: Jun. 17, 2016

(65) Prior Publication Data

US 2016/0288990 A1    Oct. 6, 2016

Related U.S. Application Data

(63) Continuation-in-part of application No. 15/099,156, filed on Apr. 14, 2016, which is a continuation-in-part of application No. PCT/US2016/023226, filed on Mar. 18, 2016, which is a continuation-in-part of application No. 14/801,540, filed on Jul. 16, 2015, now Pat. No. 9,346,611.

(60) Provisional application No. 62/344,212, filed on Jun. 1, 2016, provisional application No. 62/275,506, filed on Jan. 6, 2016, provisional application No. 62/136,072, filed on Mar. 20, 2015.

(51) Int. Cl.
*B65D 85/804* (2006.01)
*A23F 5/24* (2006.01)

(52) U.S. Cl.
CPC .......... *B65D 85/8043* (2013.01); *A23F 5/243* (2013.01)

(58) Field of Classification Search
CPC ........................... B65D 85/8043; A23F 5/243
See application file for complete search history.

(56) References Cited

U.S. PATENT DOCUMENTS

| | | | |
|---|---|---|---|
| 2,312,046 A | 2/1943 | Warren |
| 2,332,553 A | 10/1943 | Benedict |
| 2,432,759 A | 12/1947 | Heyman |
| 2,559,032 A | 7/1951 | Tacchella |
| 3,235,390 A | 2/1966 | Vischer |
| 3,412,572 A | 11/1968 | Kesling |

(Continued)

FOREIGN PATENT DOCUMENTS

| | | |
|---|---|---|
| EP | 2468159 A1 | 6/2012 |
| WO | WO-9309684 | 5/1993 |

(Continued)

*Primary Examiner* — Erik Kashnikow
*Assistant Examiner* — Chaim Smith
(74) *Attorney, Agent, or Firm* — Wilmer Cutler Pickering Hale and Dorr LLP

(57) ABSTRACT

Apparatuses and processes for providing support for displaceable frozen contents in beverage and food receptacles are provided. A receptacle includes a sidewall extending from a first end of the receptacle to a second end of the receptacle, an end layer disposed at the first end of the receptacle, and a closure disposed at the second end of the receptacle. The sidewall, the end layer, and the closure define a sealed cavity of the receptacle. The receptacle includes a frozen content disposed in the sealed cavity of the receptacle and a movable platform disposed in the sealed cavity of the receptacle and in contact with at least a portion of the frozen content proximate to the end layer.

28 Claims, 54 Drawing Sheets

(56) References Cited

U.S. PATENT DOCUMENTS

| | | |
|---|---|---|
| 3,589,272 A | 6/1971 | Bouladon et al. |
| 3,914,956 A | 10/1975 | Knight, Jr. |
| 4,136,202 A | 1/1979 | Favre |
| 4,681,030 A | 7/1987 | Herbert |
| 4,750,645 A | 6/1988 | Wilson et al. |
| 4,811,872 A | 3/1989 | Boyd |
| 4,844,918 A | 7/1989 | Hoashi |
| 4,853,234 A | 8/1989 | Bentley et al. |
| 4,907,725 A | 3/1990 | Durham |
| 5,114,047 A | 5/1992 | Baron et al. |
| 5,323,691 A | 6/1994 | Reese et al. |
| 5,325,765 A | 7/1994 | Sylvan et al. |
| 5,335,589 A | 8/1994 | Yerves, Jr. et al. |
| 5,343,799 A | 9/1994 | Fond |
| 5,347,916 A | 9/1994 | Fond et al. |
| 5,363,745 A | 11/1994 | Lin |
| 5,398,596 A | 3/1995 | Fond |
| 5,480,189 A | 1/1996 | Davies et al. |
| 5,507,415 A | 4/1996 | Sizemore |
| 5,651,482 A | 7/1997 | Sizemore |
| 5,656,316 A | 8/1997 | Fond et al. |
| 5,669,208 A | 9/1997 | Tabaroni et al. |
| 5,770,003 A | 6/1998 | Tabaroni et al. |
| D395,821 S | 7/1998 | Tabaroni et al. |
| D397,292 S | 8/1998 | Tabaroni et al. |
| 5,789,005 A | 8/1998 | Tabaroni et al. |
| 5,997,936 A | 12/1999 | Jimenez-Laguna |
| 6,026,732 A | 2/2000 | Kollep et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| 6,440,256 B1 | 8/2002 | Gordon et al. |
| 6,444,160 B1 | 9/2002 | Bartoli |
| 6,589,577 B2 | 7/2003 | Lazaris et al. |
| 6,606,938 B2 | 8/2003 | Taylor |
| 6,607,762 B2 | 8/2003 | Lazaris et al. |
| 6,609,821 B2 | 8/2003 | Wulf et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,727,484 B2 | 4/2004 | Policappelli |
| 6,740,345 B2 | 5/2004 | Cai |
| 6,887,506 B2 | 5/2005 | Kalenian |
| 6,948,420 B2 | 9/2005 | Kirschner et al. |
| 7,004,322 B1 | 2/2006 | Bartoli |
| 7,165,488 B2 | 1/2007 | Bragg et al. |
| 7,168,560 B2 | 1/2007 | Finetti et al. |
| 7,258,061 B2 | 8/2007 | Campbell et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,419,692 B1 | 9/2008 | Kalenian |
| 7,464,636 B2 | 12/2008 | Mariller |
| 7,473,869 B2 | 1/2009 | Chun |
| 7,493,930 B2 | 2/2009 | Finetti et al. |
| 7,513,192 B2 | 4/2009 | Sullivan et al. |
| 7,523,695 B2 | 4/2009 | Streeter et al. |
| 7,640,845 B2 | 1/2010 | Woodnorth et al. |
| 7,820,948 B1 | 10/2010 | Renau |
| 7,875,304 B2 | 1/2011 | Kalenian |
| 7,959,851 B2 | 6/2011 | Finetti et al. |
| 8,087,347 B2 | 1/2012 | Halliday et al. |
| 8,151,694 B2 | 4/2012 | Jacobs et al. |
| 8,361,527 B2 | 1/2013 | Winkler et al. |
| 8,475,153 B2 | 7/2013 | Finetti et al. |
| 8,495,949 B2 | 7/2013 | Tinkler et al. |
| 8,516,948 B2 | 8/2013 | Zimmerman et al. |
| 8,524,306 B2 | 9/2013 | Robinson et al. |
| 8,534,501 B2 | 9/2013 | Nevarez et al. |
| 8,535,748 B2 | 9/2013 | Robinson et al. |
| 8,541,042 B2 | 9/2013 | Robinson et al. |
| 8,563,058 B2 | 10/2013 | Roulin et al. |
| 8,573,114 B2 | 11/2013 | Huang et al. |
| 8,609,170 B2 | 12/2013 | Tinkler et al. |
| 8,663,080 B2 | 3/2014 | Bartoli et al. |
| 8,667,892 B2 | 3/2014 | Cominelli et al. |
| 8,685,479 B2 | 4/2014 | Dogan et al. |
| 8,722,124 B2 | 5/2014 | Ozanne |
| 8,752,478 B2 | 6/2014 | Nocera |
| 8,758,844 B2 | 6/2014 | Nocera |
| 8,800,431 B2 | 8/2014 | Sullivan et al. |
| 8,808,775 B2 | 8/2014 | Novak et al. |
| 8,826,811 B2 | 9/2014 | Kim |
| 8,834,948 B2 | 9/2014 | Estabrook et al. |
| 8,863,987 B2 | 10/2014 | Jacobs et al. |
| 8,877,276 B2 | 11/2014 | Cominelli et al. |
| 8,889,203 B2 | 11/2014 | York |
| 8,916,215 B2 | 12/2014 | Yoakim et al. |
| 8,920,858 B2 | 12/2014 | Yauk et al. |
| 8,956,672 B2 | 2/2015 | Yoakim et al. |
| 8,960,078 B2 | 2/2015 | Hristov et al. |
| 8,962,048 B2 | 2/2015 | Gerbaulet et al. |
| 8,973,341 B2 | 3/2015 | Bartoli et al. |
| 9,016,196 B2 | 4/2015 | Hensel |
| 9,023,412 B2 | 5/2015 | Doleac et al. |
| 9,079,705 B2 | 7/2015 | Digiuni |
| 9,085,410 B2 | 7/2015 | Beer |
| 9,113,744 B2 | 8/2015 | Digiuni |
| 9,120,617 B2 | 9/2015 | Beer |
| 9,161,652 B2 | 10/2015 | Kamerbeek et al. |
| D742,679 S | 11/2015 | Bartoli et al. |
| 9,205,975 B2 | 12/2015 | Giovanni |
| 9,232,871 B2 | 1/2016 | Rivera |
| 9,247,430 B2 | 1/2016 | Kountouris et al. |
| 9,259,114 B2 | 2/2016 | Nevarez et al. |
| 2001/0043954 A1 | 11/2001 | Sweet |
| 2001/0052294 A1 | 12/2001 | Schmed |
| 2002/0048621 A1 | 4/2002 | Boyd et al. |
| 2002/0148356 A1 | 10/2002 | Lazaris et al. |
| 2003/0006185 A1 | 1/2003 | Hepler |
| 2003/0172813 A1 | 9/2003 | Schifferle |
| 2003/0222089 A1 | 12/2003 | Hale |
| 2004/0045265 A1 | 3/2004 | Bartoli et al. |
| 2004/0075069 A1 | 4/2004 | Bartoli et al. |
| 2004/0077475 A1 | 4/2004 | Bartoli |
| 2004/0118290 A1 | 6/2004 | Cai |
| 2004/0144800 A1 | 7/2004 | Danby et al. |
| 2004/0232595 A1 | 11/2004 | Bartoli |
| 2004/0247721 A1 | 12/2004 | Finetti et al. |
| 2004/0250686 A1 | 12/2004 | Hale |
| 2004/0256766 A1 | 12/2004 | Finetti et al. |
| 2005/0017118 A1 | 1/2005 | Finetti et al. |
| 2005/0034580 A1 | 2/2005 | Finetti et al. |
| 2005/0034817 A1 | 2/2005 | Finetti et al. |
| 2005/0039849 A1 | 2/2005 | Finetti et al. |
| 2005/0051033 A1 | 3/2005 | Lassota |
| 2005/0130820 A1 | 6/2005 | Finetti et al. |
| 2005/0138902 A1 | 6/2005 | Bartoli et al. |
| 2005/0160918 A1 | 7/2005 | Winstanley et al. |
| 2005/0160919 A1 | 7/2005 | Balkau |
| 2005/0247205 A1 | 11/2005 | Chen et al. |
| 2005/0266122 A1 | 12/2005 | Franceschi et al. |
| 2006/0000363 A1 | 1/2006 | Streeter et al. |
| 2006/0019000 A1 | 1/2006 | Zanetti |
| 2006/0083835 A1 | 4/2006 | Raghavan et al. |
| 2006/0107841 A1 | 5/2006 | Schifferle |
| 2006/0174769 A1 | 8/2006 | Favre et al. |
| 2006/0196363 A1 | 9/2006 | Rahn |
| 2006/0219098 A1 | 10/2006 | Mandralis et al. |
| 2007/0175334 A1 | 8/2007 | Halliday et al. |
| 2007/0202237 A1 | 8/2007 | Yoakim et al. |
| 2007/0251260 A1 | 11/2007 | Baxter et al. |
| 2008/0038441 A1 | 2/2008 | Kirschner |
| 2008/0089983 A1 | 4/2008 | Coste |
| 2009/0109793 A1 | 4/2009 | Xue |
| 2009/0126577 A1 | 5/2009 | Ternite |
| 2009/0127297 A1 | 5/2009 | Zirps |
| 2009/0214713 A1 | 8/2009 | Banim et al. |
| 2009/0235827 A1 | 9/2009 | Bongers et al. |

(56) References Cited

U.S. PATENT DOCUMENTS

| | | |
|---|---|---|
| 2010/0015313 A1 | 1/2010 | Harris |
| 2010/0034929 A1 | 2/2010 | Dogan et al. |
| 2010/0083843 A1 | 4/2010 | Denisart et al. |
| 2010/0107889 A1 | 5/2010 | Denisart et al. |
| 2010/0143565 A1 | 6/2010 | McGill |
| 2010/0209563 A1 | 8/2010 | Mark |
| 2010/0215808 A1 | 8/2010 | Versini |
| 2010/0288131 A1 | 11/2010 | Kilber et al. |
| 2010/0303964 A1 * | 12/2010 | Beaulieu ............ B65D 85/8043 426/77 |
| 2011/0071009 A1 | 3/2011 | Bartoli et al. |
| 2011/0094195 A1 | 4/2011 | Bartoli et al. |
| 2011/0183043 A1 | 7/2011 | Reati |
| 2011/0203740 A1 | 8/2011 | Finetti et al. |
| 2011/0274802 A1 | 11/2011 | Rivera |
| 2012/0030869 A1 | 2/2012 | Del Saz Salazar |
| 2012/0063753 A1 | 3/2012 | Cochran et al. |
| 2012/0070542 A1 | 3/2012 | Camera et al. |
| 2012/0207895 A1 | 8/2012 | Rivera |
| 2012/0207896 A1 | 8/2012 | Rivera |
| 2012/0267036 A1 | 10/2012 | Bartoli et al. |
| 2012/0276264 A1 | 11/2012 | Rivera |
| 2012/0308691 A1 | 12/2012 | Alvarez et al. |
| 2013/0043151 A1 | 2/2013 | Bartoli et al. |
| 2013/0101716 A1 | 4/2013 | Beaulieu et al. |
| 2013/0118360 A1 | 5/2013 | Dogan et al. |
| 2013/0139699 A1 | 6/2013 | Rivera |
| 2013/0156897 A1 | 6/2013 | Goldstein |
| 2013/0193616 A1 | 8/2013 | Bartoli et al. |
| 2013/0202761 A1 | 8/2013 | McKee |
| 2013/0327223 A1 | 12/2013 | Bartoli et al. |
| 2014/0026761 A1 | 1/2014 | Bartoli et al. |
| 2014/0076167 A1 | 3/2014 | Boggavarapu |
| 2014/0106033 A1 | 4/2014 | Roberts |
| 2014/0137210 A1 | 5/2014 | Kountouris et al. |
| 2014/0154387 A1 | 6/2014 | Almblad et al. |
| 2014/0199442 A1 | 7/2014 | Orsi |
| 2014/0287105 A1 | 9/2014 | Husband et al. |
| 2014/0342060 A1 | 11/2014 | Bartoli et al. |
| 2015/0001100 A1 | 1/2015 | Bartoli et al. |
| 2015/0068405 A1 | 3/2015 | Bartoli et al. |
| 2015/0072052 A1 | 3/2015 | Bartoli et al. |
| 2015/0108011 A1 | 4/2015 | Bartoli et al. |
| 2015/0128525 A1 | 5/2015 | Bartoli et al. |
| 2015/0140251 A1 | 5/2015 | Bartoli et al. |
| 2015/0151903 A1 | 6/2015 | Bartoli et al. |
| 2015/0210030 A1 | 7/2015 | Bartoli et al. |
| 2015/0217880 A1 | 8/2015 | Bartoli et al. |
| 2015/0217881 A1 | 8/2015 | Bartoli et al. |
| 2015/0232279 A1 | 8/2015 | Bartoli et al. |
| 2015/0257588 A1 | 9/2015 | Stein et al. |
| 2015/0329282 A1 | 11/2015 | Bartoli et al. |
| 2015/0344219 A1 | 12/2015 | Bartoli et al. |
| 2015/0367269 A1 | 12/2015 | Bartoli et al. |
| 2016/0000135 A1 | 1/2016 | Evans et al. |
| 2016/0001903 A1 | 1/2016 | Bartoli et al. |

FOREIGN PATENT DOCUMENTS

| | | |
|---|---|---|
| WO | WO-02098759 | 12/2002 |
| WO | WO-2005092160 | 10/2005 |
| WO | WO-2006017893 | 2/2006 |
| WO | WO-2006077259 | 7/2006 |
| WO | WO-2013124811 | 8/2013 |
| WO | WO-2015001340 | 1/2015 |

* cited by examiner

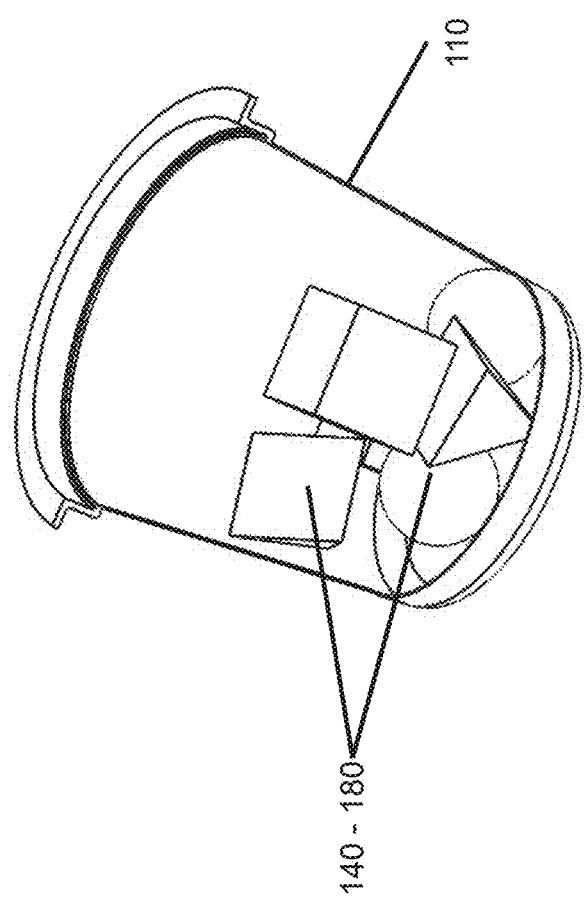

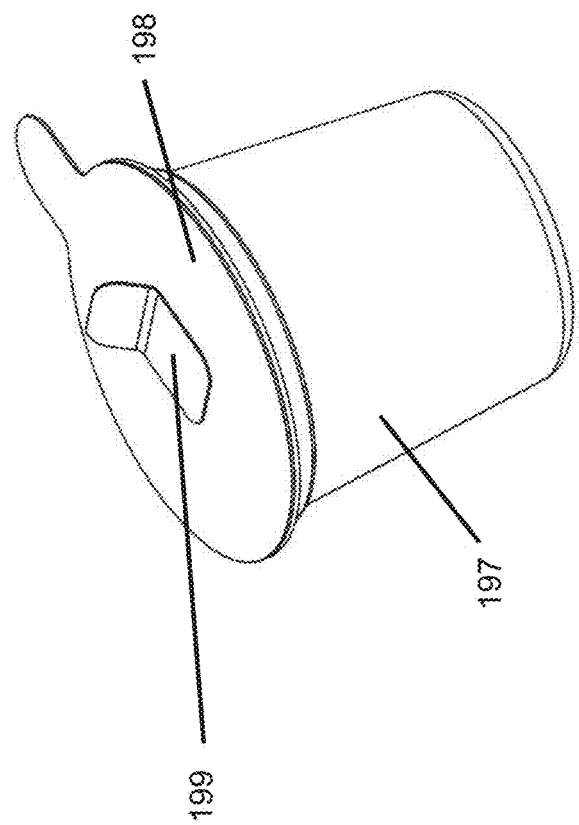

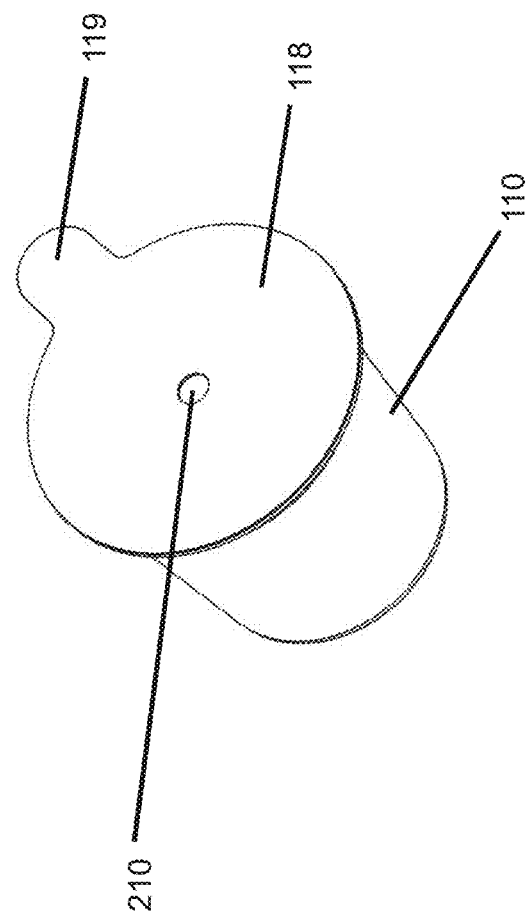

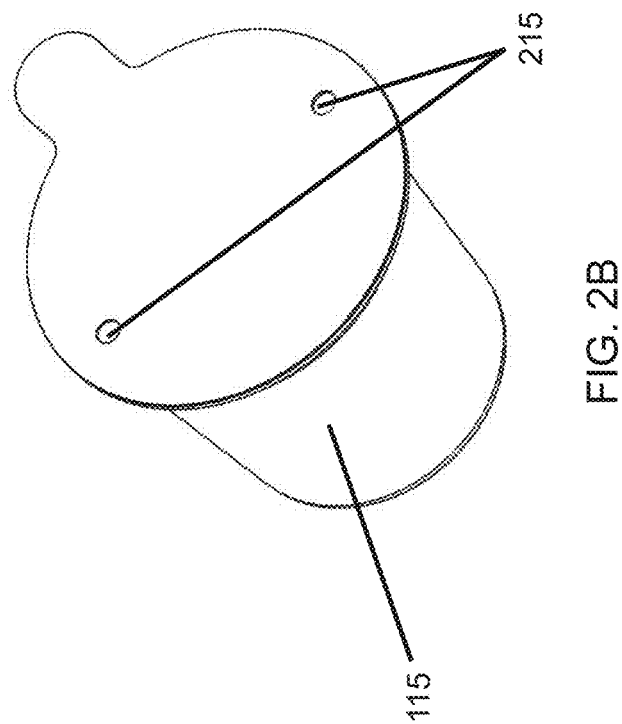

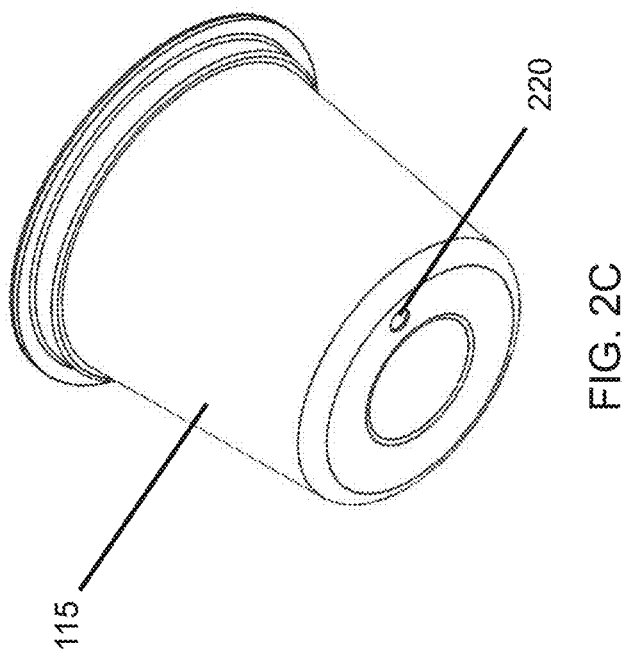

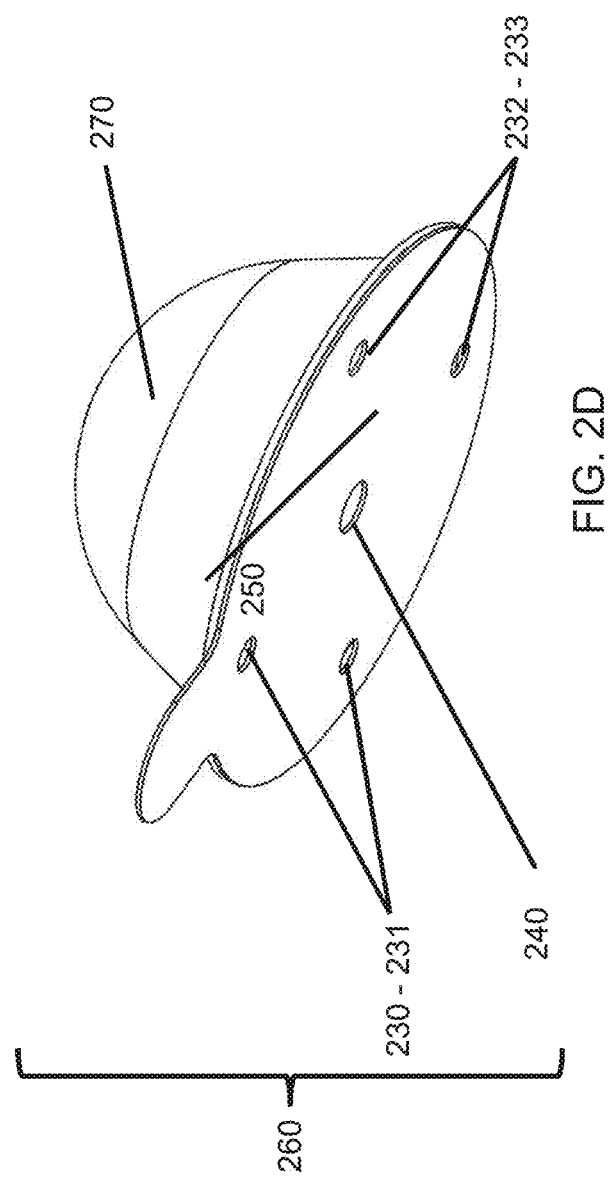

| A frozen beverage concentrate is enclosed in a perforable receptacle. 310 | 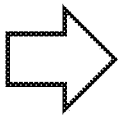 | The receptacle is perforated and accommodated by a machine-based system and liquefied via a melting component. 320 | 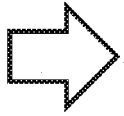 | The melted beverage liquid is dispensed via a machine-based system and diluted with an additional liquid dispensed via said system. 330 |  | A secondary container receives a beverage of 340 preferable strength from the machine-based system. |

FIG. 3

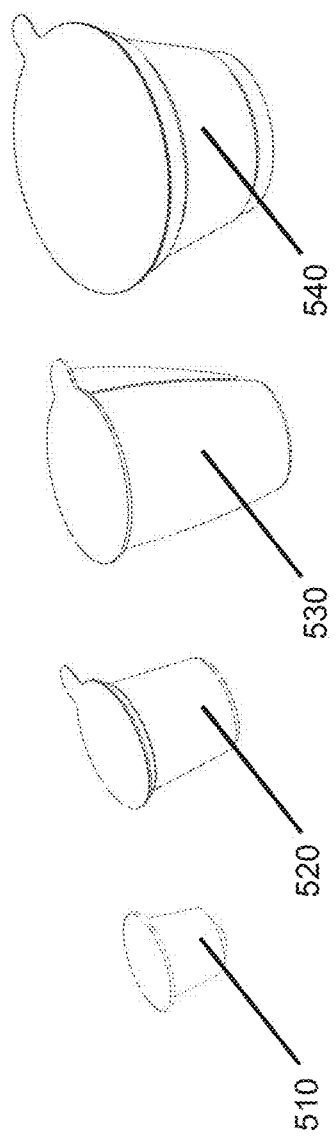

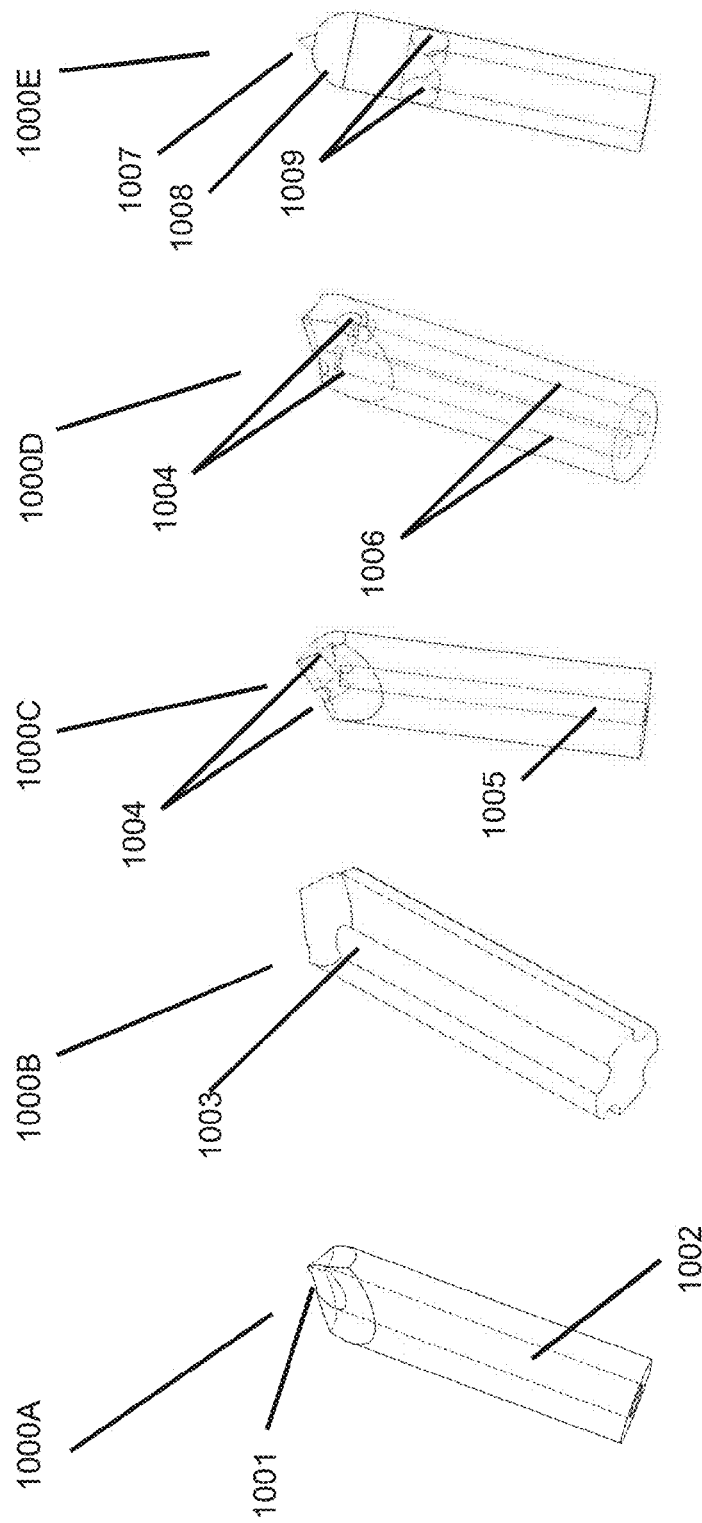

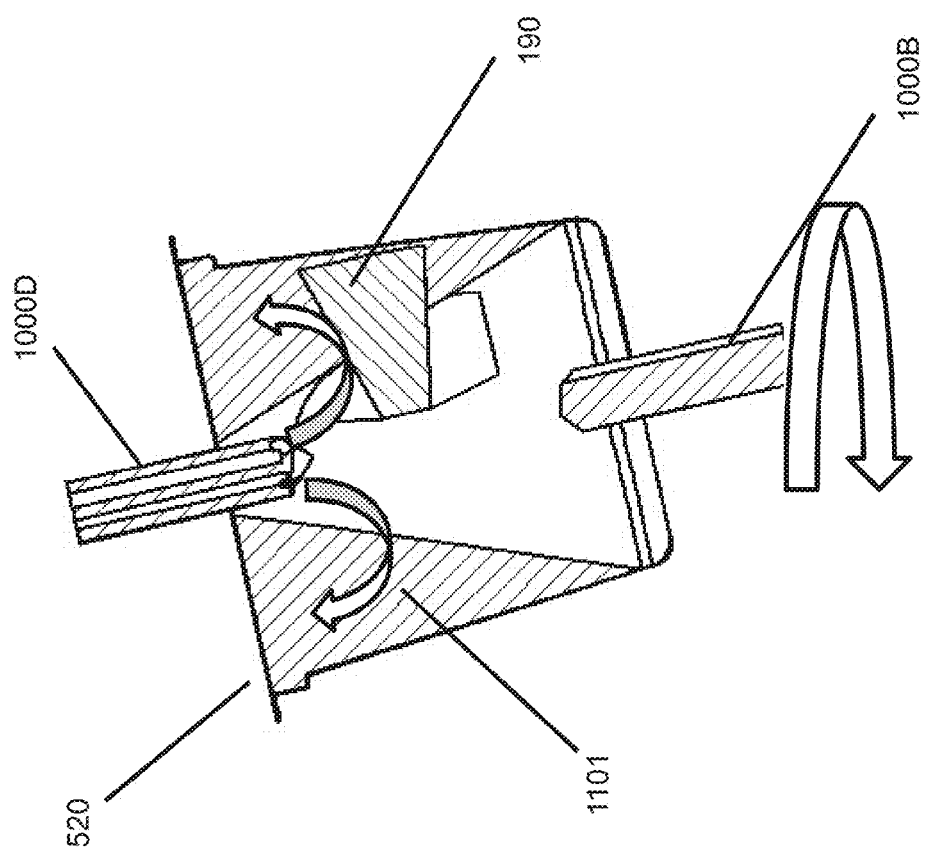

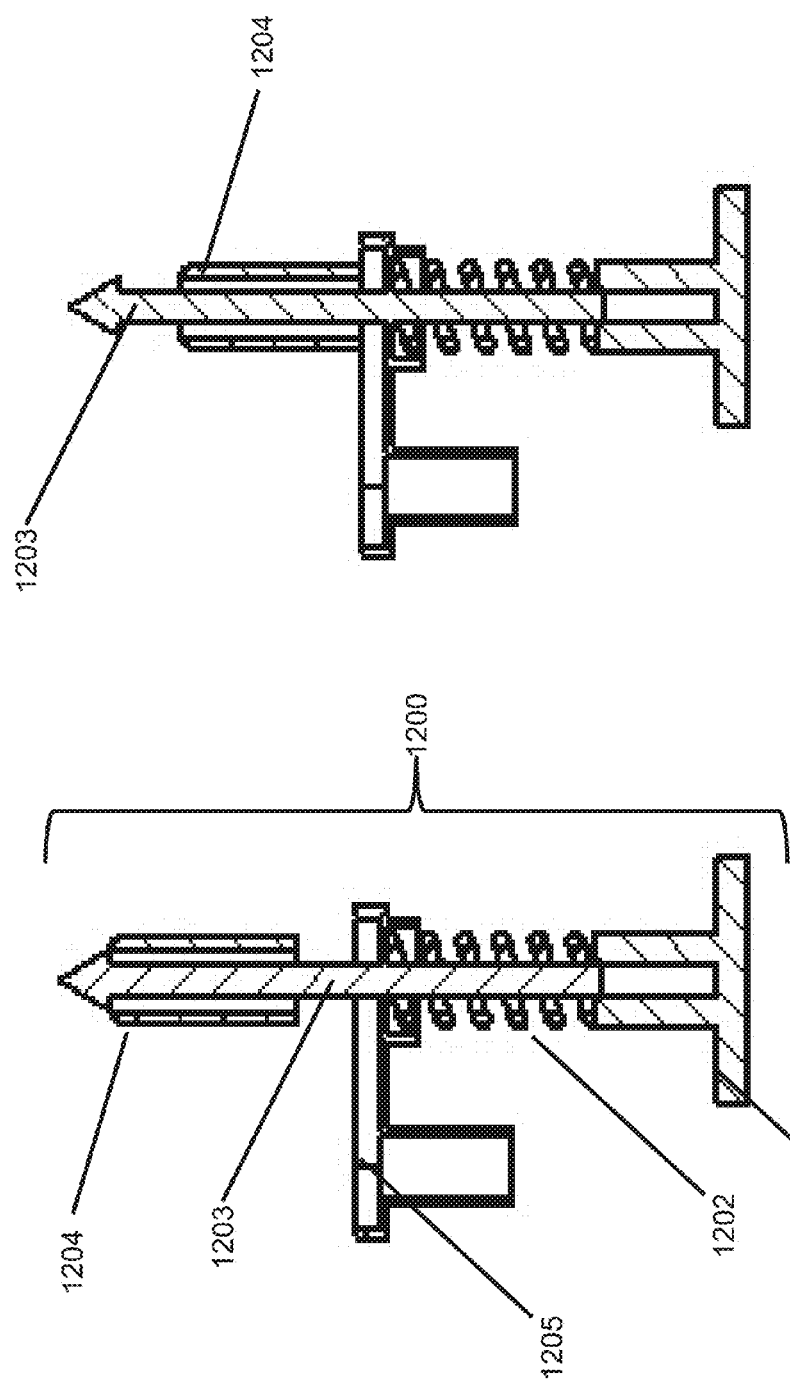

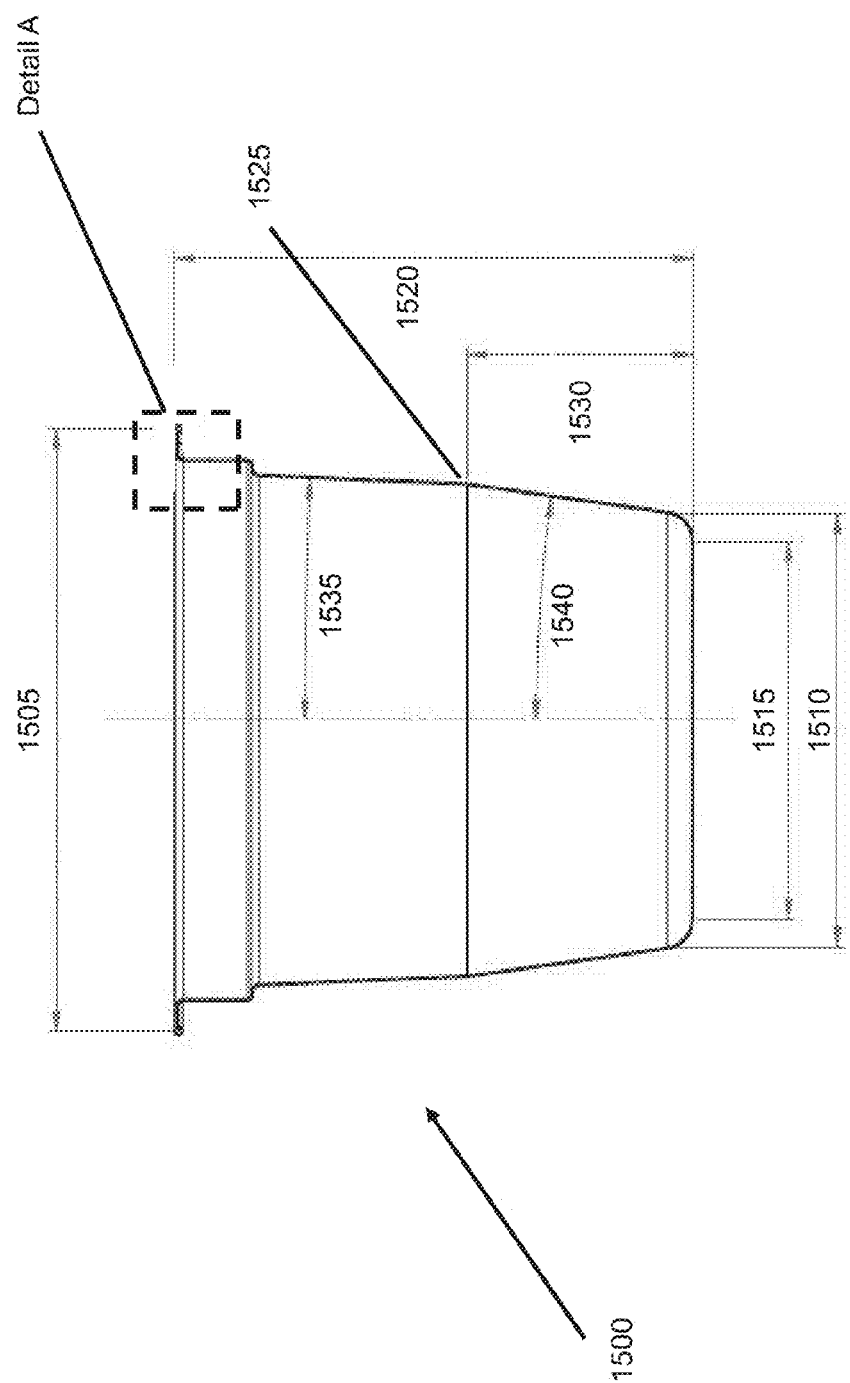

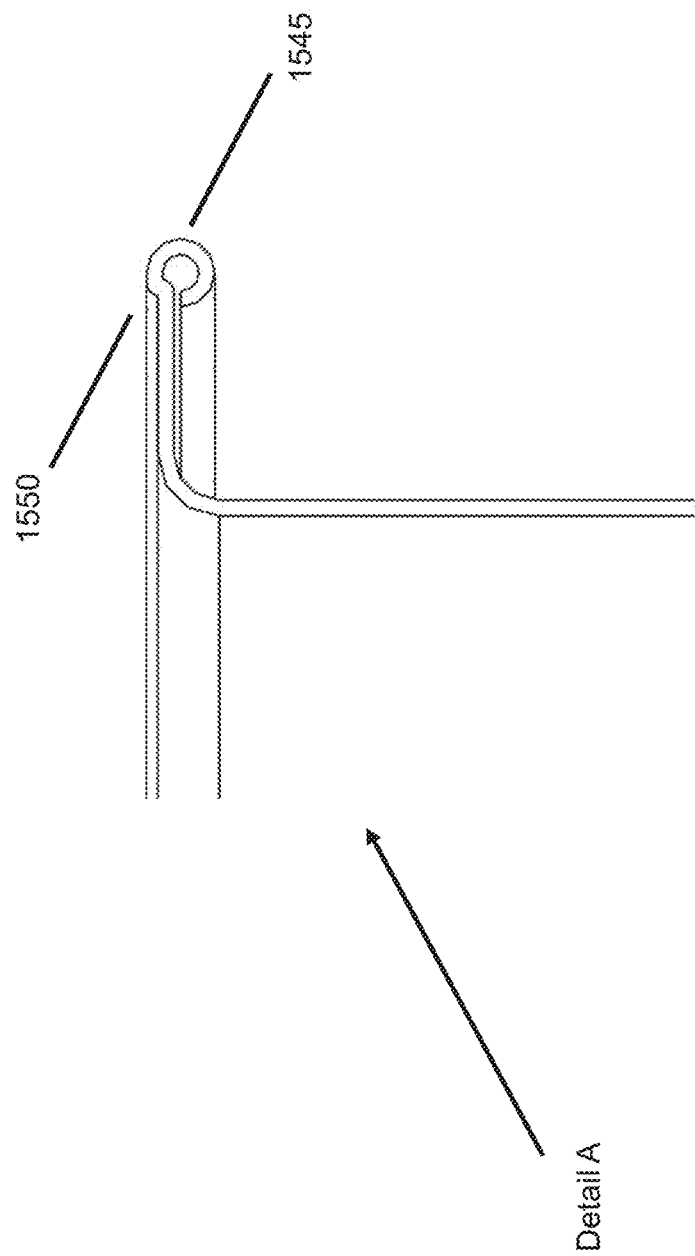

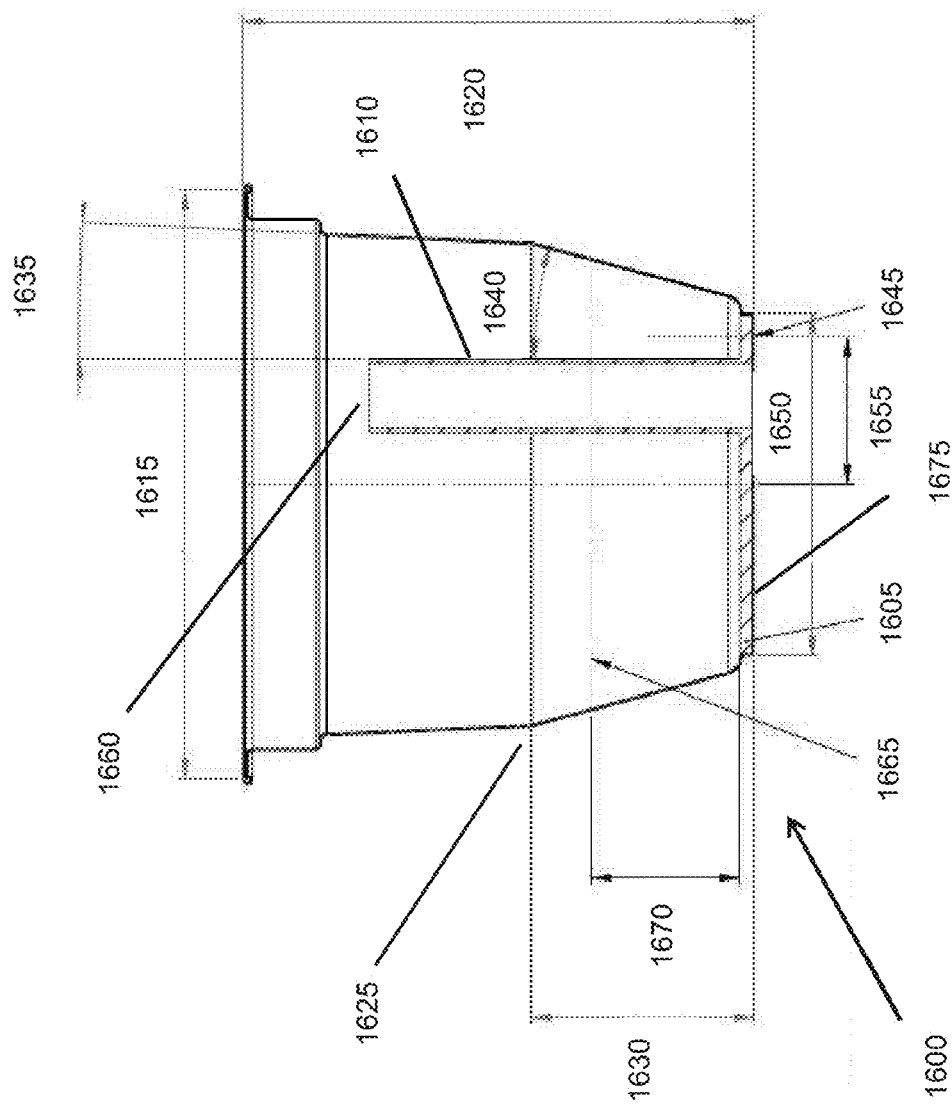

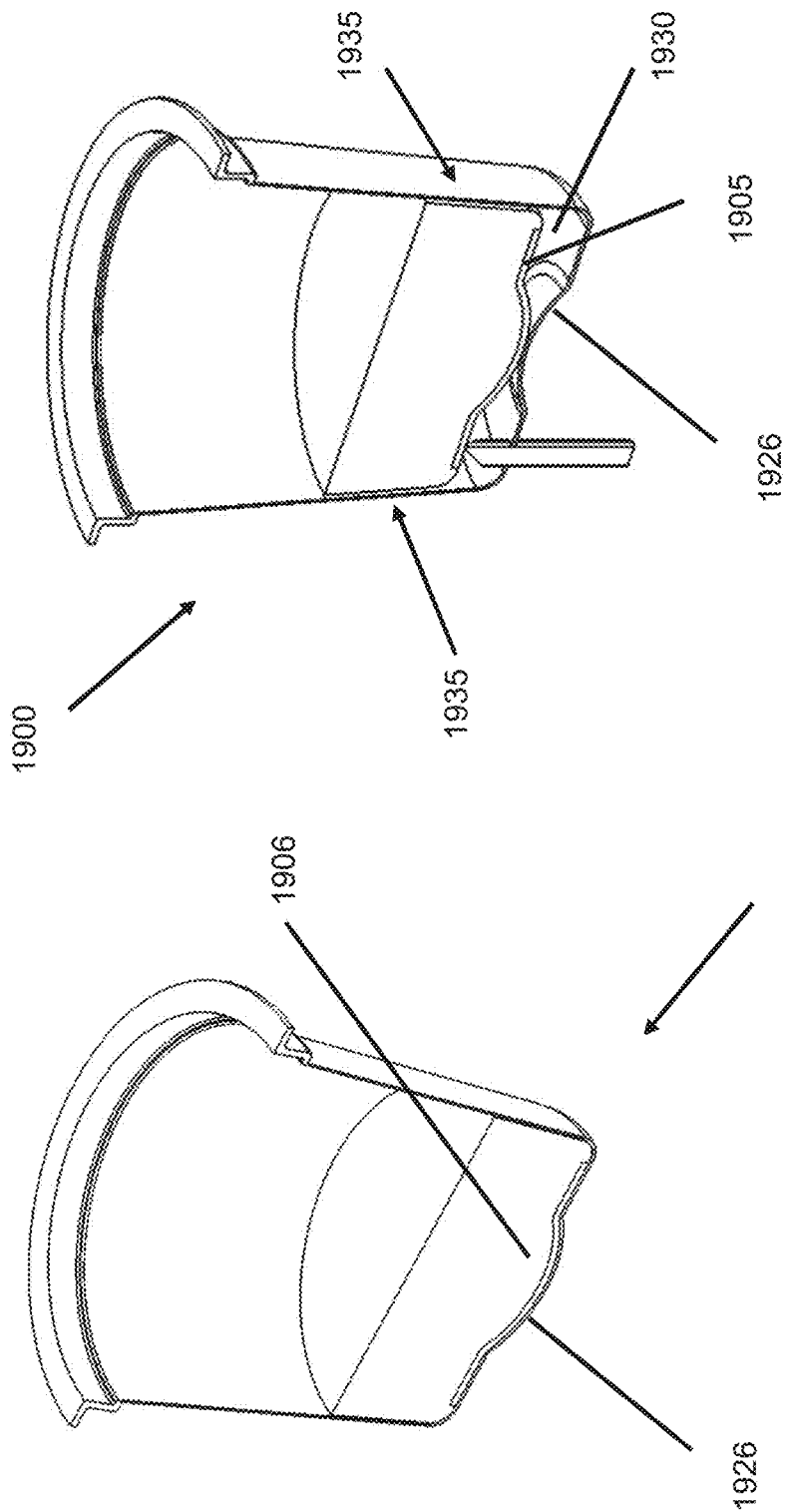

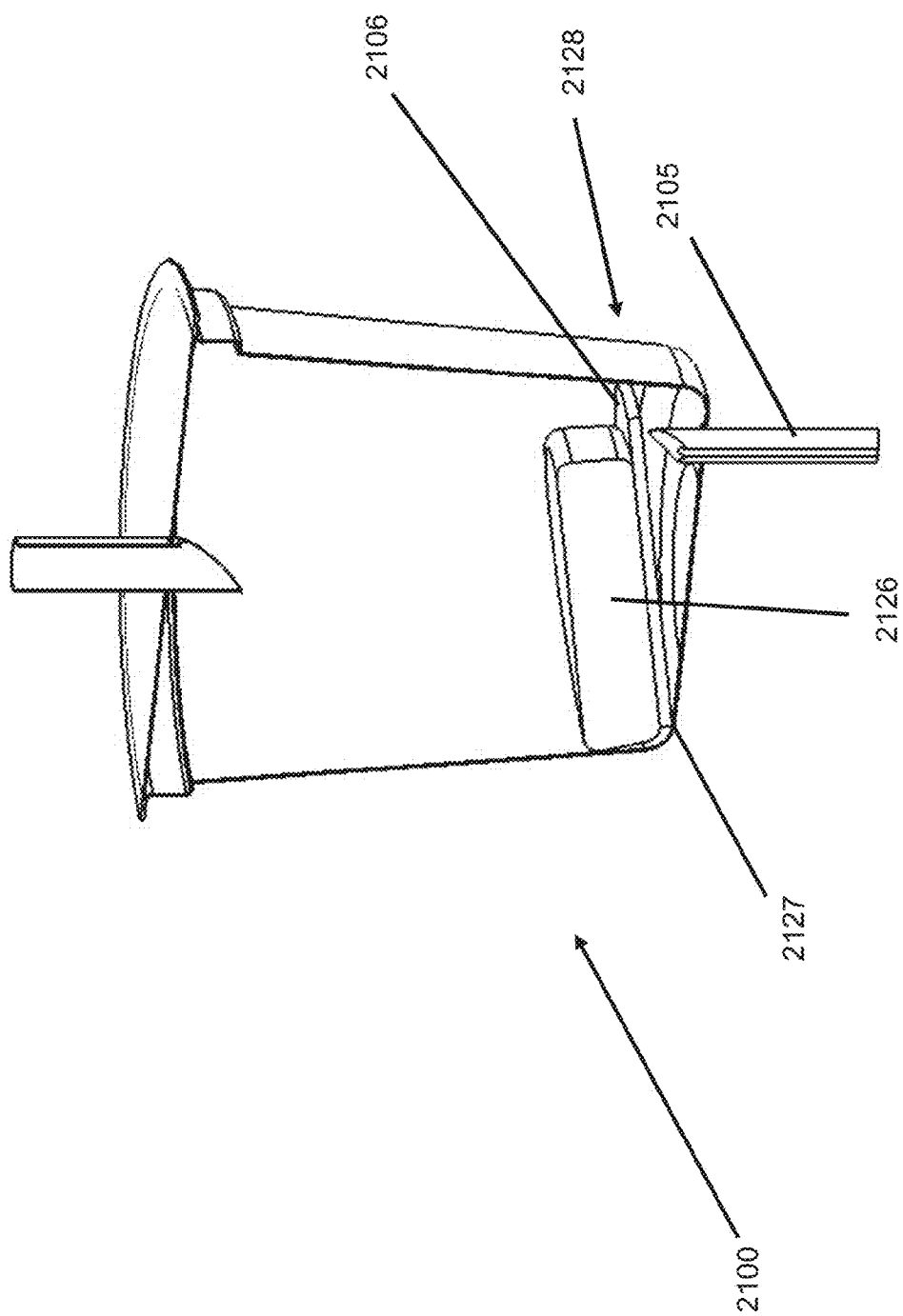

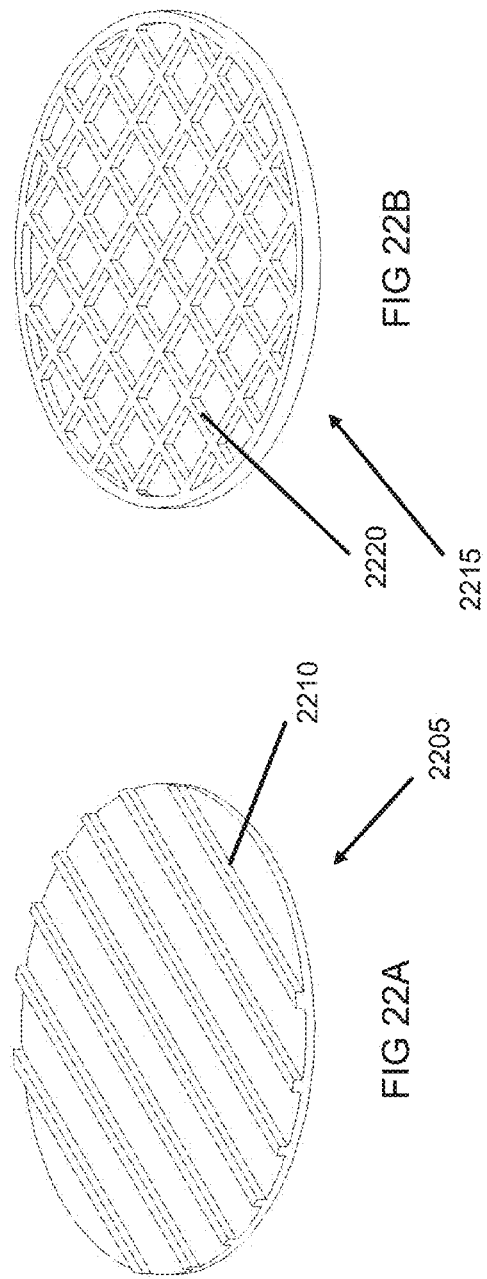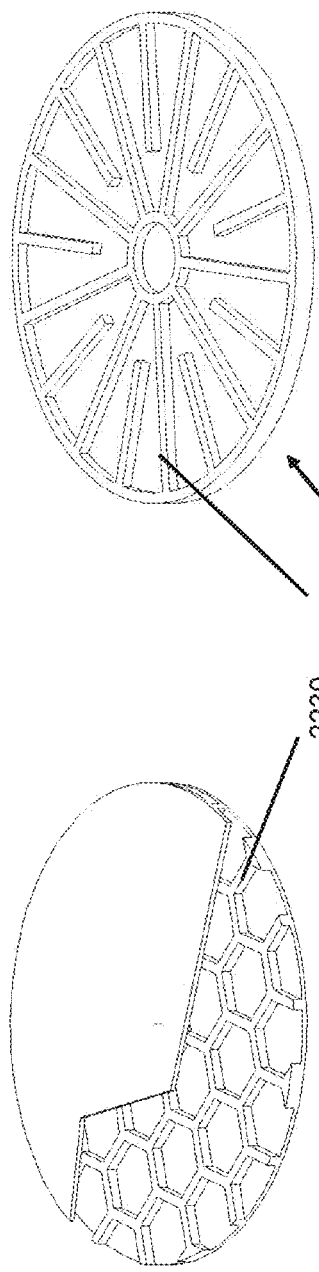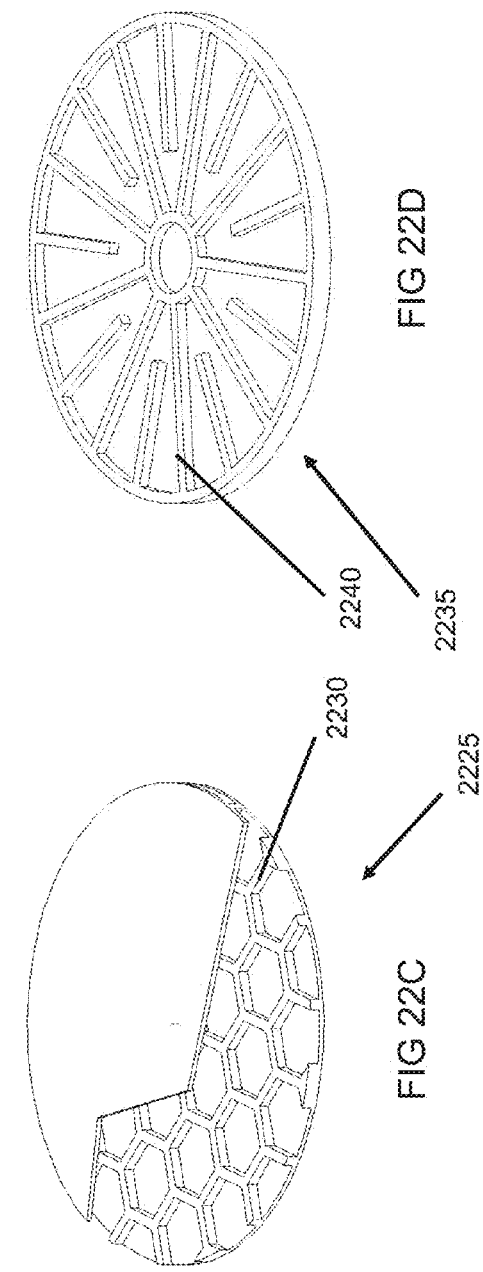

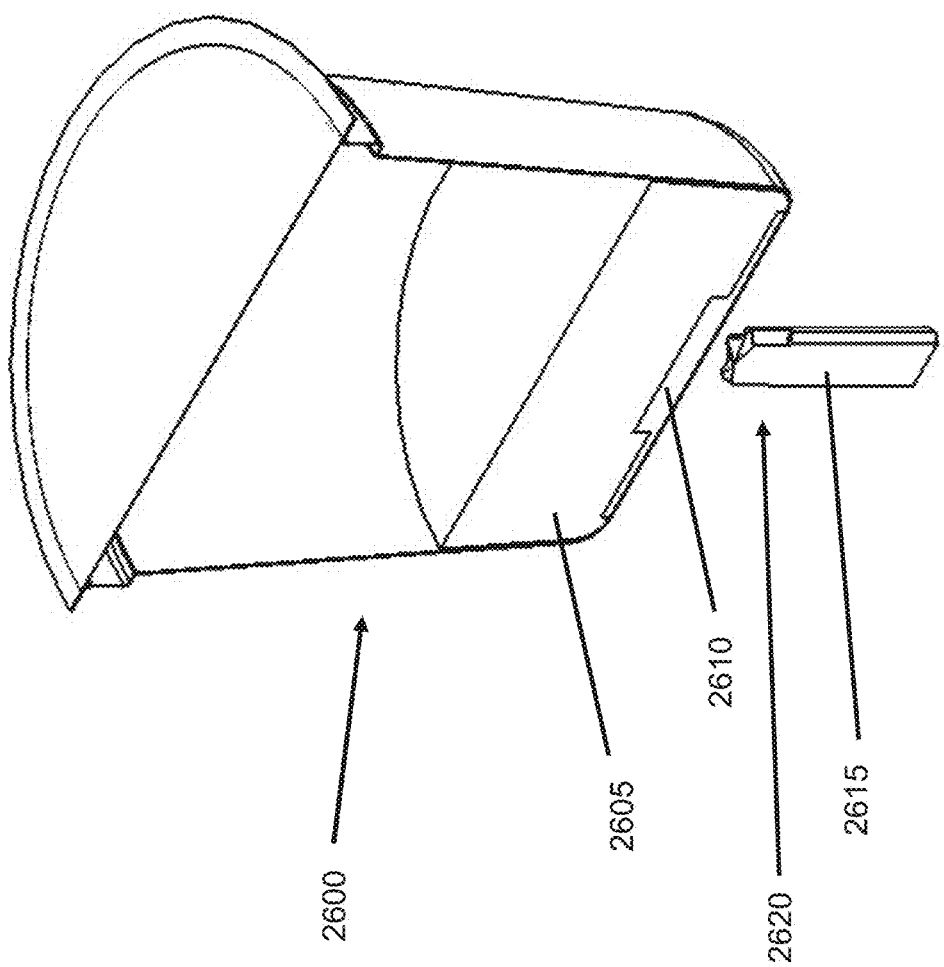

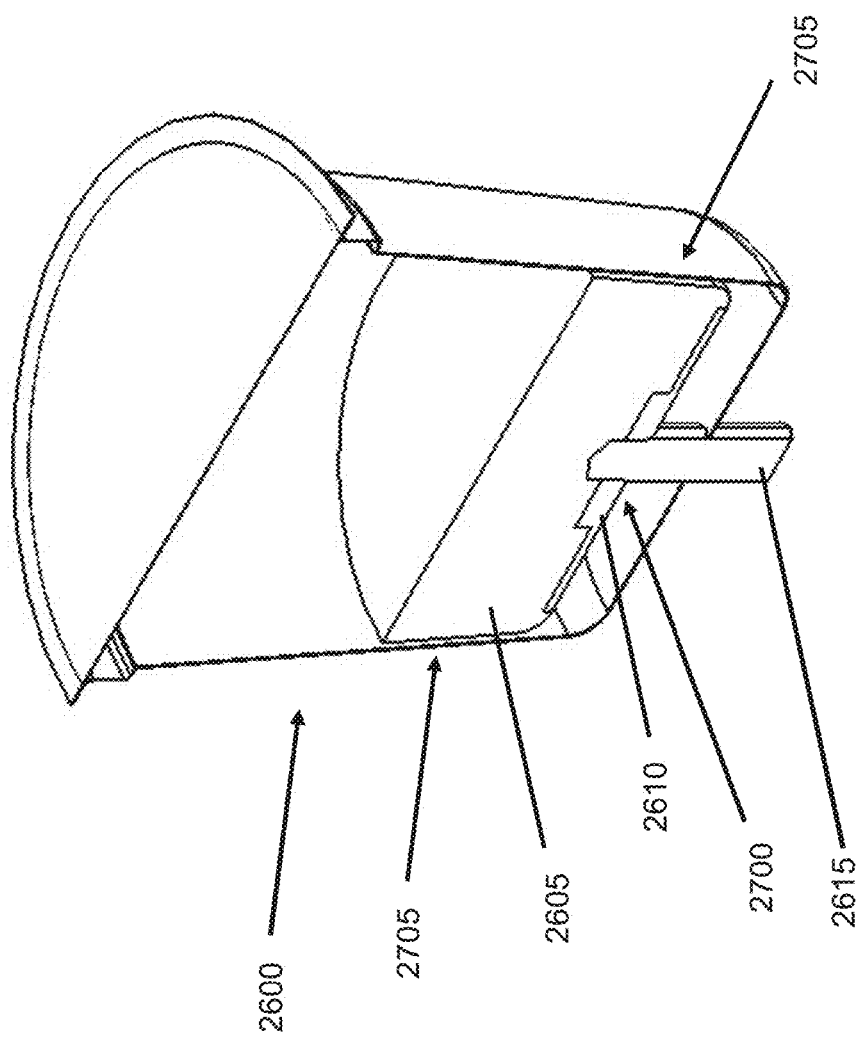

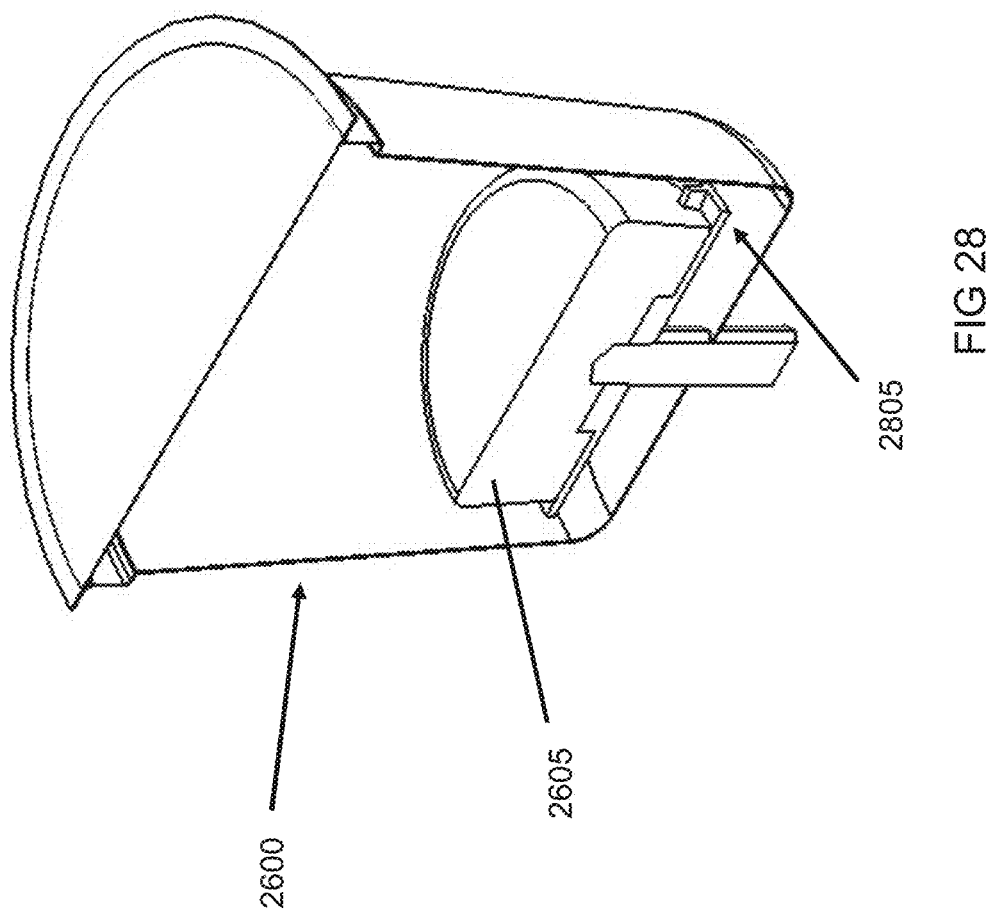

SYSTEMS FOR AND METHODS OF PROVIDING SUPPORT FOR DISPLACEABLE FROZEN CONTENTS IN BEVERAGE AND FOOD RECEPTACLES

RELATED APPLICATIONS

This application claims priority under 35 U.S.C. §119(e) to U.S. Provisional Patent Application No. 62/344,212, entitled "Systems for and Methods of Providing Support for Displaceable Frozen Contents in Beverage and Food Receptacles", filed Jun. 1, 2016, and this application is a continuation-in-part of and claims priority under 35 U.S.C. §120 to U.S. patent application Ser. No. 15/099,156, entitled "Method of and System for Creating a Consumable Liquid Food or Beverage Product from Frozen Liquid Contents", filed on Apr. 14, 2016, which is a continuation-in-part of and claims priority under 35 U.S.C. §120 to International Patent Application No. PCT/US16/23226, entitled "Method of and System for Creating a Consumable Liquid Food or Beverage Product from Frozen Liquid Contents", filed on Mar. 18, 2016, which relates to and claims priority under 35 U.S.C. §119(e) to U.S. Provisional Patent Application No. 62/136,072, entitled "Packaging an Iced Concentrate," filed on Mar. 20, 2015, and U.S. Provisional Patent Application No. 62/275,506, entitled "Method of and System for Creating a Consumable Liquid Food or Beverage Product from Frozen Liquid Contents," filed on Jan. 6, 2016, and said PCT/US16/23226 is a continuation-in-part of and claims priority under 35 U.S.C. §120 to U.S. patent application Ser. No. 14/801,540, entitled "Apparatus and Processes for Creating a Consumable Liquid Food or Beverage Product from Frozen Contents," filed on Jul. 16, 2015, now U.S. Pat. No. 9,346,611, which relates to and claims priority under 35 U.S.C. §119(e) to U.S. Provisional Patent Application No. 62/136,072, filed Mar. 20, 2015, all of which are incorporated by reference herein in their entirety.

TECHNICAL FIELD

The technical field relates generally to systems for and methods of providing support for displaceable frozen contents in beverage and food receptacles, and in particular platforms that support frozen contents within a receptacle to assist in displacing the frozen contents from a first position within the receptacle to a second position within the receptacle.

BACKGROUND

Current or prior machine-based coffee brewing systems and coffee packed in filtered pods allow consumers to produce purportedly fresh-brewed beverages at the touch of a button while eliminating the need for additional process steps such as measuring, handling of filters, and/or messy disposal of used grounds. These machine-based systems typically utilize a receptacle that contains dry solids or powders such as dry coffee grinds, tea leaves, or cocoa powder, as well as a filtration media to prevent migration of unwanted solids into the user's cup or glass, and some type of cover or lid. The receptacle itself is often thin-walled so it can be perforated with needles or other mechanisms so that a solvent (e.g., hot water) can be injected into the receptacle. In practice, the receptacle is inserted into the machine and, upon closing the machine's cover, the receptacle is pierced to produce an inlet and an outlet. Thereafter, the hot solvent is delivered to the inlet, added into the receptacle, and a brewed beverage exits via a filter to the outlet.

Such systems often suffer from problems with being able to maintain freshness of the contents in the receptacle, brew strength from a finite sized package, and/or the inability to conveniently recycle the large number of filtered receptacles with spent grinds/leaves created each year.

The issue of maintaining freshness can occur, for example, when the dry solid is a finely ground coffee. This issue is largely the result of unwanted oxidation of critical flavor and aroma compounds in the coffee grounds, a problem that can be exacerbated by the fact that ground coffee presents a very large surface area to its ambient environment. While some manufactures may attempt to address this problem using MAP (Modified Atmosphere Packaging) methods (e.g., the introduction of a non-oxidizing gas in place of ambient air), their efforts are often largely unsuccessful for a number of reasons. For example, freshly roasted whole bean or ground coffee profusely outgases $CO_2$, thus requiring a pre-packaging step to allow the grounds to "degas" prior to packaging so the receptacle does not swell or puff outwardly due to pressure created from within the receptacle, which in turn would cause the receptacle to take on the appearance of spoiled product. In addition, this $CO_2$ outgassing carries with it and depletes a rich mixture of fresh coffee aromas from the ground coffee. Further, coffee beans and grinds are approximately 44% oxygen by composition, which may impact the flavor and fragrance of the coffee internally after the roasting process.

Another downfall of these receptacles that contain dry solids or powders is often their inability to create a wide range of beverage potency and serving sizes from a given packaging size. A pod that holds ten grams of ground coffee can only produce about two grams of actual brewed coffee compounds if brewed according to SCAA (Specialty Coffee Association of America) brewing guidelines. In turn, when two grams of brewed coffee compounds are diluted in a ten ounce cup of coffee, a concentration of about a 0.75 total dissolved solids (TDS) results. TDS (in % throughout) is a measure of the combined content of inorganic and organic substances contained in a liquid in molecular, ionized or micro-granular colloidal solids suspended form. Therefore, such a cup of coffee is often considered a very weak cup of coffee for many consumers. Conversely, some brewers can over-extract the same ten grams of coffee grounds to create a higher TDS; however, the additional dissolved solids that are extracted are often harsh on the palate and can ruin the flavor integrity of the coffee. Soluble/instant coffee is often added to reduce this drawback. In addition, most brewers designed for extracting cannot deliver pressure and temperature to remove all desired compounds from the ground product, therefore often good coffee is wasted, up to 25%, and an often weaker or smaller cup of coffee is produced than desired.

Turning to the matter of recycling, the presence of leftover coffee grounds, tea leaves and/or other residual waste after brewing (e.g., spent filters left within the receptacles) typically makes receptacles unsuitable for recycling. Consumers could remove the cover from the spent receptacles and rinse out the residual material, but this is time consuming, messy, a waste of water, and/or a waste of valuable soil nutrients that could otherwise be recycled back into the farming ecosystem. Therefore, most consumers will not bother to recycle in return for such an insignificant apparent ecological gain. Recycling can also be impacted by the type of thermoplastic material used in some receptacles. For example, in an effort to minimize loss of freshness as discussed above, some manufacturers have chosen to use materials that have exceptional vapor barrier properties, for example, a laminated film material with an inner layer of ethylene vinyl alcohol (EVOH) copolymer. The combination of different thermoplastic materials in such a laminated film, which could be some combination of EVOH, polypropylene, polyethylene, PVC and/or others material is unsuited to recycling.

Despite the disadvantages above, there still exist a number of different machine-based systems on the market today that create beverages from single-serving capsuled products. These have become extremely popular with consumers, primarily for the convenience they offer in making an acceptable (not necessarily excellent) cup of coffee, often causing the consumer to swap café quality brewed coffee for the convenience of a single serving home-brewed cup.

In addition to single serving capsule products, there exist frozen products such as coffee extracts and juice concentrates that are currently packaged in large containers and cans (e.g., 2 liters) for creating multiple servings of beverages from a single container. However, it is usually inconvenient and time-consuming to prepare a beverage from these frozen extracts or concentrates. Some coffee products, for example, must be slowly melted prior to use, typically over a period of several hours or days. The end product is required to be stored in a refrigerator thereafter to preserve its product safety when less than all servings are consumed. Further, for beverages that are enjoyed hot, like coffee and tea, the melted extract must then be heated appropriately. Many of these products are not shelf stable, for example coffee that has a high percentage of solids in the grounds, as these solids are the result of hydrolyzed wood, which are subject to decomposition and spoilage. Accordingly, the flavor and quality in these large batch frozen products can deteriorate in a matter of hours even at refrigeration temperatures. In addition, the method of forming the final consumable beverage is not often not automated and is therefore subject to over- or under-dilution, leading to an inconsistent user experience.

SUMMARY

The techniques and systems described herein include integrated systems that enable a wider variety of food and beverage products to be dispensed than known portion control brewing systems currently available. In certain embodiments, the systems include a multi-function and multi-use dispenser that works in cooperation with multi-content frozen receptacles. The receptacles contain previously-prepared concentrates and extracts in a frozen state in a sealed MAP gas environment. Because the food or beverages contained therein are maintained in a preserved state, they exist in an FDA food-safe format. In addition, the frozen liquid contents are preserved at peak levels of flavor and fragrance without the use of conventional preservatives or additives.

Meanwhile, the dispenser may prepare these foods and beverages in both hot or cold format by utilizing specific receptacles containing the frozen liquid content. The integrated system that includes the dispenser and receptacles can safely provide, e.g., coffee, tea, cocoa, sodas, soups, nutraceuticals, vitamin waters, medicines, energy supplements, lanes, cappuccinos, chai lattes, to name a few. While dispensing the product, the receptacles are rinsed substantially clean, free of grounds, leaves, filters powders or crystals by the dispensing system, thereby qualifying them for recycling.

As mentioned above, the techniques and systems described herein improve the overall quality and taste of coffees, teas, and other beverages conveniently available to consumers in their homes, and, in certain embodiments, without the need to brew the same. Embodiments of the packaging systems and dispensers described herein effectively and efficiently handle frozen liquid contents. For example, the implementations set forth herein address how to dislodge the frozen liquid contents from the inside surfaces of the receptacle or penetrate the same, how to create a flow path to the exit point in the receptacle, how to efficiently melt the frozen liquid contents without creating unacceptable internal pressures or sprays, how to achieve a final beverage at a desirable temperature and concentration, and/or how to best prepare the receptacle for recycling.

The disclosed subject matter includes various embodiments of receptacles configured for insertion into a dispenser. Each receptacle includes a frozen liquid content with headspace. The receptacle includes an opening and a cavity for receiving and storing the frozen liquid content, wherein the receptacle is perforable. The receptacle includes a closure formed over the opening of the receptacle for sealing the frozen liquid content within the cavity of the receptacle, wherein the receptacle is configured for insertion into a dispensing apparatus or system that is configured to create a consumable liquid beverage from the frozen liquid content within the receptacle, such that the frozen liquid content is extracted through a perforation created in the receptacle by the apparatus.

In some examples, the receptacle includes a gas impermeable material configured to preserve freshness and aroma of the frozen liquid content. The receptacle and the closure may be comprised of a recyclable material such that the receptacle and the closure can be recycled once the consumable liquid food or beverage is created. The receptacle may be comprised of an edible material such that the receptacle itself may be dissolved and consumed after use. The frozen liquid content contained within the receptacle can be selected from, e.g., a frozen coffee extract, a frozen tea extract, a frozen lemonade concentrate, a frozen vegetable concentrate, a frozen animal broth or stock, a frozen liquid dairy product, a frozen alcohol product, a frozen syrup, and a frozen fruit concentrate, or any combination thereof. Because the content is a liquid that is frozen, and therefore a frozen liquid content, the content needs only to melt to become a consumable beverage or food product in liquid form. It does not need to be extracted and produce a waste byproduct, as there is no need for a filter within the receptacle.

In some examples, the receptacle is configured such that the receptacle can be perforated before the receptacle is inserted into the apparatus, can be perforated after the receptacle is inserted into the apparatus, or both. The receptacle may include an unfilled region, e.g., headspace between the frozen liquid content and the closure, wherein the region is configured to include an inert or reduced reactivity gas in place of atmospheric air in the receptacle. This region also allows movement of the frozen liquid contents within the receptacle to allow for creation of a flow path for diluting/melting fluids around the frozen liquid contents during product preparation.

In some examples, the frozen liquid content and the receptacle are provided in a controlled portion arrangement. The controlled portion arrangement can include a single-serving sized format. The controlled portion arrangement can include a batch-serving sized format for producing multiple servings from a single or a plurality of injections of liquid.

In some examples, the packaging, receptacle, container or the like is configured to receive a heated liquid or other format of heat through a perforation to expedite liquefaction and dilution of the frozen liquid content. The packaging can be configured to receive heat externally applied to expedite melting of the frozen liquid contents within the receptacle prior to or simultaneously with the introduction of melting/diluting fluids.

In some examples, the receptacle can include an end portion having a bistable or a one-time deformable domed shape, for facilitating perforation of the receptacle without interference with the frozen liquid content due to displacement into the headspace. The frozen liquid content can also be formed to include a through-hole in the body thereof such that a liquid injected into the container can flow through the through-hole to an exit point from the receptacle.

The disclosed subject matter includes a process for producing a liquid food or beverage from a package containing frozen liquid contents. The process includes providing frozen liquid contents in a sealed container, wherein the container is configured to store the frozen liquid contents. In this embodiment, the process always includes melting the frozen liquid contents in the sealed container to generate a melted liquid. The process includes perforating the sealed container at a first location to permit dispensing of the melted liquid from the container to create a consumable liquid food or beverage.

In some examples, melting the frozen liquid contents includes perforating the sealed container at a second location to permit injection of a heated liquid or heat in another format into the container to melt and dilute the frozen liquid contents in the sealed container. Melting the frozen liquid contents can include applying heat or electric frequency energy externally to the sealed container or within the sealed container via an injected liquid, gas, or steam to melt the frozen liquid contents into a consumable liquid form.

The disclosed subject matter includes a packaging system for using a packaged frozen liquid contents to produce a liquid food or beverage directly therefrom. The system includes frozen liquid contents and a receptacle defining a cavity for receiving and storing the frozen liquid contents. The system also includes a lid for forming a sealed closure with the receptacle, the lid being perforable for permitting injection of a liquid, gas, or steam into the cavity to melt and dilute the frozen liquid content therein, wherein the receptacle is perforable for permitting the melted and/or diluted frozen liquid contents to be dispensed therefrom in a consumable liquid beverage form.

In addition to the food and beverage packaging system, the systems and techniques described herein include an apparatus for melting and/or diluting frozen liquid contents stored within this packaging system, wherein the frozen liquid contents of the package are made from food and beverage concentrates, extracts and other consumable fluid types with or without nutrients, and various methods for delivering these melted and/or diluted contents for immediate consumption. The techniques described herein allow, for example, consumers to conveniently and spontaneously create a single-serve, or multi serve consumable beverage or liquid-based food directly from a receptacle such that the product has the desired fresh taste, potency, volume, temperature, texture and/or the like. To achieve this goal, frozen liquid contents and preferably flash-frozen liquid contents, made from concentrates, extracts, and other consumable fluid types can be packaged in a gas impermeable, MAP packaged, full barrier and residue-free filterless recyclable receptacle. Further, this receptacle is designed to be accommodated and used by a machine-based dispensing system to facilitate the melting and/or diluting of the contents and deliver a product with desired characteristics, including taste, aroma strength, volume, temperature, color and texture, so that consumers can consistently and conveniently experience a level of superb taste and freshness that is unavailable by any other means in use today. Unlike current single-serve coffee makers, which create a finished product via a brewing process (e.g., the extraction of soluble products from solid coffee grounds), the disclosed approach creates a product by melting and diluting a frozen extract or concentrate created through an earlier manufacturing process, which can take place in a factory environment under ideal conditions to capture and preserve flavor.

These techniques include many combinations and permutations of packaging, methods, and apparatus characteristics that involve the functions of holding the frozen liquid contents, configuring the frozen liquid contents in one form or another, melting and/or diluting the frozen liquid contents, and making them available for consumption with desired characteristics, as described above. In some embodiments, a sealed receptacle containing frozen liquid contents is inserted into a machine. Thereafter, the machine perforates the sealed receptacle and a heated liquid, gas, or steam is injected therein to melt and dilute the frozen liquid contents. The machine also perforates the receptacle to permit the dispensing of the melted and/or diluted frozen liquid contents therefrom into a secondary container in the form of a consumable liquid beverage. Other possible variations for each of these functions will be described in greater detail below, including utilization of the frozen liquid content's negative energy as a food or beverage chilling agent to make a cold or iced beverage rather than using a refrigeration process to remove heat from the supplied dilution liquid, gas or steam.

As set forth in more detail below, certain embodiments of receptacles include a platform disposed between the frozen liquid content and the end layer. The platform is configured to contact a needle of a dispensing apparatus when the end layer is perforated by said needle such that it displaces in a manner that creates a flow path from an inlet perforation to an exit perforation. Therefore, the frozen content and platform have a first and second position within a receptacle, which may be complemented by space not occupied by the frozen content. Optionally, the end layer includes a depression that is complementary to a shape of the platform, and the platform is disposed within the depression. In some embodiments, the depression in the end layer may be a deformable or collapsible dome. In some embodiments, the receptacle is tapered and one or more perforators that create an inlet and/or exit in the receptacle may push the platform away from an end layer. The needle or perforator that moves the platform may inject or dispense a liquid into the receptacle, or both.

In some embodiments the platform is a substantially flat disc or plate. In some embodiments the platform is at least one of concave or convex relative to the end layer. In some embodiments, the platform conforms to the structure of the end layer so as to reduce space between the end layer and the platform. In some embodiments the platform may be corrugated or textured or may have protrusions into the interior of the receptacle. In some embodiments the platform may be annular in shape or be comprised of multiple holes, each smaller than the needle, such that its weight is reduced substantially without degrading its ability to help displace the frozen liquid contents. The platform may be made of any rigid or semi-rigid material suitable for contact with food, or that can be rendered suitable for contact with food, including, for example, plastics or metals such as steel, stainless steel or aluminum. Certain embodiments of the platform may include more than one material in its composition, for example, an aluminum coated on each side and along its edges with a suitable plastic covering. In one embodiment the platform complements the materials of the receptacle such that the receptacle is single-stream recyclable. For example, the platform could be a different type of plastic than the plastic of the receptacle, while maintaining compatibility from a recycling standpoint. Further, the platform and receptacle may be different metals or alloys that are compatible from a recycling standpoint or easily removable using standard mixed stream recycling operations. Moreover, plastic and metal platform and receptacle combination are envisioned in which the amount of plastic of one component is small enough so as to not compromise the ability to recycle the metallic portion. In addition to enhancing the food safety of the base material of the platform, the coating may have properties which improve its release characteristics and/or help reduce the level of friction between the platform and the frozen contents such as a disc of Teflon or Teflon coated aluminum.

The platform may be affixed to the end layer of the receptacle or be constrained in its movement such that it does not move during a process in which the receptacle is filled with a liquid that is later frozen. In such cases, the perforation of a needle stresses or breaks the point of fixation or constraint. The means of fixation or constraint may include, for example, a patch of glue, a continuous or interrupted heat seal, a spot weld, a crimp, an interference fit, and/or the like. In certain implementations, the platform is constrained in only one portion such that the constrain acts like a hinge that permits the platform to pivot when contacted by a needle. The constraint may include a geometric fitting between the platform and the receptacle that may be disrupted with pressure. For example, the sidewalls of a receptacle may include a minor invert or concave feature that locks the platform in place because the diameter of the platform is slightly larger than the receptacle's diameter from the point of the concavity. The receptacle and/or platform may flex with pressure from a perforator, or other source of pressure, and push at least a portion of the platform past the locking feature and away from the end layer. In still another embodiment, the platform includes an overflow tube. The overflow tube has at least one channel that permits flow to pass from a first side of the platform to a second side of the platform via the channel.

In one aspect of the invention, a receptacle includes a sidewall extending from a first end of the receptacle to a second end of the receptacle, an end layer disposed at the first end of the receptacle, and a closure disposed at the second end of the receptacle. The sidewall, the end layer, and the closure define a sealed cavity of the receptacle. The receptacle includes a frozen content disposed in the sealed cavity of the receptacle and a movable platform disposed in the sealed cavity of the receptacle and in contact with at least a portion of the frozen content proximate to the end layer.

Accordingly, there has thus been outlined, in broad terms, features of the disclosed subject matter in order that the detailed description thereof that follows may be better understood, and in order that the present contribution to the art made by the apparatus and techniques disclosed herein may be better appreciated. There are, of course, additional features of the disclosed apparatus and techniques that will be described hereinafter. It is to be understood that the phraseology and terminology employed herein are for the purpose of description and should not be regarded as limiting. Moreover, any of the above aspects and embodiments can be combined with any of the other aspects and embodiments and remain within the scope of the invention.

BRIEF DESCRIPTION OF THE DRAWINGS

Various objects, features, and advantages of the disclosed techniques can be more fully appreciated with reference to the following detailed description of the disclosed subject matter when considered in connection with the following drawings, in which like reference numerals identify like elements.

FIGS. 1A-1G illustrate various embodiments of receptacle geometries and frozen liquid contents configured in different forms and packaged to allow a desired flow of a liquid through the frozen liquid contents, according to some embodiments.

FIGS. 2A-2D illustrate various embodiments showing how the dilution system may add or deliver a liquid to/from the frozen liquid contents by piercing the packaging and externally and controllably heating the packaging so melting and dilution is a result, according to some embodiments.

FIG. 3 illustrates a method of melting the frozen liquid contents without the use of a melting/diluting liquid, but rather with some alternative source of heat, according to some embodiments.

FIG. 5 illustrates a range of exemplary packaging options and receptacle shapes that could be accommodated by a machine-based apparatus, according to some embodiments.

FIGS. 10A-10E illustrate five possible needle geometries that may be used to perforate a receptacle, according to some embodiments.

FIG. 11 illustrates the use of centrifugal motion to expedite liquefying a frozen liquid content, according to some embodiments.

FIGS. 12A and 12B illustrate a spring-loaded needle, according to some embodiments.

FIG. 15A illustrates a side cross-sectional view of a receptacle, according to some embodiments.

FIG. 15B illustrates a side cross-sectional view of a detail A of FIG. 15A, according to some embodiments.

FIG. 16 illustrates a side cross-sectional view of a receptacle with a platform having an overflow tube, according to some embodiments.

FIGS. 20A and 20B illustrate an operation of a receptacle with a domed end layer, according to some embodiments.

FIG. 21 illustrates a side cross-sectional view of a receptacle with a flat end layer and with partially melted frozen contents, according to some embodiments.

FIGS. 22A-D illustrate various features for increasing the rigidity of a platform for holding frozen contents, according to some embodiments.

FIG. 26 illustrates a perforator outside of a receptacle preparing to engage a frozen content lifting platform within the receptacle, according to some embodiments.

FIG. 27 illustrates engagement between a perforator and a frozen content mixing platform, according to some embodiments.

FIG. 28 illustrates partial melting of a frozen content disposed on a frozen content mixing platform, according to some embodiments.

DETAILED DESCRIPTION

Figure 1A:
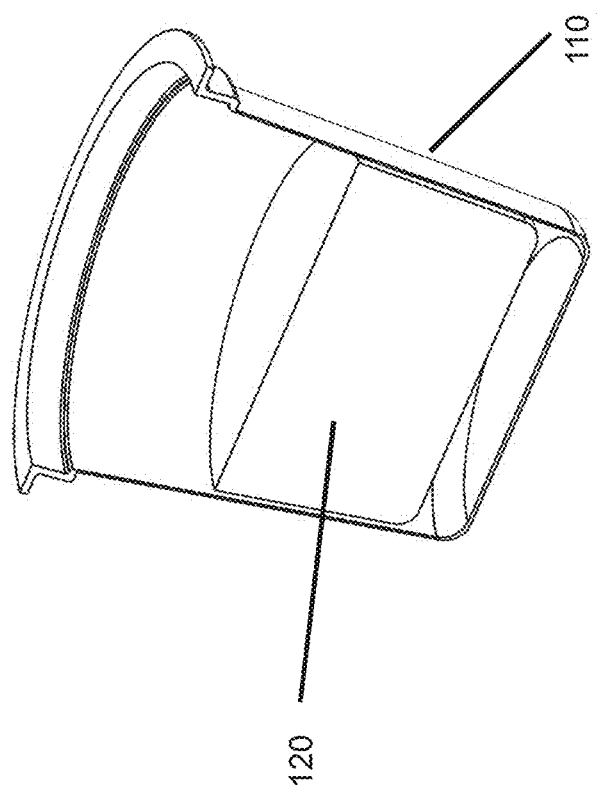

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

The various techniques described herein provide for the packaging of one or more frozen foods or beverage liquids, using a filterless receptacle, and how to efficiently convert this frozen liquid contents into a high quality, tasty food or beverage product. The single chamber filterless receptacle can be designed such that a machine-based system may accommodate the receptacle and facilitate the melting and/or diluting of the frozen liquid contents to conveniently produce a consumable liquid beverage or food product directly therefrom with a desired flavor, potency, volume, temperature, and texture in a timely manner without the need of brewing. For simplicity, a frozen food or beverage liquid may be referred to as the "frozen liquid contents" or "frozen liquid content".

In some embodiments, the liquid that is frozen to create the frozen liquid content may be any frozen liquid matter, which in some embodiments can be derived from a so-called extract, e.g., a product obtained through the removal of certain dissolvable solids using a solvent. For example, the extract may be created using water to remove certain desirable dissolvable solids from coffee grounds or tea leaves. Somewhat confusingly, certain liquid extracts with a high-solids content are often referred to as a concentrated extract. The use of the term "concentrated" in this context may or may not be entirely accurate depending on whether the high solids content was achieved purely through solvent extraction of the solids or through a secondary step of concentration wherein solvent was removed from the liquid by some means, for example, by reverse osmosis or evaporation using heat or refrigeration, to increase its potency or strength.

In contrast to a "brewer", which is a system for creating beverage products through extracting or dissolving solids (e.g., separately at a factory where the grinds/leaves etc. may be processed in bulk), the apparatus described herein to facilitate beverage creation is not a brewer. Rather, it melts and/or dilutes with dispensing functions that may be used to create a beverage from a previously brewed frozen liquid content.

The liquid used to make the frozen liquid content may also be a pure concentrate, e.g., a product obtained only by removing water or another solvent from a consumable compound such as a fruit juice or a soup, to create a fruit juice concentrate or a broth concentrate. In some embodiments, water may be removed from milk to create condensed milk. High TDS values and/or concentrations may be desirable either to reduce transportation costs and shelf space, or for convenience, for potency and serving size versatility of created products via dilution, or for enhanced shelf life due, for example, to enhanced anti-microbial activity due to reduced water activity. These specifics are intended to exemplify variation, but any liquid food or beverage product, regardless of how it is created, and regardless of its solids content falls within the scope of the present disclosure.

In some embodiments, the frozen liquid content can be one of a coffee or tea extract, lemonade, a fruit juice, a broth, a liquid dairy, an alcohol, a syrup, a viscous liquid, or any liquid food product that is frozen. Frozen liquid content can be matter created with or without nutritive value, may be flavored naturally or artificially, and be packaged with or without a preservative, and/or the like. The frozen liquid contents may compose carbohydrates, proteins, dietary minerals and other nutrients that support energy or metabolism. The frozen liquid contents may include or be enhanced with additives such as vitamins, calcium, potassium, sodium, and/or iron, among others. The frozen liquid contents may include preservatives such as antimicrobial additives, antioxidants and synthetic and/or non-synthetic compounds. Examples of preservative additives may include lactic acid, nitrates and nitrides, benzoic acid, sodium benzoate, hydroxybenzoate, propionic acid, sodium propionate, sulfur dioxide and sulfites, sorbic acid and sodium sorbate, ascorbic acid sodium, tocopherols, ascorbate, butylated hydroxytoluene, butylated hydroxyanisole, gallic acid and sodium gallate, an oxygen scavenger, disodium EDTA, citric acid (and citrates), tartaric acid, and lecithin, ascorbic acids, phenolase, rosemary extract, hops, salt, sugar, vinegar, alcohol, diatomaceous earth and sodium benzoate, among others. It will be understood that this listing of additives is intended to be within the scope of the techniques described herein, and the specifically referenced additives are exemplary only, and can also include derivatives thereof as well as other chemical compounds.

The frozen liquid contents or matter may or may not have suspended solids, and may include non-dissolvable solids. In some embodiments, the concentrate, extract, or other consumable fluid form which the frozen liquid contents are made may include additives that completely dissolve in a solvent before freezing. In some embodiments, the frozen liquid contents may also include a mass of a composition that is not dissolved within the frozen liquid contents during the packaging process, but is dissolved by the machine-based system during the creation of a beverage or food product with desired characteristics.

FIGS. 1A-1E show various embodiments of how the frozen liquid contents may be structured and packaged to allow for a desired flow of a pressurized or gravity fed diluting liquid by a machine-based system through the receptacle holding the frozen liquid contents. In addition to facilitating heat transfer to the frozen liquid contents, the diluting liquid may be effective at creating turbulent motion to thereby expedite melting in a variety of ways that are not outside the scope of the techniques described herein. Within the receptacle, the frozen liquid contents may be frozen into any useful shape or size.

Figure 1B:
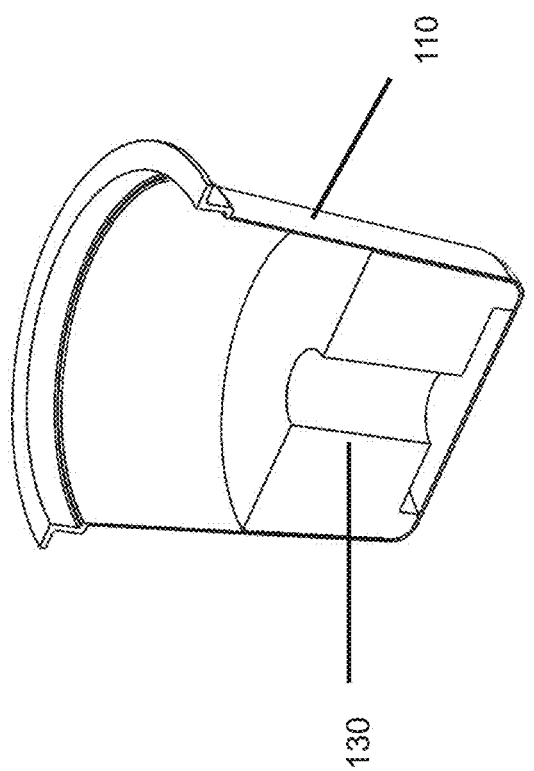

In FIG. 1A, a section view of receptacle 110 is shown (without a sealing lid in place), wherein the receptacle defines a cavity for packaging of the frozen liquid contents 120. The frozen liquid contents 120 can be frozen in-place by filling the receptacle with a liquid and then freezing the liquid, or the frozen contents can be frozen into a particular shape and then placed in the receptacle. In this instance, the frozen liquid contents are shown displaced away from the bottom portion of the receptacle to allow clearance for an exit needle perforation and to create a pathway around the outer surface of the frozen liquid contents in the receptacle for creating a desired flow of a melting/diluting liquid through the receptacle and around the frozen liquid contents to produce a beverage of a desired flavor, strength, volume, texture and temperature. FIG. 1B illustrates another embodiment, wherein the frozen liquid contents have been molded to a shape configured to match the outside of the receptacle and subsequently loaded, such that the pre-molded shape defines a through-hole 130 in its body and a relief portion 132 below for accommodating an exit needle perforation to provide for a desired liquid flow there through without blockage or back pressure. FIG. 1C shows a plurality of frozen liquid content pieces 140-180 provided in multiple and various shapes and sizes, with large interstitial spaces to provide for a desired liquid flow though the receptacle and around the frozen liquid contents. In some embodiments the frozen liquid contents within the sealed receptacle may include a plurality of concentrates and compositions. For example, frozen liquid contents 140 and 150 could comprise a lemonade concentrate, while frozen beverage concentrates 160, 170, and 180 may comprise a tea concentrate, resulting in an "Arnold Palmer".

Figure 1D:
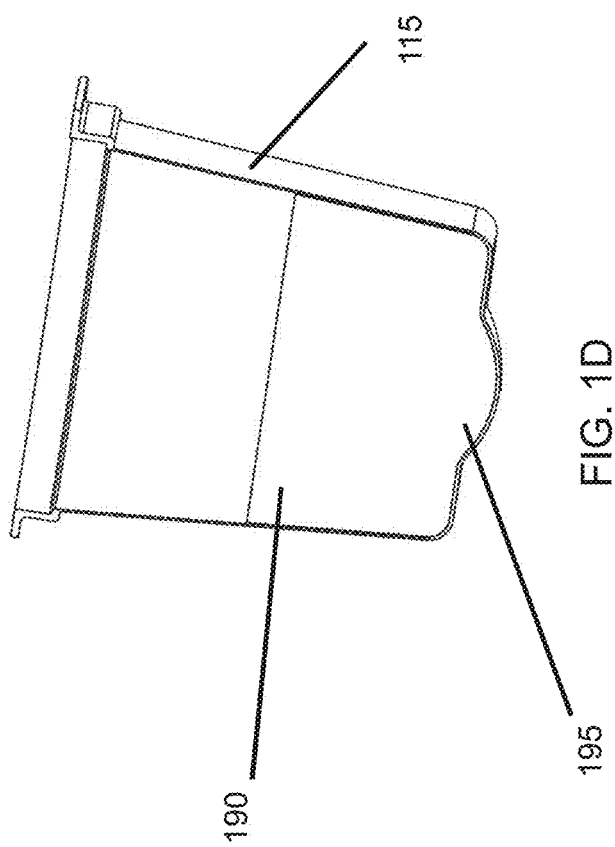
Figure 1E:
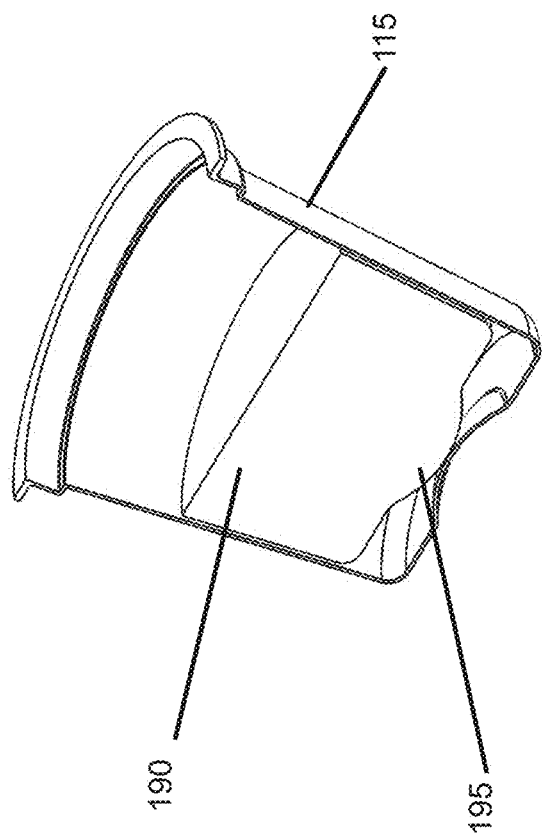

FIGS. 1D and 1E illustrate an embodiment for an alternatively shaped receptacle 115 that includes a bottom portion having a dome 195 (bistable or otherwise). In FIG. 1D the receptacle 115 is shown in its initial condition when the frozen liquid contents are added and frozen in place, complete with a frozen dome structure 195 in the bottom, with the dome structure in a primary or initial position, distended outwardly from the receptacle. FIG. 1E shows the condition of the receptacle 115 after the dome 195 has been displaced to a secondary position directed inward into the cavity of the receptacle such that the liquid frozen liquid contents 190 are displaced upwardly, into the headspace, reverting or "exchanging" the space or void between the inside bottom of the receptacle and the bottom portion of the frozen liquid contents. This displacement desirably creates a space for an exit perforation needle in the bottom of the receptacle and also creates flow paths for any melting/dilution liquid to pass around the outside of the frozen liquid contents.

Figure 1F:
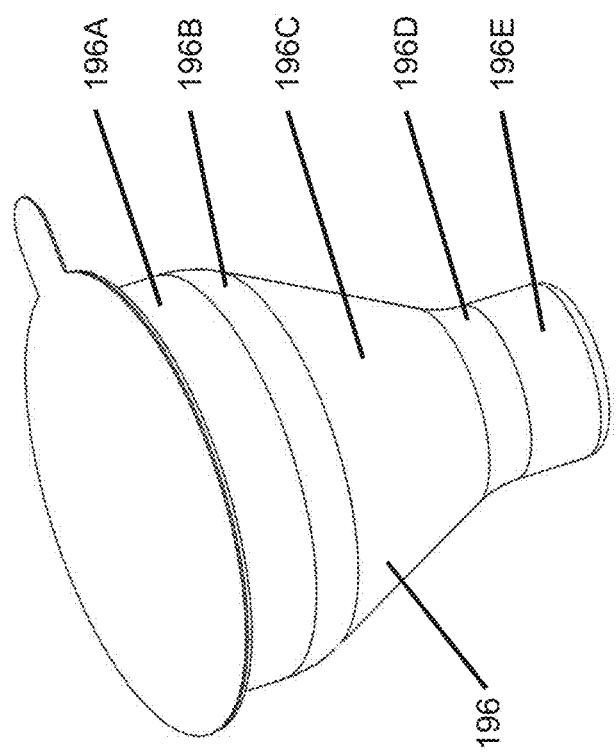

FIG. 1F illustrates a receptacle 196 comprising a multi-faceted shape. In this embodiment, the receptacle 196 includes different shape portions 196A-E. In some embodiments, the process of filling, melting and diluting a frozen liquid content may be generally unaffected by the size or shape of the receptacle. In some embodiments, certain design considerations can be taken into account with regard to using geometries that may, for example, promote and facilitate unrestricted release of the frozen liquid contents, accommodate needle perforation, enable the development of clearance around the frozen liquid contents to promote a ready flow path for diluting liquids, and/or the like. For example, one or more of such design considerations can be met with positive (non-locking) draft in the sidewalls of the receptacle where it is in contact with the frozen liquid contents. Draft can be achieved by, for example, tapering the sidewalls of the receptacle, such as tapering the sidewalls outward from bottom of the receptacle to top of the receptacle (e.g., the diameter of the receptacle gets larger nearer the top of the receptacle). This can create a positive draft such that pushing the frozen liquid contents away from the bottom of the receptacle creates clearance around the sides of the frozen liquid contents (e.g., which avoids mechanical locking of the frozen liquid contents against the sides of the receptacle). Such positive draft can be used to create a natural flow path for diluting liquids to travel through the receptacle, such as liquids flowing from an entry needle to an exit needle that perforate the receptacle.

FIG. 1G illustrates a receptacle 197 with a lid 198 that includes a pull tab 199 that may be removed by the consumer. The pull tab 199 can be removed to facilitate use of a straw or similar device in combination with the receptacle 197. As another example, the pull tab 199 can be removed to facilitate introduction of diluting fluids into the receptacle 197.

FIG. 2A illustrates a perspective view of the receptacle, including a formed seal closure such as a lid structure 118, which may include a puncture 210 therein, whereby, in some embodiments, a dilution fluid, which may also act as a melting agent, can be introduced into the receptacle. The lid structure 118 can include a tab 119 for allowing manual removal of the lid to access the frozen liquid contents without a need for perforation of the lid in certain instances. This lid structure can be made from the same material as the receptacle to better support efforts toward single-stream recycling. The lid structure can be made of sufficient gage thickness to adequately withstand internal pressure created by, for example, the melting/diluting liquid, which may increase and decrease with forces created by the accommodating system. For example, a vibratory, centrifugal, or rotation platform or the like that facilitates melting, or the flow rate of a diluting liquid injected will affect the pressure put on the lid, seal, and receptacle. Furthermore, the perforations made by the accommodating system may impact the pressures created on the hermetic seal, lid, and receptacle. The lid may be attached to the receptacle by any suitable means such as, for example, heat sealing or crimping, radial folding, sonic welding, and the function can be achieved by any mechanism or form of the lid that seals the internal cavity and acts as a barrier against gas or moisture migration.

FIG. 2B shows an alternative embodiment of a punctured lid including two perforations 215. FIG. 2C illustrates a bottom puncture 220 to allow the dilution liquid to exit the sealed receptacle. These examples are meant to be illustrative, however, as the puncture, or punctures, may be made anywhere on the receptacle. The punctures may be made in a specific location to dispense a solvent, diluting agent, liquid, such as water, gas or steam for a desired melting and dilution environment, and ultimately the creation of a desired beverage in a timely manner. The punctures may be of any size as needed, for example, to allow oversize solids (frozen or non-dissolvable solids) to be dispensed from the receptacle. In some variations, the perforation may be made to allow frozen structures of a specific size to escape and to be distributed from the receptacle to create a fluid, iced, slush, or smoothie-like beverage. In addition, multiple punctures may be advantageous in providing venting of the receptacle when melting/diluting fluid is input therein.

FIG. 2D illustrates an embodiment having four punctures (230-233) situated in proximity to the periphery of a receptacle 270 for entry of a liquid through the lid 250 of a receptacle 260 that is loaded top-down into a machine-based system. As shown in this embodiment, a puncture 240 may be provided near the center of the receptacle lid for allowing the melted and diluted frozen liquid contents to exit the receptacle. In this figure, the frozen liquid contents (not shown) are frozen within the domed bottom of the upside down receptacle to allow for a desired flow environment, wherein the liquid is redirected by the tapered sides of the receptacle to the exit perforation. The melted and diluted liquid, in this example, may flow out of the receptacle into a secondary receptacle for consumption from a single or plurality of nozzles provided by an accommodating apparatus.

In some embodiments, the frozen liquid contents contained in these receptacles can be better preserved when deaerated, or deoxygenated, including use of deaerated or deoxygenated solvents (e.g., water) during an extraction process when appropriate. In some embodiments, the liquid used to make the frozen liquid contents may be frozen at a time of peak quality in terms of freshness, flavor, taste and nutrition. In some embodiments, such as for a coffee-based beverage, the frozen liquid content is flash-frozen during the period of peak flavor immediately following extraction to preserve the optimum taste, aroma and overall quality and thereafter distributed in a frozen state for preserving taste and aroma thereof. For example, an espresso concentrate may be preserved and may taste best when it is ground within 0-36 hours following roasting, brewed immediately after grinding, and using deoxygenated water during the brewing process. By flash freezing the liquid concentrate, extract, or other consumable fluid during this period of peak flavor immediately following brewing, it is possible to capture the peak flavor, optimum taste, aroma and overall quality of the extract. Further, by packaging this flash frozen liquid in a gas impermeable and recyclable receptacle using MAP techniques (as described further herein), and providing the frozen liquid contents are maintained in a frozen state during subsequent storage and delivery to the final consumer, the fresh flavor can be maintained almost indefinitely. In some embodiments, the frozen liquid content may be frozen by removing heat from a selected and controlled portion of the receptacle so as to later facilitate dislodging the bonds (adhesion) created between the frozen liquid content and the sides of the receptacle. For example, in certain embodiments, a liquid content is placed in a receptacle, and heat is removed so as to cause the liquid to freeze starting at the top surface of the liquid and then to freeze downward. Doing so reduces the adhesion between the frozen liquid content and the interior of the sidewalls of the receptacle.

In some embodiments the packaging may be distributed above freezing if the quality of the content can be maintained by some other FDA food safe method e.g., a syrup used to make carbonated beverages. In some embodiments, the frozen liquid contents may be frozen and never melted, melted once or numerous times during distribution. Distributing and maintaining the receptacles at a temperature below the freezing point of the frozen liquid contents may increase aspects of quality preservation and nutrient-rich food safety, but is not required for all embodiments. In some embodiments, the beverage concentrate is flash-frozen and kept frozen in its receptacle until it is ready to be melted and/or diluted immediately prior to being prepared for consumption.

In some embodiments the frozen liquid content can also be packaged as a plurality of frozen liquid contents, configured in a layered and/or blended format. In some embodiments, the frozen liquid contents can be configured in any shape or multiple geometric shapes so long as the contents will fit within the cavity volume of the receptacle while maintaining an unfilled region and are capable of being repositioned for certain puncture implementations by an accommodating system. In some embodiments, the frozen liquid contents may be crushed or macerated to increase the surface area of the frozen liquid contents to increase melting rates.

In some embodiments the liquid comprising the frozen liquid content may be frozen after it has been measured into the receptacle. In some embodiments the fluid used to create the frozen liquid content may be frozen prior to delivery to the receptacle, e.g., pre-frozen in a mold, extruded, frozen and cut to size, or by other means and then deposited in the receptacle as a frozen solid of some desirable shape. This may be done in cooperation with the dimensions of a receptacle with a tapered portion such that the frozen liquid content does not interfere with areas of the receptacle designated for puncture. For example, the frozen liquid content can be shaped so as to be displaced away from a puncture area because its diameter is larger than that of a top, bottom, or other first or second end of a receptacle, as shown in FIG. 1A. Stated another way, the frozen liquid contents may be created in a first phase or separate step, and then received, inserted and sealed in a receptacle that can be accommodated by a machine-based dispensing system. In some embodiments the liquid beverage concentrate is received as a slurry or liquid, to be frozen, and sealed in the receptacle in turn, or in unison. In some embodiments the frozen liquid contents are of a potency, shape and size, and are structured within a receptacle such that a machine-based system can easily melt and/or dilute the liquid frozen liquid contents, converting the contents to a consumable liquid of a desired flavor, potency, volume, temperature, and texture.

In some embodiments the receptacle for holding/storing the frozen liquid contents using the techniques described herein includes a cup-shaped portion having a continuous and closed bottom portion, a continuous sidewall extending from the bottom portion, and a sealable top opening defined by a continuous sidewall that tapers outwardly as it extends away from the bottom portion. The wall is uninterrupted by filters or other internal features that would interfere with certain puncture, frozen liquid content displacement and flow implementations.

In some embodiments, the receptacle includes a cavity for storing the frozen liquid content. The packaging in which the frozen liquid contents are sealed, before and hereinafter referred to as a "receptacle" could otherwise be described as a cartridge, a cup, a package, a pouch, a pod, a container, a capsule or the like. The receptacle can be in any shape, styling, color or composition, and may be styled to enhance the liquefaction environment in cooperation with the dispensing apparatus. The packaging may be flexible, have a definitive shape, or combination thereof. For aesthetic or functional reasons, for example, to complement pod detection or motion drive functions applied to the pod, the walls of the receptacle may be concave and/or convex to provide for different pod sizes while keeping certain interfacing dimensions constant.

Figure 6:
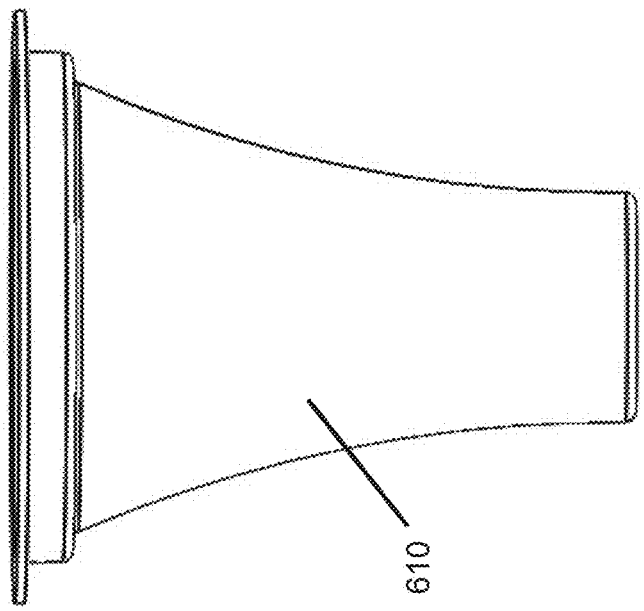
FIGS. 6 and 7 illustrate two versions of receptacles with identical end geometries and height, but different sidewall profiles, according to some embodiments.
Figure 7:
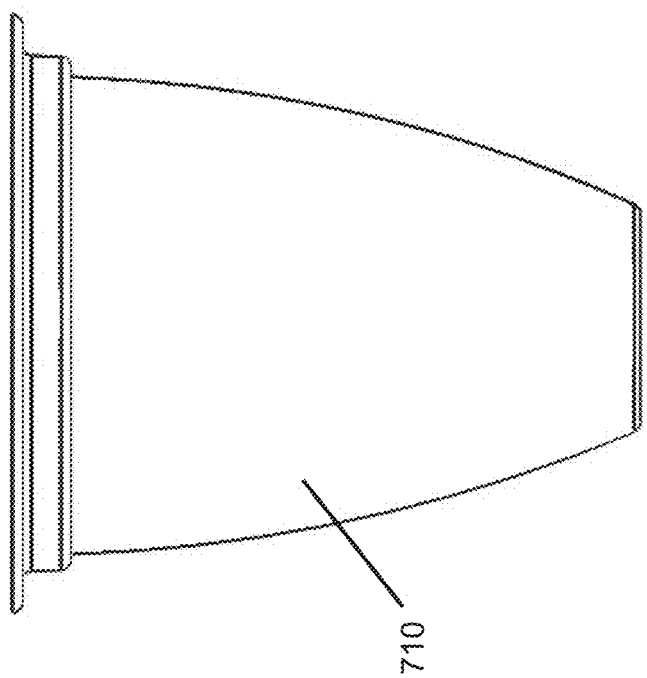

For example, FIGS. 6 and 7 illustrate two versions of receptacles 610 and 710 with identical end geometries and height, but different sidewall profiles. The differently curved sidewalls produce different internal volumes available for the frozen liquid contents and headspace, but the diameter of their two ends and their overall heights are the same.

In some embodiments the receptacle's outer surface is colored or coated with a material designed to enhance absorption of infrared energy that may be used to heat and/or melt the frozen liquid contents. In some embodiments the shape of the receptacle's sidewall, when seen in section view from a first or second end, would be the shape of a star or other non-circular shape, e.g., one whose perimeter surface area would be much greater than that of a smooth cylinder or cone and thereby promote heating and melting of the frozen concentrate proportionally faster. This may effectively facilitate melting in many ways, including increasing that surface area for heat to be transferred to the frozen liquid content through the receptacle, creating a more turbulent environment in the receptacle that expedites melting, or directing liquid away from the exit perforation(s) to promote greater heat transfer efficiency within the receptacle.

Figure 8:
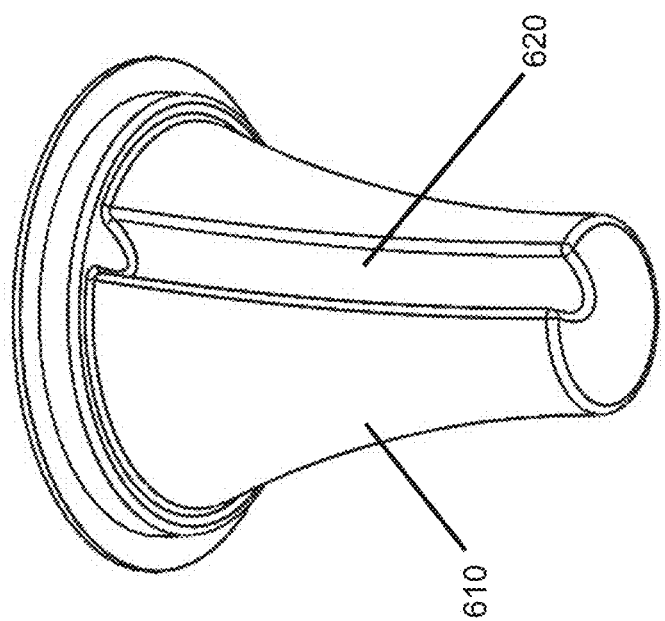
FIGS. 8 and 9 illustrate two versions of a sidewall indentation in a receptacle, a feature that may be used both for expediting liquefaction and for product identification, according to some embodiments.
Figure 9:
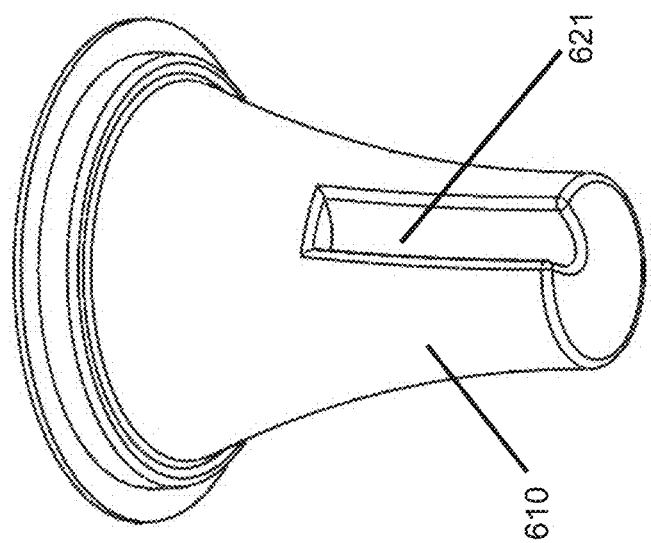

In some embodiments, as shown in FIGS. 8 and 9, there is a "keying feature" 620 or 621, which can help to promote internal turbulence during melting and dilution of the frozen liquid contents and can also be of use in identifying the contents or family of products used to fill the receptacle.

In some embodiments, the receptacle includes a closure for sealing the receptacle to assist in maintaining a MAP gas environment. In this case, a hermetic seal formed between a lid and the receptacle may be accomplished using a variety of methods, including, but not limited to a patch, glue, cork, heat seal, crimp, and/or the like. In some embodiments, the closure may be designed to be manually removable, e.g., with a pull tab on a lid as previously noted, so that the frozen liquid content can be used in other ways if a machine-based system for preparing a consumable beverage is not available. In some embodiments, the apparatus may require a manual perforation instead of a machine implemented perforation before loading the receptacle into the machine-based dispensing system.

The frozen liquid contents may be packaged in a material that provides control of gas migration, e.g., the receptacle may be comprised of a gas impermeable material for creating a long lasting storage package for preserving freshness and aroma of the packaged frozen liquid contents. For example, the receptacle may be comprised of an aluminum substrate or other metal material and typically prepared with a coating approved by the FDA for contact with food, if needed. As another example (e.g., if recyclability is not a critical concern), the receptacle may be comprised of a multi-layer barrier film including, for example, a layer of EVOH plastic. In some embodiments, if the receptacle is fabricated from a metal, the receptacle will preferably be made from a highly thermally conductive material such as aluminum and thereby be supportive of faster heat transfer, especially if a heated dilution liquid is not the primary means for melting the frozen liquid contents. In some embodiments the packaging may include edible packaging materials that may be dissolved and consumed. In some embodiments the receptacle and its closure are comprised of a gas impermeable, recyclable material such that a spent receptacle, including the closure and other packaging features, can be recycled in its entirety In some embodiments, the frozen liquid contents is packaged with headspace, with no headspace or limited headspace. As mentioned above, headspace refers to any excess atmosphere within a sealed receptacle, which, optionally, is located between a top portion of the frozen liquid contents and the lid or closure portion of the receptacle. Furthermore, any headspace in the packaging receptacle may be advantageously filled using a MAP gas, such as argon, carbon dioxide, nitrogen, or another gaseous compound which is known to be less chemically active than air or oxygen. In some embodiments the top or outermost layer or envelope of the frozen liquid contents may be layered with a frozen, deaerated coating of water which may act as a preservative barrier. In some embodiments the frozen liquid contents are vacuum sealed in a flexible receptacle. In some embodiments the frozen liquid contents are packaged in a receptacle in a manner that minimizes the surface area contact of contents with the atmosphere, especially oxygen gas, but also any gas that carries off aroma.

In some embodiments the receptacle is coated on the inside with a material that significantly reduces the force needed to dislodge the frozen liquid contents from the sides or bottom of the receptacle to facilitate movement of the frozen liquid contents out of the way or by the action of a perforating needle and to create unrestricted pathways for melting and/or diluting liquids to pass around the exterior surface of the frozen liquid contents en route to the exit perforation. In some embodiments the bottom of the receptacle incorporates a dome structure (bistable or otherwise) which can be distended downward, away from the bottom of the receptacle during filling and freezing of the liquid contents and subsequently inverted upward to a its second stable position after freezing to hold the frozen liquid contents away from the bottom of the receptacle to facilitate needle penetration and/or flow of diluting liquids around the exterior surface of the frozen liquid contents en route to the exit perforation. In some embodiments the dome is inverted at the factory prior to shipment of the product to consumers. In some embodiments the dome is inverted by the consumer immediately prior to use or by the machine as a part of insertion and needle penetration. In some embodiments the dome is inverted by the machine. These embodiments are merely examples and not cited to limit the functions or features of the receptacle that may facilitate dislodging frozen liquid contents or beverage creation. Moreover, in the example above, the frozen liquid content is displaced upward into a headspace by the perforating needle or dome. However, in other embodiments, the frozen liquid content can be displaced in a different direction (e.g., downward or sideways) into an unfilled region of the receptacle and remain within the scope of the invention. Similarly, the frozen liquid content can be of a shape and size to facilitate fracture by a needle penetrating the bottom or top of the receptacle.

In some embodiments the frozen liquid contents may be packaged and structured in a receptacle of a specific size and shape that allows the receptacles to be accommodated by current machine-based dilution systems or systems on the market that are designed for extracting solutes or brewing coffee for the facilitation of creating a beverage of a desired flavor, potency, volume, temperature and texture.

In some embodiments the packaging of the frozen liquid contents includes additional barriers or secondary packaging that protects the frozen concentrates from melting or exposure to ultraviolet light during distribution. For example, packaging frozen liquid contents in a receptacle that is further packaged within a cardboard box adds a layer of insulation and would thereby slow temperature loss or melting of the frozen liquid contents, e.g., when such temperature loss or melting is undesirable.

In embodiments of the present techniques, the apparatus for creating a food or beverage from frozen liquid contents advantageously includes a receptacle that is filterless, as distinguishable from the filtered receptacles currently available, as exemplified, for example, by U.S. Pat. No. 5,325,765, among other filtered beverage receptacles. A filterless receptacle, and, for example, (1) the (virtually) complete removal of the frozen liquid contents during melting and/or dilution and subsequent delivery and (2) the use of a homogeneous material of construction, renders the receptacle ideally suited for recycling.

In some embodiments the receptacle is configured to be accommodated by a machine-based system and capable of receiving a liquid dispensed therefrom to further facilitate the melting and/or dilution of the frozen liquid contents into a consumable liquid product with a desired set of characteristics.

In some embodiments the receptacle may be large enough that it can contain the melted contents and all of the added dilution liquid from the machine-based system and the finished product can be consumed immediately therefrom. The perforation used to add dilution liquid may be suitable for subsequent use with a straw or other means to allow consumption directly from the receptacle, as opposed to dispensing the diluted and/or melted contents into a secondary container.

In some embodiments the receptacles with frozen liquid contents are provided in a controlled portion arrangement, wherein the controlled portion arrangement can comprise a single-serving sized format, or a batch-serving sized format for producing multiple servings. In some embodiments the machine-based system may accommodate the receptacle, or a plurality thereof, in any method, shape, or form to facilitate the melting and dilution of the frozen liquid contents. In some embodiments a machine-based system may accommodate multiple receptacle types and sizes for a larger array of product possibilities.

In some embodiments the receptacle may be perforated either by the consumer or by the machine-based system. For example, the consumer may remove a patch to expose a perforation built into the receptacle before it is received by the machine-based system. Alternatively, the machine-based system may perforate the sealed receptacle using a variety of methods, including a puncture needle or pressure to rupture the receptacle.

In some embodiments the packaging may become perforable only after exposure to higher temperature or mechanical action. For example, the packaging may be made of a sponge-like material that the frozen liquid contents can permeate when heated. In an alternative example, the frozen liquid content is thawed or liquefied from the action as to allow a machine-driven needle to penetrate the receptacle and content with less force.

As previously stated, the perforation may be a single hole. In some embodiments multiple perforations may be provided in the receptacle at multiple locations. In general, since there is no need for filtration of the melted frozen liquid contents, the perforations described herein are intended for the introduction of a melting/diluting liquid, gas, or steam or to allow the melted frozen liquid contents to exit the receptacle. In some embodiments, the receptacle is perforated and a push-rod or the like is introduced to displace the entire frozen liquid contents out of the receptacle before melting and diluting. In some embodiments the perforations may be staged—one perforation then another or multiple perforations staged at different intervals in the dispensing process. The machine-based system may displace the frozen liquid contents, or the consumer may displace the frozen liquid contents, remove it from its packaging, and load only the frozen liquid contents into the system. In some embodiments the receptacle is perforated by the machine-based system in a location that allows the entire frozen liquid contents to exit the receptacle before or after melting so as not to waste any of the beverage product and to remove any recycling contaminants from the receptacle.

The perforation may be made before, after, or during the time when the frozen liquid contents are melted and/or diluted. In some embodiments the frozen liquid contents are melted and exit the receptacle before being diluted by a dispensed diluting agent for an ideal beverage. In some examples of the present techniques the frozen liquid contents may be diluted using a dispensed liquid before the contents are distributed into a subsequent or secondary receptacle. In some embodiments the frozen liquid contents are melted and diluted simultaneously. For example, in some embodiments, a liquid may be introduced into the receptacle containing frozen liquid contents to melt and/or dilute the frozen liquid contents simultaneously or in unison.

Although pushing a pressurized liquid around or through the frozen liquid contents within a receptacle can be effective at expediting melting rates, other methods exist to achieve the same outcome and enhance the speed of this process. FIG. 3 illustrates a method for producing a desired beverage that does not use a pressurized liquid to simultaneously melt and/or dilute the frozen liquid contents. The frozen liquid contents 310 are enclosed in a perforable receptacle. The receptacle 320 is perforated and accommodated by a machine-based system and the frozen liquid contents are liquefied via a melting component such as an external heat source or the like. The process for producing a consumable liquid product from a frozen liquid content of the techniques described herein may be carried out by an initial step of providing the content in a sealed receptacle for storing therein. The receptacle is accommodated by a machine-based system that applies heat to the receptacle via an external heat source for melting the frozen food or beverage into a consumable liquid food or beverage form, wherein the sealed enclosure is perforated for permitting dispensing of the consumable liquid beverage directly from the sealed enclosure.

In some embodiments, the negative energy contained in the frozen liquid content absorbs excess heat from the diluting liquid, gas or steam used to make the consumable food or beverage as a method of facilitating a cold beverage from a dispenser without need for a refrigeration system within the dispenser. In this embodiment involving beverages intended to be served cold, melting and dilution of the frozen liquid contents is carefully managed using a combination of external heat, energy contained within an ambient temperature diluting liquid, and the use of relative motion between the melting/diluting liquid and frozen liquid contents to enhance liquefaction with the goal to minimize the overall temperature of the finished product.

Further referring to FIG. 3, the melted beverage content 330 exiting its receptacle is diluted with an additional liquid dispensed via the machine-based system in a secondary step or in unison with a desired diluting agent. The melted contents may be dispensed undiluted, before, after, or simultaneously with the addition of a distinct liquid for dilution. This may include capturing the melted beverage content in a liquid reservoir that mixes the two liquids before being dispensed together by the machine-based system. When distributed, a secondary receptacle 340 receives the melted contents and diluting agent when appropriate.

In some embodiments, a secondary receptacle used to collect the melted/diluted contents may include any receptacle known to hold liquid food or beverages. This secondary receptacle could be a container, thermos, mug, cup, tumbler, bowl, and/or the like. This secondary receptacle may or may not be included in the secondary packaging. Note: an example of this would be a consumer package with a soup bowl containing instant rice or noodles sold along with a receptacle of frozen liquid broth concentrate that combines to make a bowl of soup after the frozen liquid contents are melted and/or diluted and discharged into the secondary packaging. Alternatively, the secondary receptacle may be separately provided by the consumer.

In some embodiments, the consumer may desire a beverage with no dilution of the frozen liquid contents. e.g., the frozen liquid contents are already at the correct flavor, volume and potency. For example, the frozen liquid contents may already be at a desired TDS level for consumption, e.g., an espresso, or hot fudge sauce and need to only be melted and dispensed at the desired temperature and texture. For example, the machine-based system may melt the frozen liquid contents by putting a thermally conductive receptacle against a coil heater or by irradiating it with infrared light or by impinging a heated gas or steam against the outside of the receptacle and then puncturing the receptacle after the contents reach a desired temperature. Furthermore, the frozen liquid contents may be conveniently dispensed from the machine-based system into a subsequent container. In some examples, the lid is removed prior to or after melting and heating for direct consumption from the receptacle.

FIGS. 4A through 4D illustrate an exemplary machine-based apparatus that can accommodate a variety of different receptacles, according to some embodiments. The system can be, for example, a melting system. The receptacles can include, for example, a variety of different filterless receptacles, of varying sizes and shapes, each holding some amount of frozen liquid contents. The apparatus can be configured to perform melting, diluting, and delivery functions for the purpose of creating a beverage or food product with desired characteristics, as described herein.

Figure 4A:
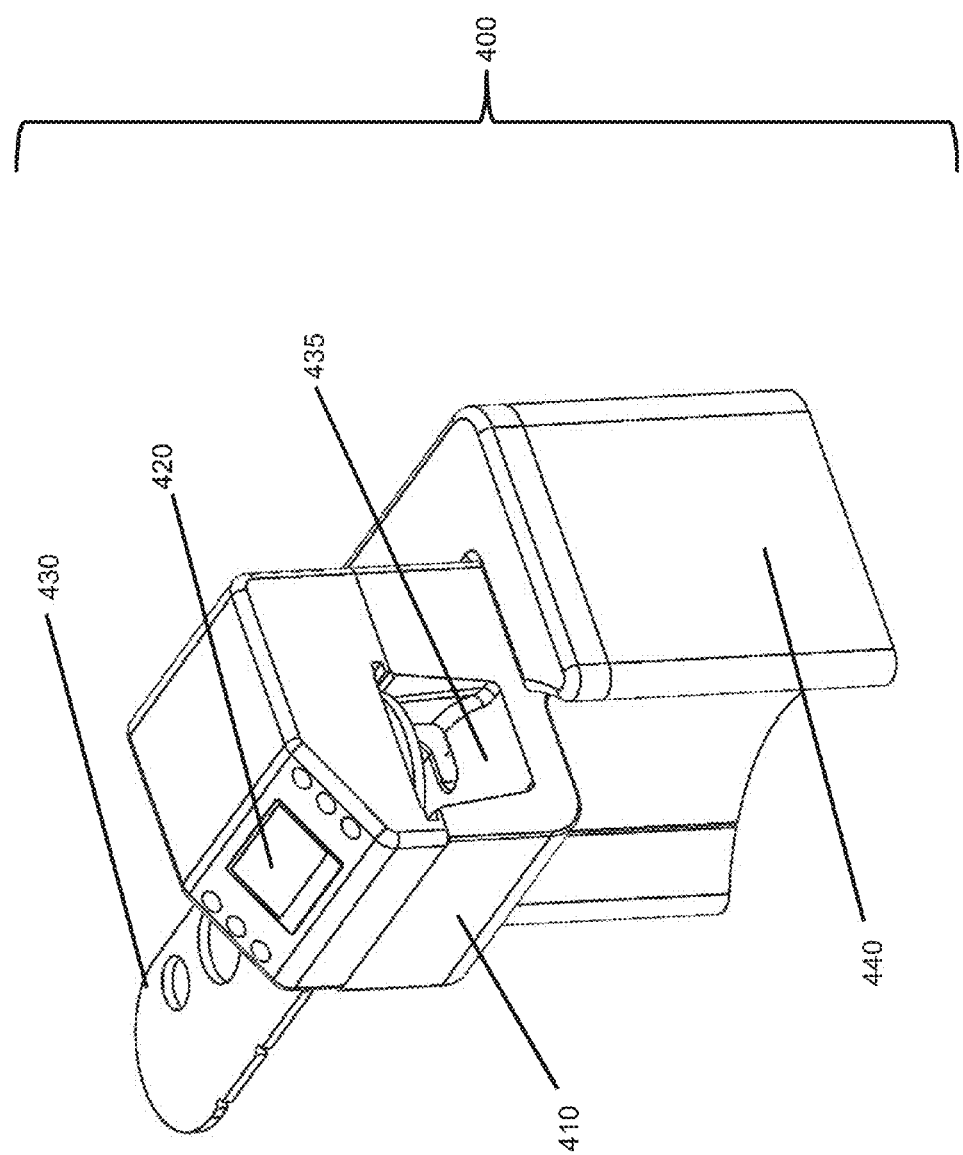
FIGS. 4A-4D illustrate an exemplary machine-based apparatus that can accommodate a variety of receptacles geometries, according to some embodiments.

In FIG. 4A, the system 400 includes a cassette 430 into which receptacles of different sizes and/or shapes can be loaded. Once loaded with a single receptacle, the cassette 430 can be slid into place, with the receptacle passing through a clearance tunnel 435 until it is centered on the main system body 410. Instructions for use of the melting system 400 can be communicated to a user via a display 420. Solvent (e.g., water) to be used for melting/diluting the frozen liquid contents of the receptacle is stored in the holding tank 440 until needed.

Figure 4B:
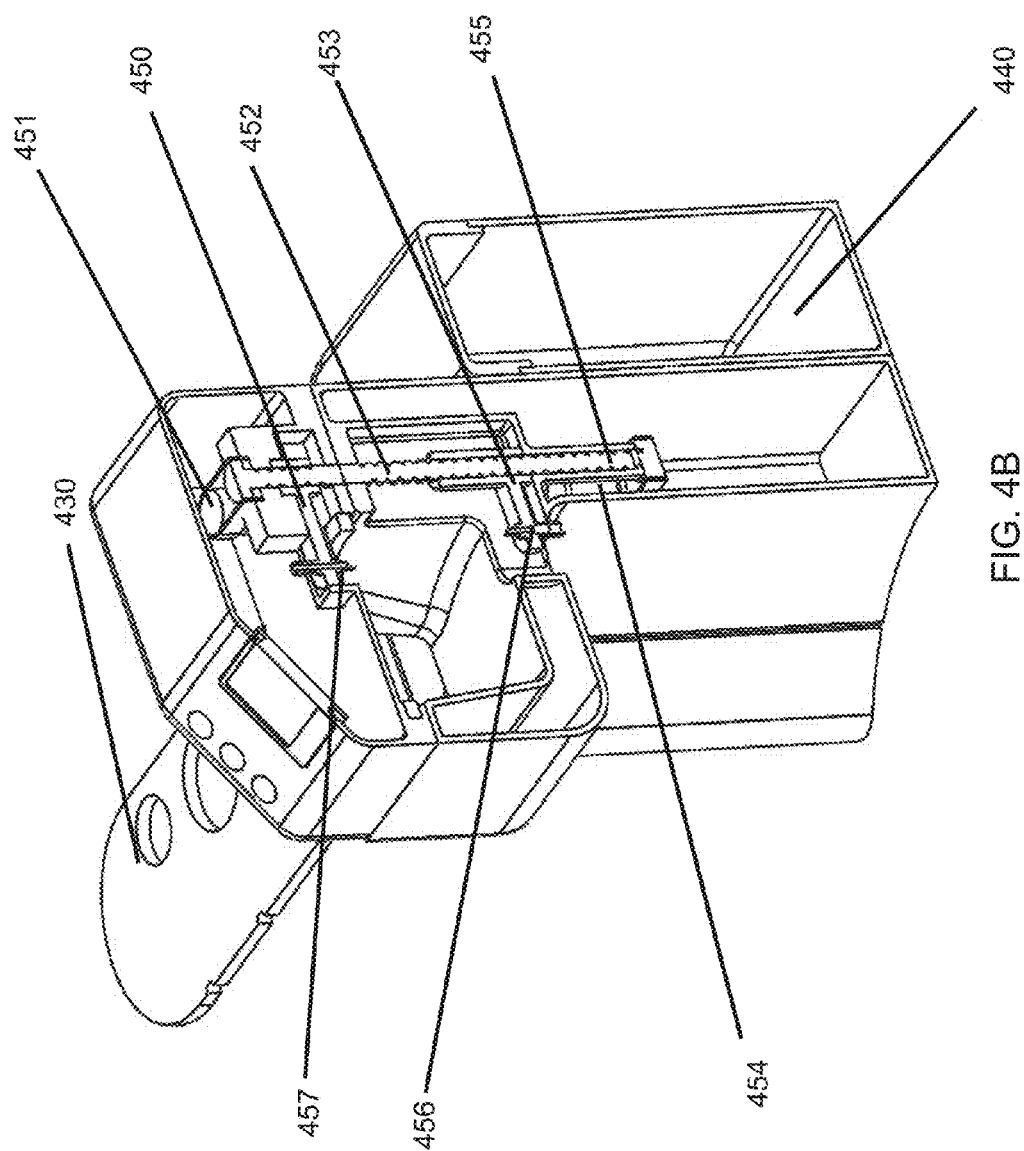
Figure 4C:
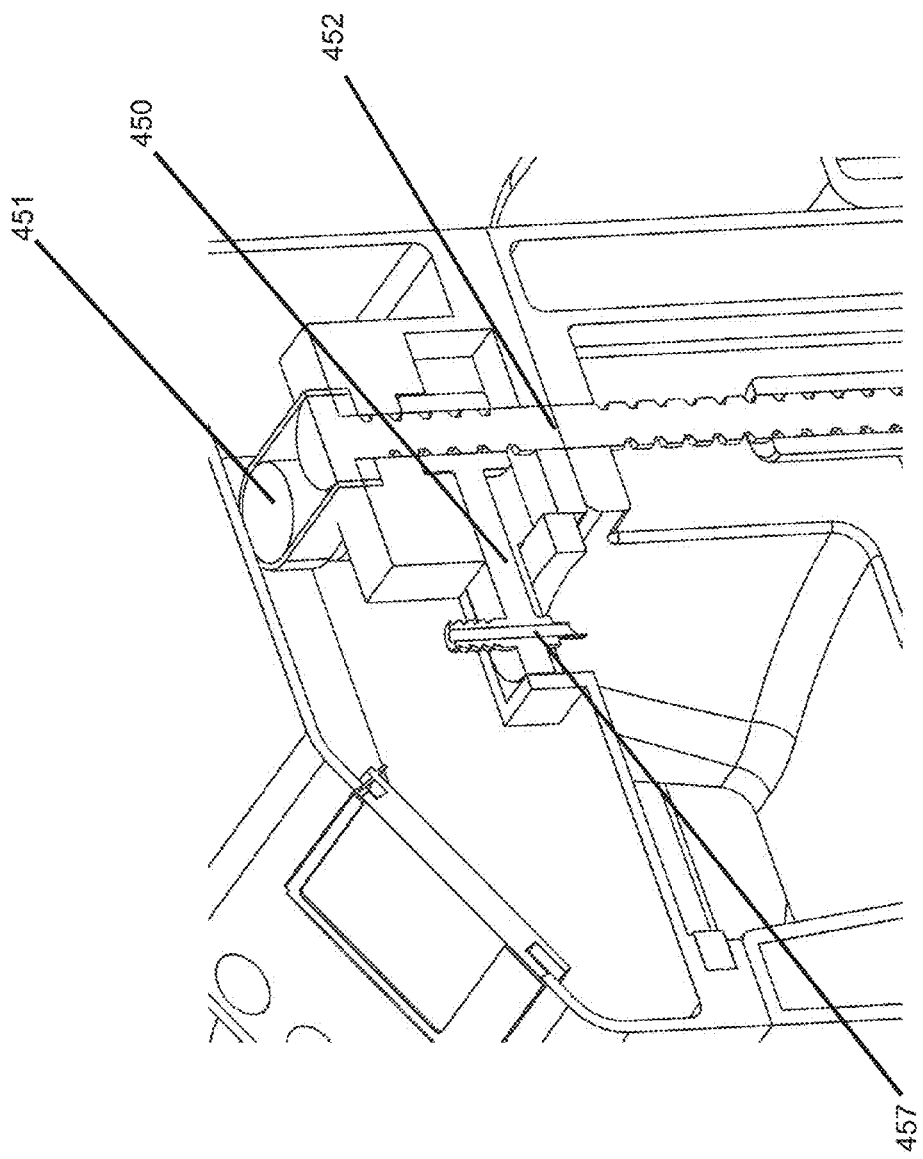

Referring to FIGS. 4B and 4C, once the receptacle is properly placed for interaction with the system, a needle support arm 450 is moved toward the receptacle using any known means, which, by way of example only, could include a motor 451, including electric or gas-driven variations and/or a screw 452, until the needle 457 punctures the closure end of the receptacle. Use of a manual lever to puncture the receptacle is also within the scope of the invention. The shape of the needle may comprise a protruding tip such that it may be inserted into the receptacle to a certain depth and angle to chip, fracture, or dislodge a portion of frozen liquid content to promote flow paths to an exit point. The needle 457 may spin in a screw motion at a certain depth to facilitate penetration of the receptacle and/or frozen liquid content. Alternatively, the needle may retract after puncture to a second depth within the receptacle or from the receptacle completely to ease initial dispensing pressures or provide unobstructed perforation exits. The needle may be heated before or during insertion into the receptacle. A heated probe may be inserted into the receptacle through one of the puncture to accelerate melting of dispensed contents. Depending on the receptacle design and its contents, a second needle support arm 455 can be moved toward the receptacle to penetrate the bottom of the receptacle using a similar motor 454 and drive screw 455. A heater, such as a plate heater or an IR heating source (not shown) may be used to preheat or melt the frozen liquid contents depending on the selected product and process desired. When needed, a melting/diluting liquid stored in a holding tank 440 can be passed through a heat exchanger (not shown), using tubing (not shown), to pass through needle 457 and into the now punctured receptacle. Thereafter the melted liquid can exit from the receptacle through needle 456. In one embodiment, the perforation needle 457 may inject a hot liquid, steam, gas, or any combination thereof directly into the pod as a way to aerate the liquefied product for creating, in a specific example, a froth-like texture for a coffee-based dairy product like cappuccinos and lanes. In one embodiment, a needle injected into the pod may include no exiting structure and be used purely to stabilize a pod.

As illustrated in FIGS. 10A-10E, the dispensing or drain orifice(s) or reliefs of the needle may be located at its point 1001, as in 1000A, or elsewhere and aligned axially as in FIG. 10A or to the sides 1004 as in FIGS. 10C and 10D, but in fluid communication with axial passage(s) 1005, 1006, so the liquid injected into the receptacle can be directed away from the center of the frozen liquid contents, possibly to help move or rotate the frozen liquid contents relative to the side walls of the receptacle. Concerns about needle strength and durability may be addressed with a cruciform 1003 needle structure 1000B as in FIG. 10B. Example 10E might be used to first easily pierce the closed end of the receptacle with the sharp point 1007 and then bear against the frozen liquid contents with the domed end 1008 without penetration, while melted/diluted liquid drains out of the side holes 1009 of the needle, wherein those side holes are positioned adjacent to the inside surface of the closed end of the receptacle. A screw like section of a perforation needle that spins may be used like an Archimedes pump to direct the flow of exiting fluid.

Figure 4D:
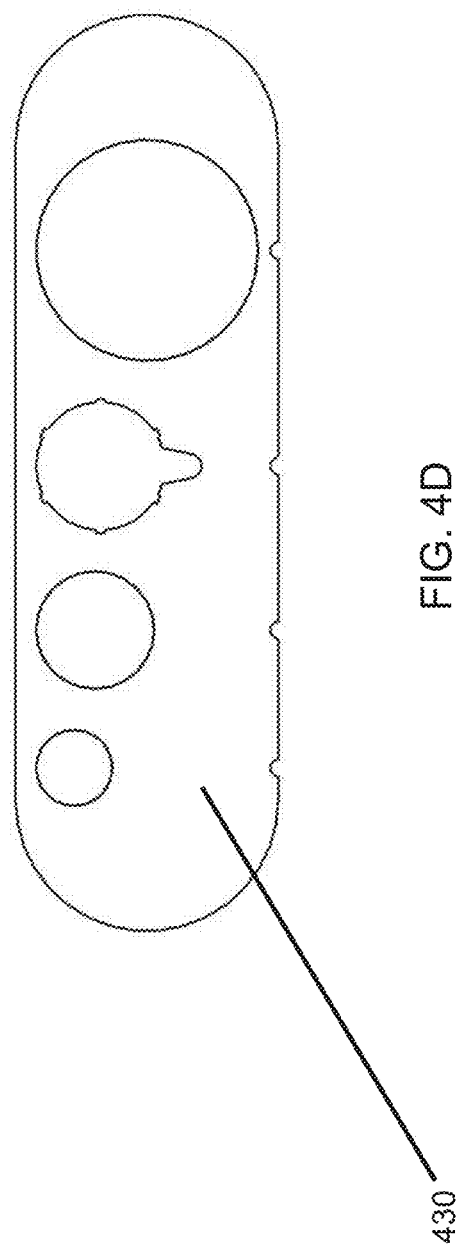

FIG. 4D illustrates one embodiment for a cassette or other device that is capable of holding a variety of receptacle sizes and shapes to allow a wide range of beverages, soups, etc. to be used with a melting apparatus.

FIG. 5 illustrates a range of receptacle sizes and shapes that could be accommodated by the cassette of the machine (e.g., cassette 430 of FIG. 4A). With different cassettes, each interchangeable with the original, but with differing hole sizes and shapes, an unlimited number of different receptacles can be accommodated by the brewer. It will be recognized by one skilled in the art that the process of filling, melting and diluting a frozen liquid content may be, in some embodiments, generally unaffected by the size or shape of the receptacle.

The melting system may use any source of heat, motion, or a combination thereof to expedite the liquefaction of the frozen liquid contents. Therefore, the melting system may include various sources of heat and/or motion. Electromagnetic radiation, a heated coil, hot air, a thermo-electric plate, a heated liquid bath, steam and the like are all examples of possible sources of heat that may expedite the rate of melting. In addition, motion may be introduced using a centrifuge, rotational, rocking, rotary or linear reciprocation, including agitation both back and forth or up and down or a vibration platform or the like as a means of expediting the melting rate. In another embodiment, the perforations and pressures caused by an injected liquid may spin and move the frozen liquid content inside of the receptacle to create a desirable environment for liquefaction. One skilled in the art, however, will recognize that various other physical action principles and mechanisms therefore can be used to expedite liquefaction. As described herein, manual or automatic (electronic) machine-based methods can be used to expedite the melting and an increase in temperature of the frozen liquid contents using various forms of motion, electric frequency/electromagnetic energy, and/or heat. In such examples, the perforation needles may be given a range of motion so that they may implement or complement a range of motion. For example, in a centrifuge system the needles may spin with the receptacle.

The system 400 includes internal electronic components, memory, and the appropriate controllers, along with programming instructions to automatically create the desired food and/or beverage. The system 400 can be given instructions by a user via a display or other known methods, e.g., wireless instructions from a handheld device.

The finished food or beverage serving can be made from the frozen liquid content of the receptacle at the temperature desired by the consumer, and via a method that is appropriate for direct consumption by the consumer. In one embodiment, the frozen liquid content is melted and diluted with a cool, or ambient temperature liquid, such that the frozen liquid content is melted and minimally heated for a beverage that is normally consumed cold, like a juice, iced coffee, soda, etc.

In a specific example, represented in FIG. 11, a receptacle with tapered sides 520 is punctured on the top and bottom of the receptacle, and an ambient-temperature liquid is injected via a top-puncturing needle 1000D. As the liquid is injected into the receptacle, the machine-based apparatus spins, torques, and cooperates with the receptacle in such a manner that the liquid 1101 in the receptacle flows away from the exit perforation(s) of the receptacle, formed by the bottom-puncturing needle 1000B. Thus, the diluting liquid may interact with the frozen liquid content 190 for a longer duration of time within the receptacle and provide more thermal exchange between the frozen content and diluting liquid. The exit of the liquid may be controlled effectively by the flow of the water in, which will push water out when the pod nears or hits capacity or by decreasing or stopping the agitating motions. Optionally, the bottom-puncturing needle 1000B dislodges the frozen liquid content from the bottom of the receptacle.

In some implementations of the embodiment shown in FIG. 11, the dispensing system includes a motor or other known mechanism to spin the receptacle 520 around an axis of rotation. In cooperation with the radius and geometry of the receptacle, the spinning motion imparted to the liquid by the rotation around the axis overcomes the normal pull of gravity on the liquid, thereby displacing the liquid along the sides of the receptacle and away from the bottom of the receptacle 1101. The puncture formed by needle 1000B is positioned to be in the empty space created when the liquid is displaced.

In some embodiments, the inertia of the spinning liquid holds the liquid against the sidewall of the receptacle until the addition of new liquid into the receptacle forces out a desired product or rotation speed is decreased. In such embodiments, the flow rate of liquid entering the receptacle, in part, controls the amount of time the melted frozen content is in the receptacle. This residence time influences the temperature exchange between the frozen content and diluting liquid, and ultimately the temperature of the exiting liquid product. In some embodiments, the flow rate and pressure of the diluting liquid supplied into the receptacle influence the amount of liquid pushed through the exit perforation(s) by overcoming the displacing force imparted by the rotational motion applied to the receptacle for a clean, uniform flow out of the receptacle. In some embodiments, the motor, or other mechanism to drive the spinning of the receptacle is positioned such that it is not an obstacle for supplied or exiting liquid. For example, a belt or gear system, or the like, is used to drive the receptacle around the axis without the need to position the motor or other mechanism above or below the receptacle.

In embodiments in which the frozen liquid content is displaced away from the bottom of the receptacle, the displacement may be accomplished by domed needle 1000E. In some implementations, the displacement by the domed needle is coupled with inversion of a dome (bistable or otherwise) mentioned above. In such case, the dome takes a new stable position curved inward toward the interior of the receptacle and holds the frozen contents away from the bottom of the receptacle. This can occur even if the domed needle 1000E does not remain in contact with the receptacle. In some embodiments, the domed needle 1000E pushes against the receptacle bottom and creates a small displacement through bending or plastic deformation of the receptacle material. In some embodiments, a delayed action takes place to perforate the bottom of the receptacle with the needle. This may occur simply by applying enough force to the needle that the domed end ruptures the closed end.

In some embodiments, a secondary piercing head 1007, as shown in FIG. 10E, emerges out of the domed needle 1000E. This piercing head easily creates an initial puncture which is more easily expanded by the domed surface 1008 of the needle, allowing the needle to move further into the receptacle and enlarge the space around the periphery of the frozen liquid contents. In some embodiments, the emergence of the piercing head 1007 of the needle is driven pneumatically. In some embodiments this movement forms a slight tear in the closed end of the receptacle such that the domed end 1008 can expand the breach and easily pass through. Meanwhile, the piercing head 1007 can immediately retreat back into the needle body.

In some embodiments a component of the machine-based system used for dilution may include a liquid reserve, or a plurality thereof. In some embodiments the machine-based system may connect to a piping system that distributes a diluting agent from a larger liquid reserve or from an appropriate plumbing system, e.g., a filtered water system tied into a building's water supply. The diluting liquid may be water, however, any liquid, including carbonated liquids, dairy liquids, or combinations thereof, including any nutritive or non-nutritive liquids suitable for human consumption, may be used to dilute the frozen liquid contents to a desired composition. In some embodiments, the liquid for dilution may be carbonated to create soft drinks and the machine-based system may include a carbonating component. In some embodiments, a diluting liquid may be increased to a certain temperature or pressurized so as to melt the frozen liquid contents with room temperature or chilled fluids to make chilled or iced beverages. In some examples, the apparatus includes a refrigerated chamber for storing receptacles that may automatically load receptacles to a location to be created into a beverage without a human interacting with the receptacle. The previous example may be combined with a user interface on the machine to load a desired receptacle in a vending style application.

In some embodiments for creating desired products that require dilution, a diluting agent is heated and/or allowed to flow to create a consumable liquid product of a desired flavor, potency, volume, temperature, and texture in a just-in-time manner from the frozen liquid contents. In some embodiments the diluting component may also act as the melting component. In some embodiments a diluting agent is heated and/or allowed to flow such that it complements an arbitrary melting component (e.g., an electric heater) to create a consumable liquid product with desired characteristics in a timely manner.

In some embodiments, water is heated to steam inside the dispenser and used as a means to externally heat the receptacle or the exit path for the melted/diluted fluid. In some embodiments, this external heat may be used at different levels (quantities) or locations based on different possible objectives. For example, these objectives could include, but are not limited to: (a) melting just the outer layer of the frozen liquid contents to allow it to be more easily displaced away from the closed end of the receptacle; (b) partially melting the bulk of the frozen liquid contents as a supplement to lower temperature water used for melting/dilution especially for juices and other beverages where a lower temperature final product is desired; (c) fully melting the frozen liquid contents as means for dispensing an undiluted melted liquid from the receptacle; (d) secondarily warming the melted/diluted beverage once it leaves the receptacle as it flows through the exit channel to a drinking cup or mug or other container to heat the final beverage to a more desirable temperature; (e) heating one of the needles used to perforate the receptacle to facilitate some level of easy penetration into the frozen liquid contents. In some embodiments, steam used for these purposes may be replaced by hot air or some other heated gas produced either inside the dispenser body or externally using electricity or some combustible fuel such as natural gas. The use of steam or a hot gas may provide a greater level of control in the heating/melting of the frozen liquid contents which may be especially important when cold beverages or food products are desired as the final consumable. This process also assumes a means for carefully metering/controlling the amount of steam or hot gas added to the total energy balance.

In some embodiments, a receptacle loaded into a dispenser is heated before puncturing the receptacle bottom. This allows the frozen liquid content to remain in contact with the bottom and sidewalls of the receptacle in order to increase the transfer of heat into the frozen liquid content. In such an implementation, the bottom of the receptacle is punctured after a selected time has passed, or after the receptacle has reached a selected temperature. The additional delay in perforating the closed end/bottom of the receptacle is intended to allow some amount of melting/diluting fluid to enter the receptacle and fully surround the frozen contents, filling any air gap between the sidewall and the displaced frozen content before an exit perforation is created. Doing so enables a continuation of the efficient transfer of heat from the receiver into the liquid and the frozen content without the insulating effects of an air gap.

Figure 13A:
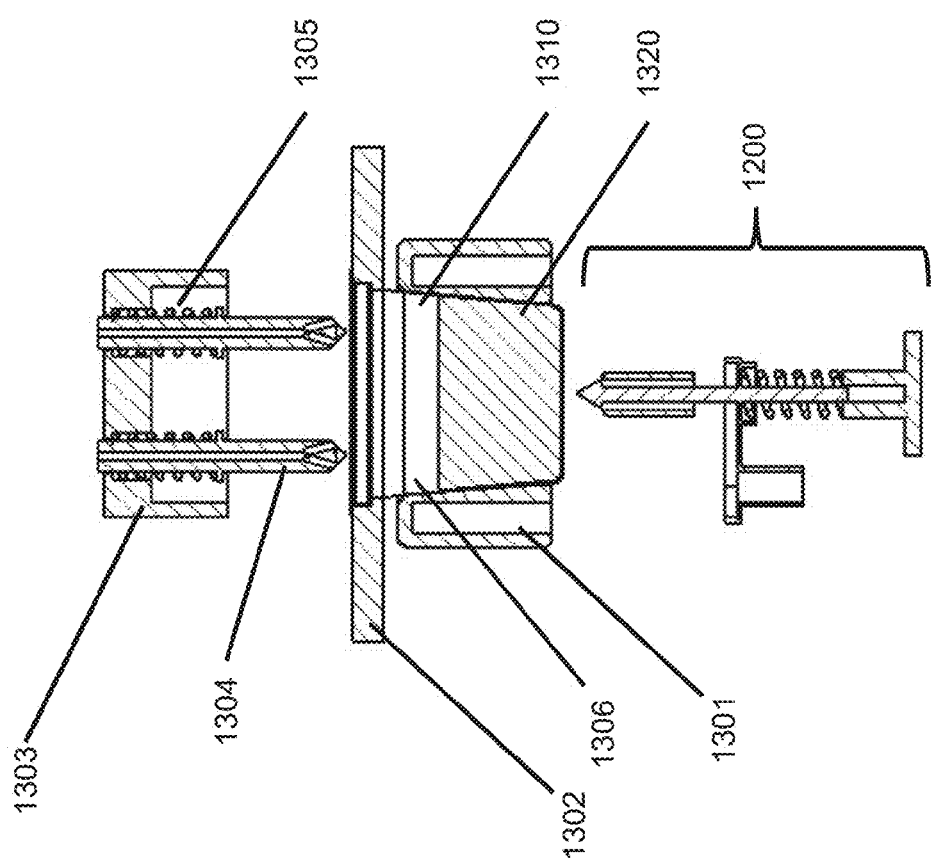
FIGS. 13A-13D illustrate a process for producing a food or beverage from a frozen liquid content, according to some embodiments.

In one embodiment, as shown in FIG. 13A, a filterless receptacle 1310 with frozen liquid content 1320 and a headspace 1306 is placed into a supporting tray 1302 and a heatable receiver 1301 of a dispenser designed to receive the receptacle so that the sidewalls of the receptacle 1310 are in close contact with the walls of the receiver 1301 and the flange of the receptacle is supported by tray 1302. When the dispenser's cover 1303 is closed by the user, the dispenser will capture and seat that receptacle in the close-fitting tray 1302 and receiver 1301. The receiver is heatable using any of the techniques disclosed herein, and the close contact between the receiver walls and the receptacle sidewalls enable the dispenser to efficiently heat the receptacle's contents.

Figure 13B:
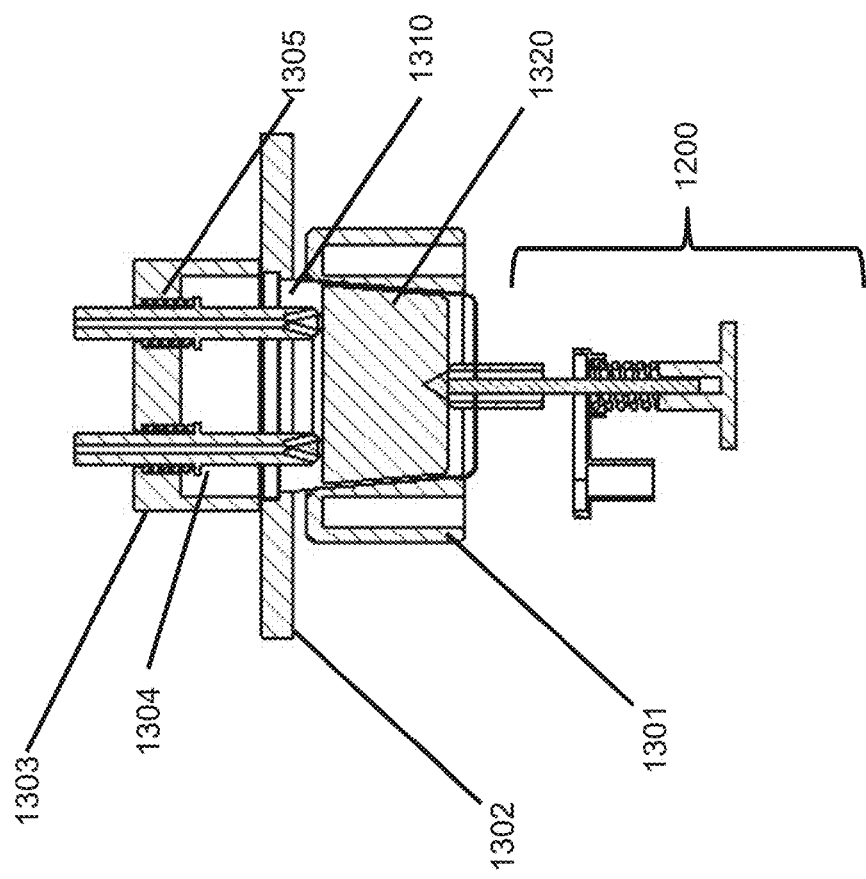

Referring to FIG. 13B, during closing of the receiver cover 1303, one or more spring-loaded supply needles 1304 penetrate the top lid of the receptacle, and one or more discharge needles 1200 penetrate the receptacle's bottom. The actuation of the needles can be powered by the manual force of the user closing the dispenser's receiver, or, alternatively, one or both of these actions can be done by a controlled actuator. As illustrated in FIG. 13B, these needles may also be made compliant with the help of a spring mechanism that limits the force applied by the needles in attempting to penetrate the frozen contents 1320.

Referring to FIG. 10E, in some embodiments, a blunt tip 1008 on the discharge needle 1000E displaces the receptacle's frozen liquid content away from the receptacle's closed bottom and into the tapered headspace, where it is supported by that same blunt-tipped discharge needle. In one implementation, this blunt discharge needle utilizes a T-shaped passageway 1009 with openings in the sidewall of the needle located closer to the receptacle bottom to allow dual discharge flow without interference from the supported frozen liquid content, thereby emptying/venting the receptacle. In a different embodiment, the exit needle is part of an assembly as shown in FIGS. 12A and 12B. The needle assembly is anchored by a part of the dispenser frame 1201 and comprises a penetrator 1203, a compression spring 1202, a dome-shaped needle housing 1204, and a fluid collecting tray 1205. When the needle assembly 1200 first penetrates the closed end of the receptacle, the penetrator 1203 bears against needle housing 1204 and seals it to prevent fluid exiting the receptacle. Subsequently, penetrator 1203 is forced upward by spring 1202, opening a channel on the inside of needle housing 1204, allowing fluid to exit the receptacle and be collected by tray 1205, and thereafter dispensed into the user's cup.

Meanwhile, sharp tip(s) of the spring-loaded supply needle(s) 1304 penetrate the receptacle's lid and come to rest against the recently displaced frozen content 1320, where they may be stopped from further penetration due to the interference between the needle tips and the top surface of the frozen liquid content. The dispenser's heatable receiver 1301 controllably warms and thaws the receptacle's frozen liquid content thereby softening the recently repositioned frozen liquid content within the receptacle, readying the frozen liquid content for additional thawing and/or dilution. In some embodiments, a measured portion of liquid is injected into the receptacle simultaneously with needle insertion to help transfer heat from the receiver through the gap created when the frozen contents was displaced away from the receptacle bottom (and, potentially, the sidewalls) to accelerate the melting process.

Figure 13C:
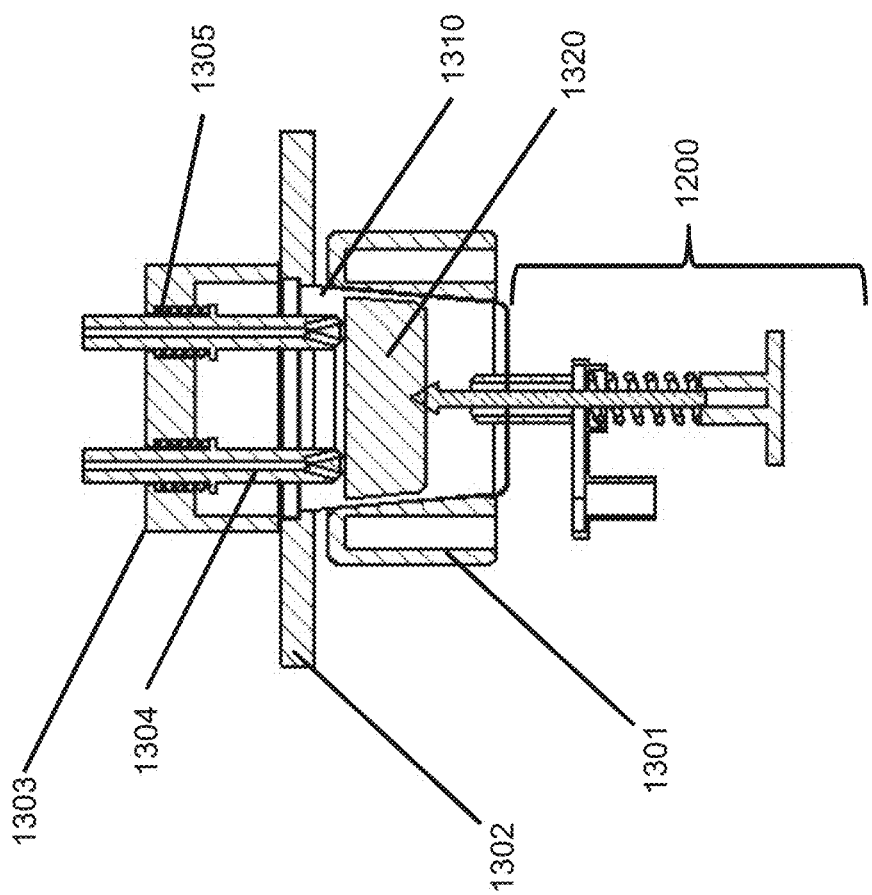

In some embodiments, the injection of liquid into the receptacle is delayed until the supply needle(s) move further into the frozen liquid content of the receptacle under the influence of the spring pressure behind them as the frozen liquid content is softened due to the heating. This action further thaws and/or dilutes the frozen liquid content. In some implementations, the contents controllably flow out the twin T-shaped passageway 1009 of the blunt discharge needle 1000E at this point. In other implementations, the discharge needle is closed along its flow path as shown in FIG. 12A, thereby preventing contents discharge until the supply needle(s) reach a selected deployment depth as shown in FIG. 13C. Likewise, the injection of liquid is delayed to prevent receptacle rupture and/or overflow.

Figure 13D:
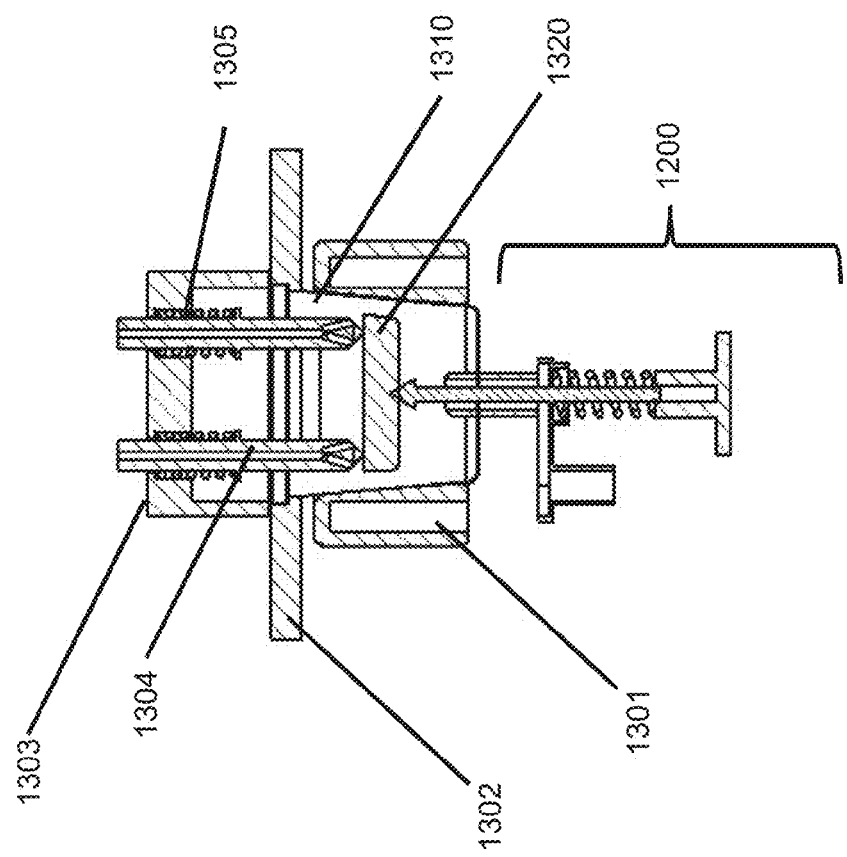

As the dispenser continues to thaw and dilute the frozen liquid content, the supply needle(s) extend fully by spring action to their fully deployed length as shown in FIG. 13D, which stops short of contacting the bottom of the receptacle. The supply needles may supply fluid within a range of temperatures and volumes as required by the food or beverage in the receptacle. In some embodiments, as shown in FIGS. 10C and 10D, these needles 1000C, 1000D have one or two internal passageways that are "L" shaped with an exit orifice that may direct the incoming fluid somewhat tangentially to the sidewall of the receptacle. This geometry is intended to controllably agitate the receptacle's frozen liquid content to provide better mixing, a cleaner spent cup, and to speed thawing through such mechanical agitation. This agitation inside the fixed receptacle can be rotational in any direction, or tumbling in an ever changing turbulent action, as designed by the needles' outlets and the flow control valves of the dispenser. Moreover, in some embodiments, the liquid is supplied to the supply needles in an alternating fashion so as to introduce a back and forth motion, a rotational motion, or other turbulent action. Such a liquid supply can be accomplished by the use of a multi-way valve controlled by the dispenser system.

Optionally, a locking mechanism keeps the springs compressed until a certain criteria is met, e.g., a quantity of heat has been applied to the receptacle in order to sufficiently soften and liquefy the frozen content such that the needles will penetrate the content. In a further implementation, heat, in the form of gas, liquid, or steam is supplied through the supply needle(s) upon initial deployment. The supply of gas, liquid, or steam is continued until the needle(s) are fully extended or until other criteria are met.

In some embodiments the variables of the melting component, or plurality thereof, and dilution components, or plurality thereof, are programmable and adjustable to create a wider range of characteristics for creating beverages and liquid food products. For example, decreasing the temperature of a pressurized liquid used for dilution will decrease the temperature of a consumable liquid product created by the machine-based system and apparatus.

In one specific example embodiment, presented for illustrative purposes only, a frozen 1 oz. coffee extract with a TDS of 12, may be packaged in a receptacle and accommodated by a machine-based system that expedites the melting of the frozen liquid contents by delivering heated water to the receptacle to melt and dilute the contents thereof with 7 ounces of 200 degree water to create a single-serving of 8 ounces of a hot coffee beverage with a TDS of 1.5 at a desired temperature. In some embodiments, other measurement techniques can be used in place of TDS, such as BRIX. Alternatively, with adjustable dilution settings, the frozen coffee extract may be melted and diluted with only 1 ounce of water to create a 2 ounce espresso style beverage of a desired temperature with a TDS of approximately 6. Furthermore, the receptacle may only be heated such that the frozen extract barely melts, such that it may be added to a consumer provided liquid, like milk for a chilled or iced latte or another iced beverage like a juice, iced coffee or tea.

In some embodiments, the variables defining the frozen liquid contents, like temperature, volume, shape, size, portionality, etc. can also be adjusted during manufacturing of the liquids used to freeze the frozen liquid contents to better facilitate making a desired food or beverage from a machine-based system with limited machine settings/controls. For example, freezing a larger volume of a less potent fluid as the basis for the frozen liquid contents in a given receptacle may be used to create a beverage of a lower temperature, ceteris paribus.

It may also be contemplated as part of the techniques described herein that the machine-based system includes sensor technology that can automatically adjust the settings of the melting and/or dilution component to produce a desired beverage or liquid food outcome. The perforation properties may also be programmable or automatically established using sensor technology that assists in recognizing the receptacle type, size, contents, bottom location and other properties. This sensor technology may also be used to inhibit certain settings from being applied. For example, a frozen broth concentrate receptacle may inhibit a consumer from implementing settings that would over-dilute and waste the product. As another example, a frozen broth concentrate receptacle may inhibit a consumer from implementing settings that would overheat, for example, an orange juice concentrate. In some embodiments, this sensor technology assists in creating a desirable product and eliminating human error. In some embodiments this sensor method is enabled using specific geometry formed into the receptacle. For example, as shown in FIGS. 8 and 9, an indentation of a specific length could be physically or optically sensed by the dispensing machine and this measurement used to convey information about the contents of the receptacle and thereby allow the dispensing machine to automatically choose the right melting/dilution process. Physical modifications to the shape of the receptacle as exemplified in FIGS. 8 and 9 may also assist in the mixing of the dilution liquid injected into the receptacle and thereby help to speed the liquefaction of the frozen liquid contents.

In some embodiments, the melting and/or diluting controls may be programmable or established using bar coded instructions or other visual data system on the receptacle to achieve a product satisfying a consumer's individual preference. The machine-based system may detect and read bar codes, data glyphs, QR Codes, RFID tags, or other machine-readable labels. In some embodiments at least one criterion of the receptacle or frozen liquid contents establishes or inhibits the settings of the accommodating machine-based system for creating a desired product. These criteria might include, but are not limited to, weight, color, shape, structure, and temperature. In some embodiments the machine-based system may include a thermocouple to detect the temperature of the frozen liquid contents and/or its receptacle and automatically adjust its settings to create a beverage of a desired flavor, strength, volume, temperature, and texture. This may include disabling the dilution function and engaging a melting component that does not dispense a liquid. Furthermore, the consumer may enter an exact desirable characteristic, like temperature or potency, and the machine-based system may use this in combination with available sensor technology to achieve desired parameters.

In addition, the machine-based system may be designed to create desirable beverage and liquid food products from a variety of receptacle styles, receptacle sizes and frozen liquid contents. In some embodiments, the machine-based system may include a mechanical function to distinguish and limit controls and settings for beverage creation.

Furthermore, the machine based system may include a mechanical function that is necessary for product creation for different receptacle and frozen liquid content types. In some embodiments the frozen liquid contents may be crushed or macerated by the machine-based system to increase the surface area of the frozen liquid contents to increase melting rates. This mechanical function may be initiated manually by the consumer or automatically implemented by a sensor trigger. For example, it has been contemplated herein that dislodging frozen liquid contents from receptacle walls may create issues and make it difficult to pierce the receptacle where it is in contact with the frozen liquid contents. In some embodiments the machine may recognize the specific frozen receptacle type, discriminating it from other frozen receptacles, using sensed criteria, like weight or temperature, and mechanically adjust the receptacle so it can be perforated in a specific location where no frozen liquid content is in contact with the receptacle. This may include flipping the receptacle upside down.

In some embodiments the machine-based system melts and dilutes the frozen liquid contents by flowing or pushing a specific amount of liquid, which may be heated and pressurized, through the receptacle to completely melt and dilute the frozen liquid contents to a desired flavor, strength, volume, temperature, and texture. In combination with this embodiment, the machine-based system may include an additional melting component, such as a receptacle heater, or heated puncture needles or the like, to facilitate the creation of a desired consumable liquid that the consumer does not desire to dilute. In some embodiments the flowing liquid melts the entire frozen liquid contents to eliminate waste and rinses the receptacle of any residue or contaminants as part of the melting or dilution process so that a receptacle of a homogeneous material is rendered free of grinds, residues, or filters, and is thus converted into an easily recyclable form. In some embodiments, focused specifically on recycling, the manufacturer would introduce a deposit requirement for each receptacle to encourage its return to the point of sale for a deposit refund.

In some embodiments the frozen food or beverage liquid is packaged to handle a flowing diluting liquid without an overflow. Again, this specific apparatus may involve freezing the food or beverage liquid into specific geometric shapes, structures, and proportionality to provide necessary flow paths through the receptacle to its exit.

For clarity, illustrative embodiments for different aspects of the system have been described with respect to the type and design of the receptacle, the nature of the frozen liquid content, the means for melting and/or diluting the frozen liquid content, and the delivery mechanism applied to the resulting liquid to create a consumable food or beverage on a just-in-time, consistent basis at the desired flavor, potency, volume, temperature, and texture. It will be apparent to one skilled in the art that these various options for receptacle type, form and characteristics of the frozen liquid content, mechanisms for melting and/or diluting the frozen liquid contents, and means for delivery of the liquefied contents can be combined in many different ways to create a pleasing final product with specific characteristics which can be conveniently enjoyed by the consumer.

It is clear from the above description that embodiments of the invention provide a filterless single chamber mixing vessel containing a frozen liquid contents that enables the creation of a diverse variety of food and beverage products. The receptacles are maintained as a sealed environment, optionally including an oxygen barrier, that preserves the final product, or a concentrated version thereof, in a frozen state until a user decides to create the product. Moreover, even after perforation by one or more inlets or outlets, the receptacle remains essentially a sealed mixing chamber in which a product is created by mixing a fluid or fluids with the frozen liquid contents while also providing for a controlled fluid outlet. Upon insertion into any of the dispenser embodiments described herein or other known single serving beverage makers/brewing systems, the receptacle functions as a filterless single chamber mixing vessel by accepting a melting and/or diluting liquid (e.g., water) that melts and combines with the frozen liquid contents to produce the desired product. Such use of embodiments of the receptacles described herein enables existing beverage makers/brewing systems to function as a dispenser without requiring a modification to the system, thereby allowing a user flexibility to use his or her existing system as a dispenser or brewer.

In certain embodiments, sufficient open space remains within the mixing chamber of the receptacle to allow the frozen liquid contents to be displaced into the open space of the chamber so as to not interfere with liquid inlets and outlets (e.g., needles) and/or incoming and outgoing liquid. In some embodiments, the frozen liquid contents in the receptacle occupy less than half of the total volume of the mixing chamber of the receptacle. In other embodiments, the frozen liquid contents occupy more than half of the total volume of the mixing chamber.

As described above, in certain embodiments, the frozen liquid contents are dislodged from the bottom of the receptacle by the action of a needle. Tapered sidewalls of the receptacle help the frozen liquid contents release from the bottom portion of the receptacle. The tapered sidewalls also provide for a flow path around the frozen liquid contents after the contents have been displaced into what was formerly the empty space of the receptacle. Another factor impacting the amount of force required to dislodge the frozen liquid contents is the size of the frozen liquid content itself. Relatively smaller frozen liquid contents will be in contact with relatively less interior surface area of the chamber, thereby reducing the amount of force required to dislodge the contents relative to larger frozen liquid contents.

Controlling the size of the frozen liquid contents imparts additional benefits. For example, by maintaining the frozen liquid contents size within a selected range or below a particular threshold, embodiments of the invention ensure that the frozen liquid contents are completely melted before the full volume of dilution liquid has passed through the receptacle. In such embodiments, the fluid passing through the receptacle after the frozen liquid contents have melted washes the interior of the receptacle and product outlet flow path clean of residue. Doing so both increases the recyclability of the receptacle and reduces contamination of the product outlet flow path. In addition, by keeping the size of the frozen liquid contents within a range or below a certain threshold, one can ensure that the final product achieves the proper temperature range for the particular product.

Meanwhile, controlling the degree of concentration of the frozen liquid contents (e.g., as measured by TDS and/or Brix) enables one to ensure proper final product strength in view of the size of the frozen liquid content and the amount of dilution liquid used. Relatively larger frozen liquid contents require a lower degree of concentration than relatively smaller frozen liquid contents for the same final product using the same dilution and melting liquid. The desired final product concentration also determines the degree of concentration of the frozen liquid contents, e.g., a 2 oz. espresso with a final TDS of 6 will require a relatively more concentrated frozen liquid contents than would an 8 oz. cup of coffee with a final TDS of 1.25. Further still, in some embodiments, the degree of concentration of the frozen liquid contents is high enough to enable the size of the frozen liquid contents to be small enough to permit an outlet needle from a dispenser or known brewer to pass through the frozen liquid contents, thereby enabling the needle to access the open space above the frozen liquid contents without interference from the contents. Thus, certain embodiments of the receptacles disclosed herein have a size and shape to fit in known single serving brewing systems that have known outlet needle penetration depths. Because these dimensions are known, these embodiments have frozen liquid contents that have a degree of concentration that enables the contents to be in contact with substantially the entire end layer of the receptacle while having a contents height that is less than the penetration depth of the needle. In this way, embodiments of the invention are customized for known single serving brewing systems based on the known dimensions and characteristics of those systems.

As mentioned above, certain embodiments described herein include a receptacle with a frozen liquid content disposed inside the receptacle cavity that is in contact with the bottom of the receptacle (the end layer). In these embodiments, a needle from a dispenser or brewing machine perforates the bottom of the receptacle and lifts frozen liquid content into the otherwise unoccupied space inside the receptacle. In order for the frozen liquid contents to be displaced by the needle, the frozen liquid contents must be of sufficient hardness (at its temperature when placed into the dispenser/brewer) to prevent the needle from embedding in the frozen liquid contents. If the needle embeds into the frozen liquid contents, the contents are not displaced from the bottom layer of the receptacle, and the exit flow path for the final product formed by the mixing of the frozen liquid contents and incoming liquid is blocked. Similarly, if the frozen liquid contents bends at the point of impact of the needle, the frozen liquid contents will not be released from the inner walls of the receptacle chamber. This, too, will result in blockage of the exit flow path. Thus, in certain embodiments of the invention, the frozen liquid contents is sufficiently hard that when force is applied to it with a dispenser needle (e.g., a hollow cylindrical needle of about 2.5 mm outer diameter with about a 4 mm long diagonal pointed section), the frozen liquid contents is dislodged from the inner surface of the receptacle rather than the needle embedding into the contents or the contents deflecting away from the needle without dislodging. The illustrative dimensions of the needle given above is not limiting, as the frozen liquid contents of these embodiments with work with other needle dimensions, including those with larger or smaller bores as well as those with non-cylindrical cross-sections.

It is believed that hardness levels of between about 1 and about 6 on the Mohs scale (at between about 0° F. and about 32° F.) provide sufficient hardness to dislodge from the inner surface of the receptacles described herein rather than experience the undesirable effects set forth above. Thus, certain embodiments of the invention have a hardness of between about 1 and 5 on the Mohs scale at between about 0° F. and about 32° F. Other embodiments of the invention have a hardness of between about 1 and 4 on the Mohs scale at between about 0° F. and about 32° F. Still other embodiments of the invention have a hardness of between about 1 and 3 on the Mohs scale at between about 0° F. and about 32° F. Further embodiments of the invention have a hardness of between about 1 and 2 on the Mohs scale at between about 0° F. and about 32° F. Certain embodiments of the invention have a hardness of between about 0.5 and 1.5 on the Mohs scale at between about 0° F. and about 32° F. Other embodiments of the invention have a hardness of between about 1.5 and 2.5 on the Mohs scale at between about 0° F. and about 32° F. Yet further embodiments of the invention have a hardness of between about 0.75 and 1.25 on the Mohs scale at between about 0° F. and about 32° F. In some embodiments, the hardness of the frozen liquid contents is enhanced by the addition of food-grade hardening agents, e.g., thickeners, stabilizers, and emulsifiers. Other examples include guar gum, agars, alginates, carrageenans, gum Arabic, locust bean gum, pectin, sodium carboxymethyl cellulose, various starches, and xanthan gum.

Figure 14A:
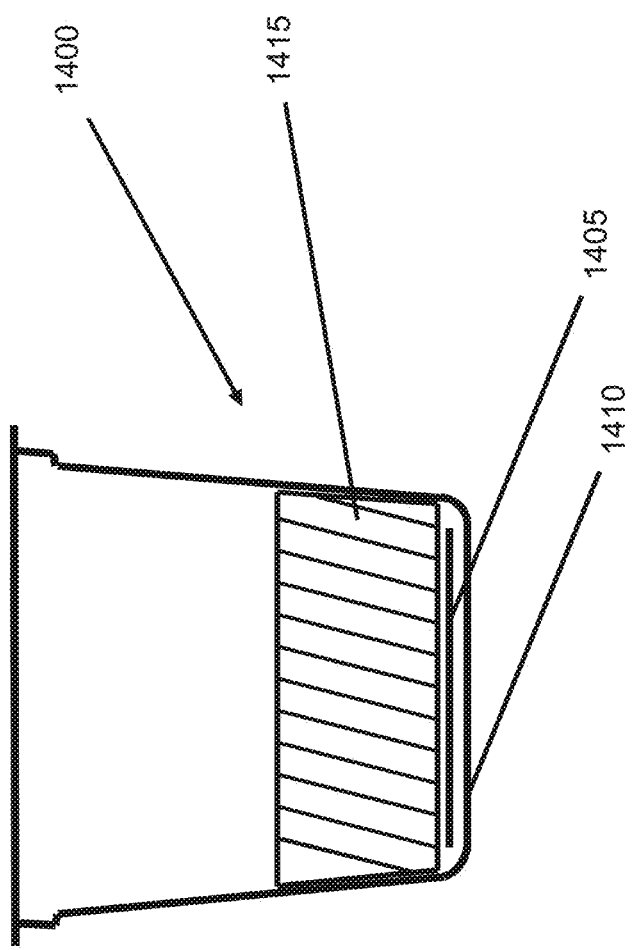
FIG. 14A illustrates a side cross-sectional view of a receptacle with an inner platform, according to some embodiments.

In certain embodiments, the frozen liquid contents will be of such a concentration (i.e., relatively high % TDS) that the contents will not be hard enough to be displaced by a dispenser or brewer needle, due to freezing point depression caused by, e.g., high sugar levels. Rather, the needle will embed into the contents, the contents will clog the needle, or the contents will flex away from the needle without dislodging from the receptacle chamber inner walls. FIG. 14A illustrates a side cross-section view of a receptacle 1400 with an inner platform 1405. The platform 1405 is located between an end layer 1410 of the receptacle 1400 and a frozen liquid contents 1415. In FIG. 14A, the platform 1405 is shown spaced apart from end layer 1410 and frozen liquid contents 1415. In some embodiments, the platform 1405 rests on and is in contact with the end layer 1410, and the frozen liquid contents 1415 is in contact with the platform 1405 and, optionally, a portion of the end layer 1410. Herein, this platform may also be referred to as a "platform", a "pusher plate", a "displacement disc", or simply a "disc".

Figure 14B:
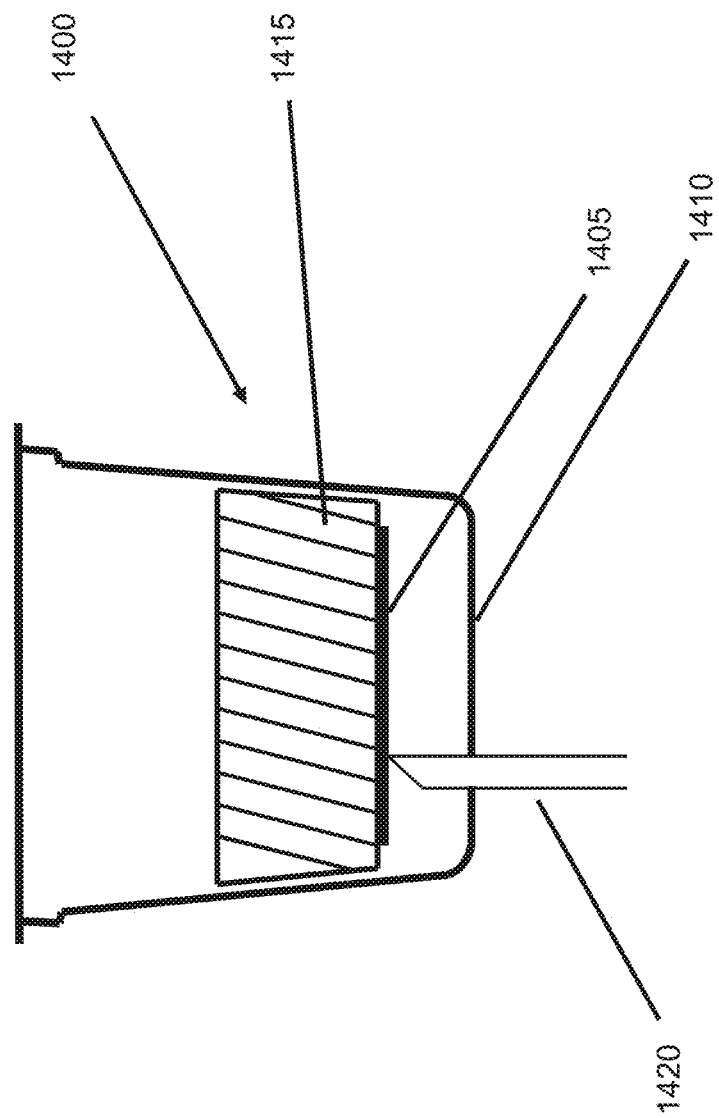
FIG. 14B illustrates a side cross-sectional view of a receptacle with an inner platform and a dislodged frozen liquid contents, according to some embodiments.

FIG. 14B illustrates a side cross-sectional view of the receptacle 1400 with the inner platform 1405 displaced away from the end layer 1410 and supporting the dislodged frozen liquid contents 1415. As shown in the figure, dispenser/brewer needle 1420 perforates the end layer 1410, but does not perforate platform 1405. Rather, the needle 1420 contacts the platform 1405 and dislodges the frozen liquid contents from the inner surface of the receptacle 1400. Thus, the platform 1405 enables frozen liquid contents to be displaced by a needle that on their own may otherwise lack sufficient hardness to be displaced by the needle. The various platforms described herein may also be used with frozen liquid contents that have sufficient hardness alone to be displaced through contact with a needle. Using a platform inside of the receptacle with a wide range of frozen liquid contents provides uniform displacement behavior. Platform 1405 is, optionally, made from the same material as receptacle 1400 to maintain the receptacle's recyclability (e.g., aluminum), but it may also be made from a different material than the receptacle to enhance its suitability for contact with food or for cost. The platform 1405 can be made harder than end layer 1410 by hardening treatments known in the art, and/or platform 1405 can be made of thicker material that end layer 1410. The platform may be made of a material known to have a higher or lower coefficient of friction than the receptacle material to aid in creating bypass flow around it or thru it.

Figure 14C:
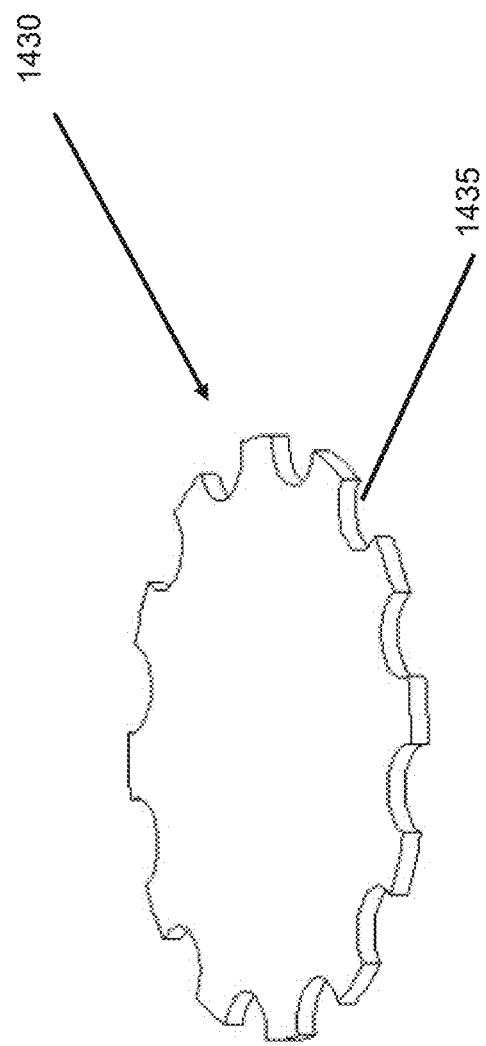
FIG. 14C illustrates a liquid frozen contents platform, according to some embodiments.
Figure 14D:
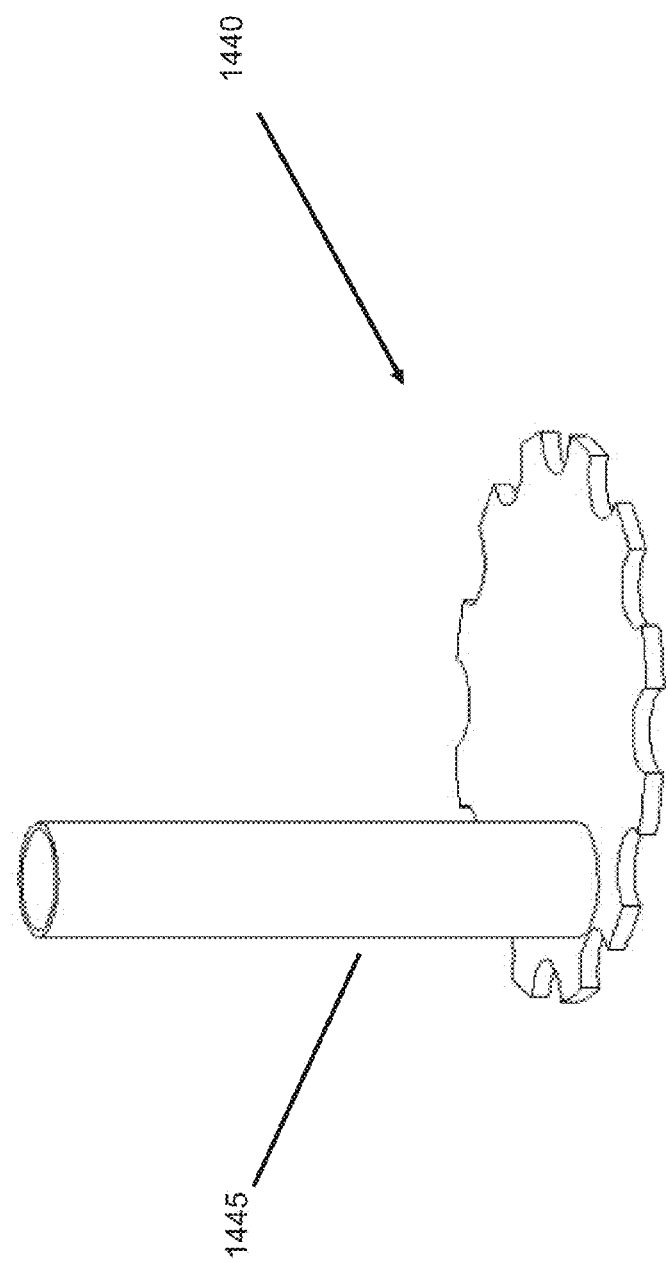
FIG. 14D illustrates a liquid frozen contents platform with an overflow tube, according to some embodiments.

FIGS. 14A and 14B show the platform 1405 as a flat disc. However, other embodiments include those shown in FIGS. 14C and 14D. FIG. 14C shows a platform 1430 with a scalloped circumference 1435, and FIG. 14D shows a scalloped platform 1440 with an overflow tube 1445. The overflow tube 1445 forms a channel between the space above a frozen liquid contents disposed on the platform 1440 and the space created below the platform when the platform is raised by the dispenser needle (e.g., as in needle 1420 of FIG. 14B) or a compressed gas or liquid. Further details describing the overflow tube 1445 follow below. Still further embodiments include platforms that are slightly concave or convex (relative to the end layer), frusto-conical, corrugated, have stamped convolutions, or possess other non-flat profiles. Such embodiments reduce the likelihood that the platform would adhere to the end layer and/or reduce the likelihood of acting as a barrier to liquid flow through an outlet formed in the end layer. Platforms 1430 and 1440 may be flat or possess any other non-flat profile. Platforms 1430 and 1440 may have smooth edges or scalloped edges as shown in the figure.

FIG. 15A shows an embodiment of a receptacle 1500 with a compound draft angle. Receptacle 1500 has a top flange diameter 1505 of about 2.00 inches, a bottom transition diameter 1510 of about 1.44 inches, and an end layer diameter 1515 of about 1.26 inches. Receptacle 1500 has a height 1520 of about 1.72 inches. Receptacle 1500 has a sidewall with a compound draft angle with a transition point 1525 that occurs about 0.75 inches from the end layer (1530). Above the transition point 1525, the draft angle 1535 is about 2.5 degrees, while the draft angle below the transition point 1540 is about 8 degrees. The greater draft angle in the lower portion of the sidewall facilitates release of frozen liquid content that rests on the end layer of the receptacle. Meanwhile, the lower draft angle of the upper section aids in securing the receptacle in a receiver of a dispenser and/or known single serving brewer.

FIG. 15B shows Detail A of the receptacle 1500 of FIG. 15A. This figure illustrates a rolled lip 1545 portion of the flange of the receptacle as well as an indentation 1550 that sits below the highest part of the rolled lip 1545. Certain materials, e.g., aluminum, will retain a sharp edge when machined or stamped. Such an edge can present a safety hazard to users of receptacles having such an edge. Rolled lip 1545 tucks the edge of the flange under the body of the flange, thereby protecting the user from any remaining sharp edges. Meanwhile, indentation 1550 allows a lid to be mounted to the flange body and maintain the top lid surface below the highest part of the rolled lip 1545. The specific sizes set forth above for receptacle 1500 can be varied while maintaining the compound draft angle and remain within the scope of the invention.

FIG. 16 illustrates a side cross-sectional view of a receptacle 1600 with a platform 1605 having an overflow tube 1610. Although platform 1605 is shown as a flat disc, it can be any of the shapes described herein. The receptacle has a flange diameter 1615 of about 2.00 inches and a height 1620 of about 1.72 inches. Receptacle 1600 has a sidewall with a compound draft angle with a transition point 1625 that occurs about 0.75 inches from the end layer (1630). Above the transition point 1625, the draft angle 1635 is about 2.5 degrees, while the draft angle below the transition point 1640 is about 15 degrees. The end layer of the receptacle 1600 has a stepped portion 1645 that accommodates the platform 1605 with little to no space between the outer circumference of the platform 1605 and the step. In the illustrated embodiment, the diameter of the platform 1650 and the stepped feature is about 1.16 inches. The close fit between the platform 1605 and the stepped portion 1645 reduces or prevents liquid contents from settling between the platform 1605 and the end layer 1675 before the contents is frozen, which could increase the amount of force required to dislodge the frozen liquid contents from the inner surface of the receptacle 1600 and allow frozen contents to flow into the bottom of the overflow tube 1610 blocking intended flow during the melting/dispense cycle. The close fit between the platform 1605 and the stepped portion 1645 acts to hold the platform firmly in place during liquid filling and until the liquid contents are frozen.

In other embodiments (not shown), a further stepped region exists below the platform 1605 to create a space between the platform 1605 and the end layer 1675 that is not occupied by frozen liquid contents. This space allows fluid to flow down the overflow tube 1610 and into the space between the platform and end layer in order to exit the receptacle through a perforation in the end layer.

In FIG. 16, the platform 1605 and overflow tube 1610 are show in cross-hatch to distinguish the platform and overflow tube from the end layer (bottom) 1675 of the receptacle 1600. The overflow tube 1610 is disposed inboard of a point about 0.50 inches from the receptacle center line (1655). This point is a common entrance point for one or more outflow needles of known single-serving and multi-serving brewers. Thus, when the outlet needle penetrates the end layer of the receptacle, the needle will lift the platform 1605 and frozen liquid contents (not shown) in a manner similar to that described for the embodiment in FIG. 14B rather than the needle entering the channel of the overflow tube 1610. The top of the overflow tube 1660 is above a nominal fill line 1665 for frozen liquid contents at about 0.50 inches from the top surface of the platform (1670). The specific sizes set forth above for receptacle 1600 can be varied while maintaining the compound draft angle and remain within the scope of the invention.

Figure 17:
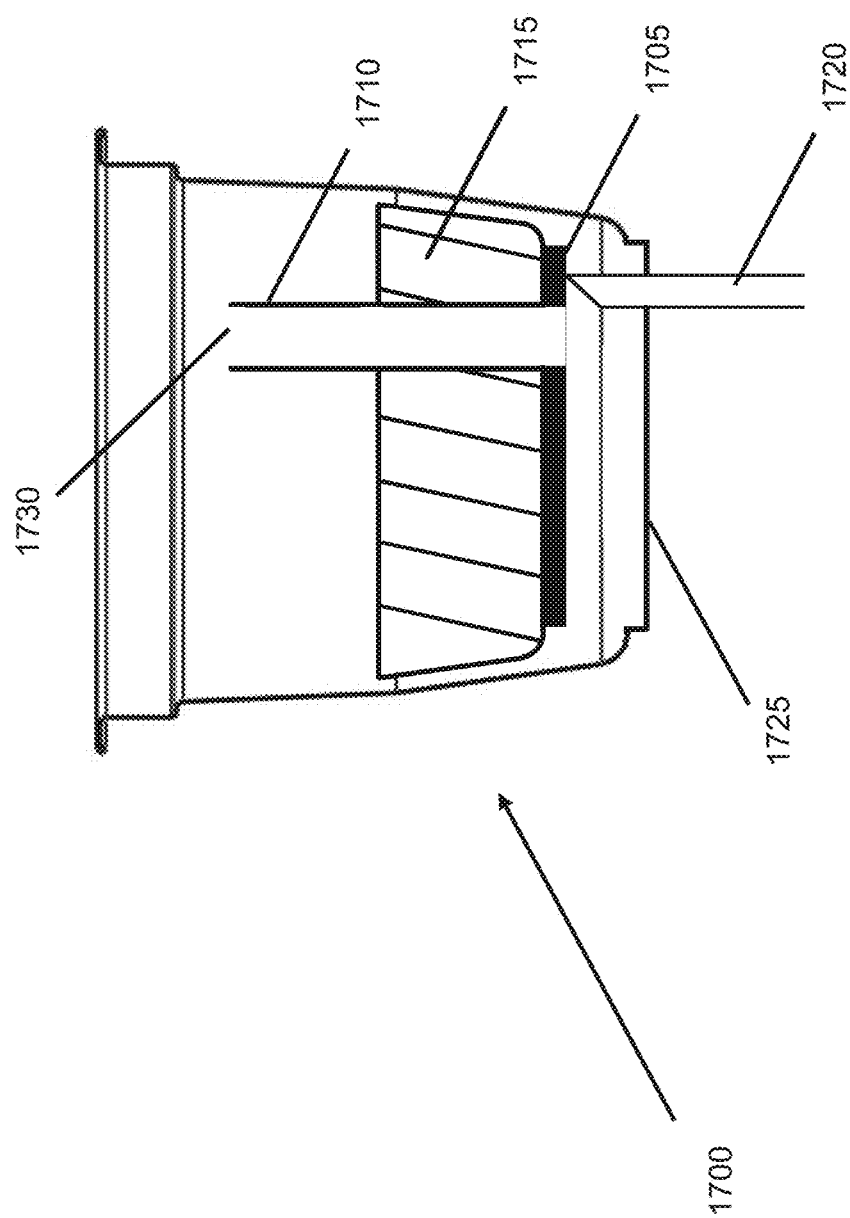
FIG. 17 illustrates a side cross-sectional view of a receptacle with a platform having an overflow tube, according to some embodiments.

FIG. 17 shows a receptacle 1700 with a platform 1705 and overflow tube 1710; a frozen liquid contents 1715 rests on the top surface of the platform 1705. This figure shows a needle 1720 of a dispenser or known single serving brewer that has penetrated an end layer 1725 of the receptacle 1700 and lifted the platform and frozen liquid contents. The overflow tube 1710 provides an alternate flow path for liquid injected into the receptacle 1700 (e.g., by an inlet needle that perforates a top lid (not shown)) in the event that the flow path around the frozen liquid contents becomes blocked or is insufficient for the incoming liquid flow. Rather than the excess liquid building-up inside the receptacle and overflowing outside the mixing chamber of the receptacle 1700, when the liquid level reaches the top inlet 1730 of the overflow tube 1710, the liquid is channeled to the space below the platform 1705 so it may exit via the needle 1720. During this process, water that is being introduced into the receptacle via a needle penetrating the lid must also be prevented from passing directly into the overflow tube, thereby defeating its purpose of melting and diluting the frozen contents. In certain embodiments, a needle geometry similar to that shown in FIG. 10C or 10D would be effective at directing the incoming water away from overflow tube 1610 and constructively toward the sidewalls of the receptacle.

Figure 18:
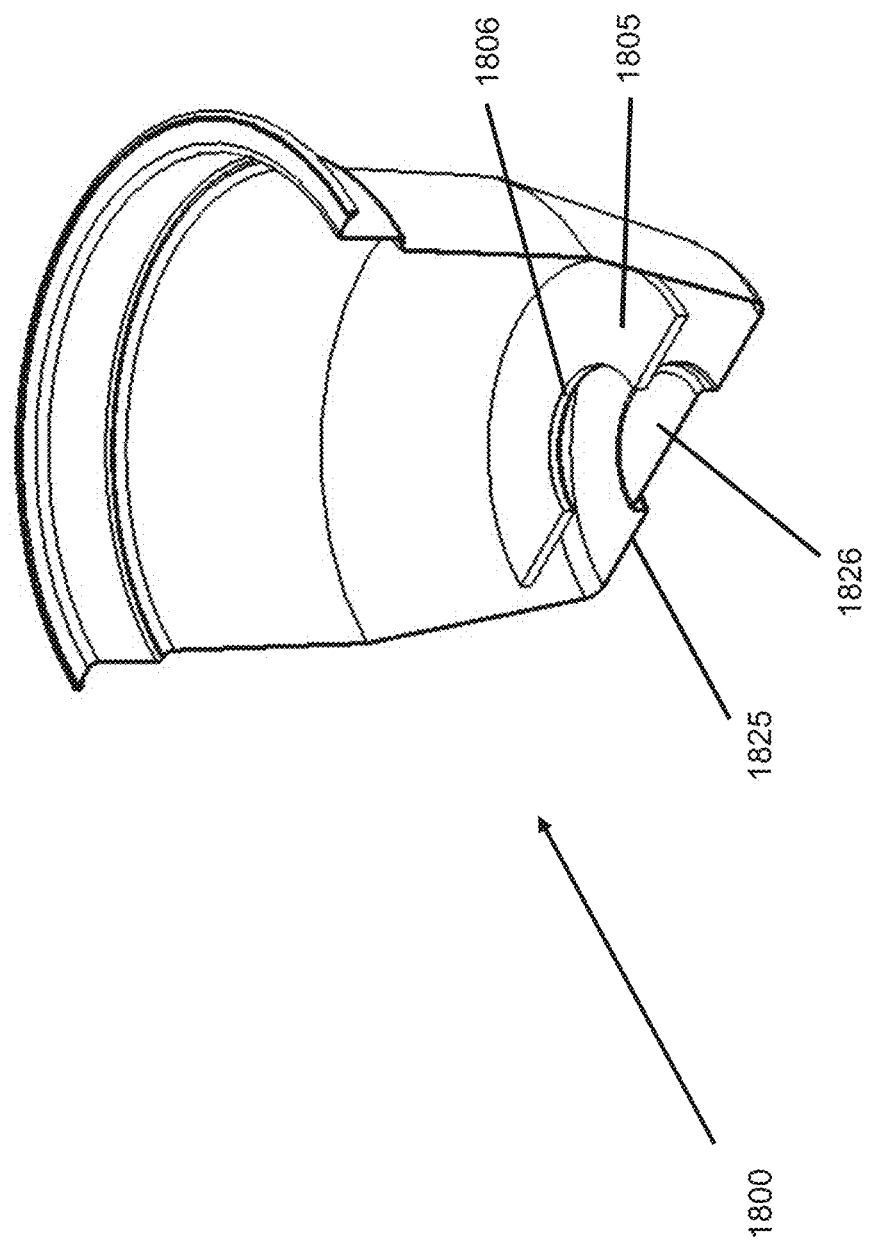
FIG. 18 illustrates a side cross-sectional view of a receptacle with an annular platform designed and sized to fit over a raised protrusion on the end layer of the receptacle, according to some embodiments.

FIG. 18 illustrates a receptacle 1800 with a raised circular protrusion 1826 (in essence, providing a depression 1825) in the end layer and an annular platform 1805 shown in a slightly raised position. This platform is designed and sized such that its center circular opening 1806 fits tightly around the raised protrusion 1826 in the receptacle during normal liquid filling and handling, with the friction created by a light interference fit between the two components holding the platform in place during filling and until the liquid contents have frozen. During use, the needle which penetrates the bottom of the receptacle dislodges the annular platform and helps displace the frozen contents to a second position. This annular shape for the platform serves the secondary function of reducing its weight and, when the platform is made from a different material than the receptacle, allowing the receptacle as a whole to be more easily recycled. For example, if a high density polyethylene (HDPE) platform is used in an aluminum receptacle, the recyclability of the entire assembly may be maintained, without requiring the platform to be separated from the receptacle, if the total percentage of HDPE in the receptacle assembly is kept below a threshold amount. In this embodiment, the size of the annular opening in the platform may be increased to the edge of the needle perforation zone to maximize weight reduction. Alternatively, the disc might be a hybrid design as, for example, a metallic washer shape enclosed in a plastic approved by the FDA for contact with food.

In some implementations, rather than, or in addition to, the interference fit between the platform and the raised protrusion 1826, the platform can have an interference fit between the circumferential edge of the platform and the sidewall of the receptacle. In these implementations, the platform can be any of the embodiments described herein.

Figure 19:
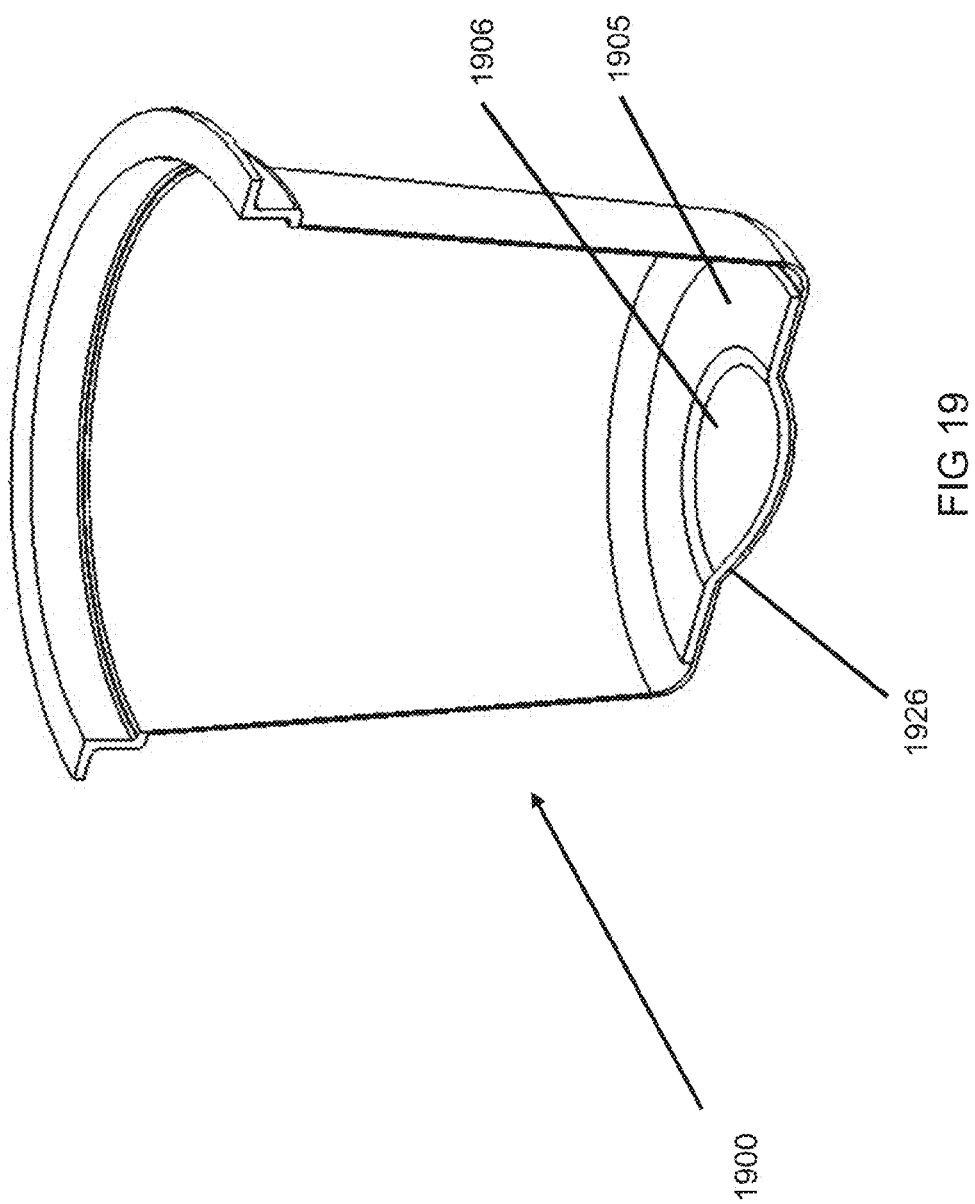
FIG. 19 illustrates a side cross-sectional view of a receptacle with a domed end layer, according to some embodiments.

FIG. 19 illustrates a receptacle 1900 with a domed end layer 1926 and a matching platform 1905 whose convex surface section 1906 is sized and designed to match the outward extension of the dome in the receptacle. Prior to insertion into a dispensing machine, or as part of the machine operation, the receptacle dome 1926 is intended to be pushed inward where it achieves a new stable position and holds or displaces the frozen contents into a second position with flow paths around its exterior surfaces. The convex surface 1906 of the platform is pushed upward, but does not reverse its position, i.e., does not become concave as seen from the closed end of the receptacle. Thus, in this embodiment the platform supports partially frozen or gummy/flexible contents in this raised position by bearing against the now inwardly protruding receptacle dome on the bottom and carrying the frozen contents above. Needle penetration from the bottom of the receptacle may assist in the displacement of the platform and the frozen contents. And as with other embodiments, the platform prevents the needle from being clogged by the partially frozen contents.

FIG. 20A illustrates the operation of receptacle 1900 shown in FIG. 19. In its initial position, domed end layer 1926 is in the convex configuration, which conforms to the convex surface of the platform 1905. In its second position, shown in FIG. 20B, domed end layer 1926 is in the concave configuration. A portion of the concave end layer interferes with the still convex portion of the platform 1905 to create a space 1930 between the bottom surface of platform 1905 and the top surface of the end layer 1926. This interference also creates and maintains flow paths 1935 around the frozen contents that rests upon the top of the platform 1935. Either or both of the domed sections of the end layer and platform can be bistable.

FIG. 21 illustrates a receptacle 2100 with a flat end layer and a flat platform 2106 supporting partially melted frozen contents 2126, held in place by the bottom needle 2105. This figure clearly shows a flow path 2128 around the frozen contents when the platform is raised off the end layer. In this particular embodiment, the frozen content is seen to have shifted slightly off-center of the platform and coming to rest against the side of the receptacle. In some embodiments, to prevent the platform from moving out of place, the edge 2127 in contact with the end layer is physically attached with a hinge mechanism such as a small spot weld (e.g., to create a living hinge). This embodiment may also require a keying feature such that the bottom needle always penetrates the end layer diametrically opposite the hinge.

In some embodiments, the platform includes ridges in order to increase the section moment of inertia of the platform to thereby increase the platform's resistance to deformation. As shown in FIG. 22A, one such embodiment 2205 includes single direction ridges 2210. Another embodiment 2215, shown in FIG. 22B, includes a cross-hatch pattern 2220. FIG. 22C shows an platform 2225 that includes sandwich structures 2230 with ridges set at perpendicular orientations to provide increased bending stiffness in all directions. A similar effect can be achieved by layering materials having anisotropic rigidity. FIG. 22D shows a platform 2235 that includes radial ridge structures 2240. In some implementations, the ridge height is kept sufficiently low and the ridges are spaced sufficient close together so as to not interlock with a needle contacting the platform.

In further embodiments, the platform is maintained above the end layer so that some amount of the frozen contents is between the bottom surface of the platform and the top surface of the end layer. In these embodiments, the distance between the bottom surface of the platform and the top surface of the end layer is kept to a maximum such that a needle or other perforator is able to pass through the frozen contents, contact the platform, and still lift the platform sufficiently to create flow paths around the frozen contents.

Figure 23:
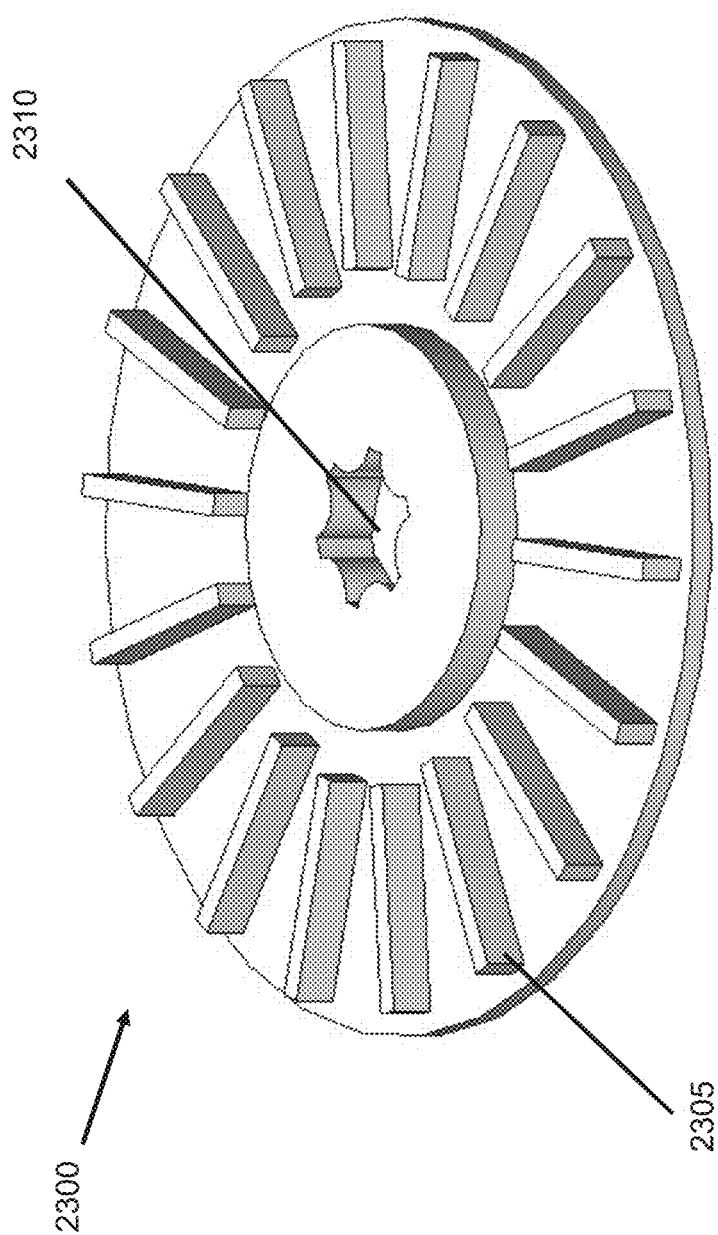
FIG. 23 illustrates a platform with mixing tabs protruding from the surface of the platform, according to some embodiments.
Figure 24:
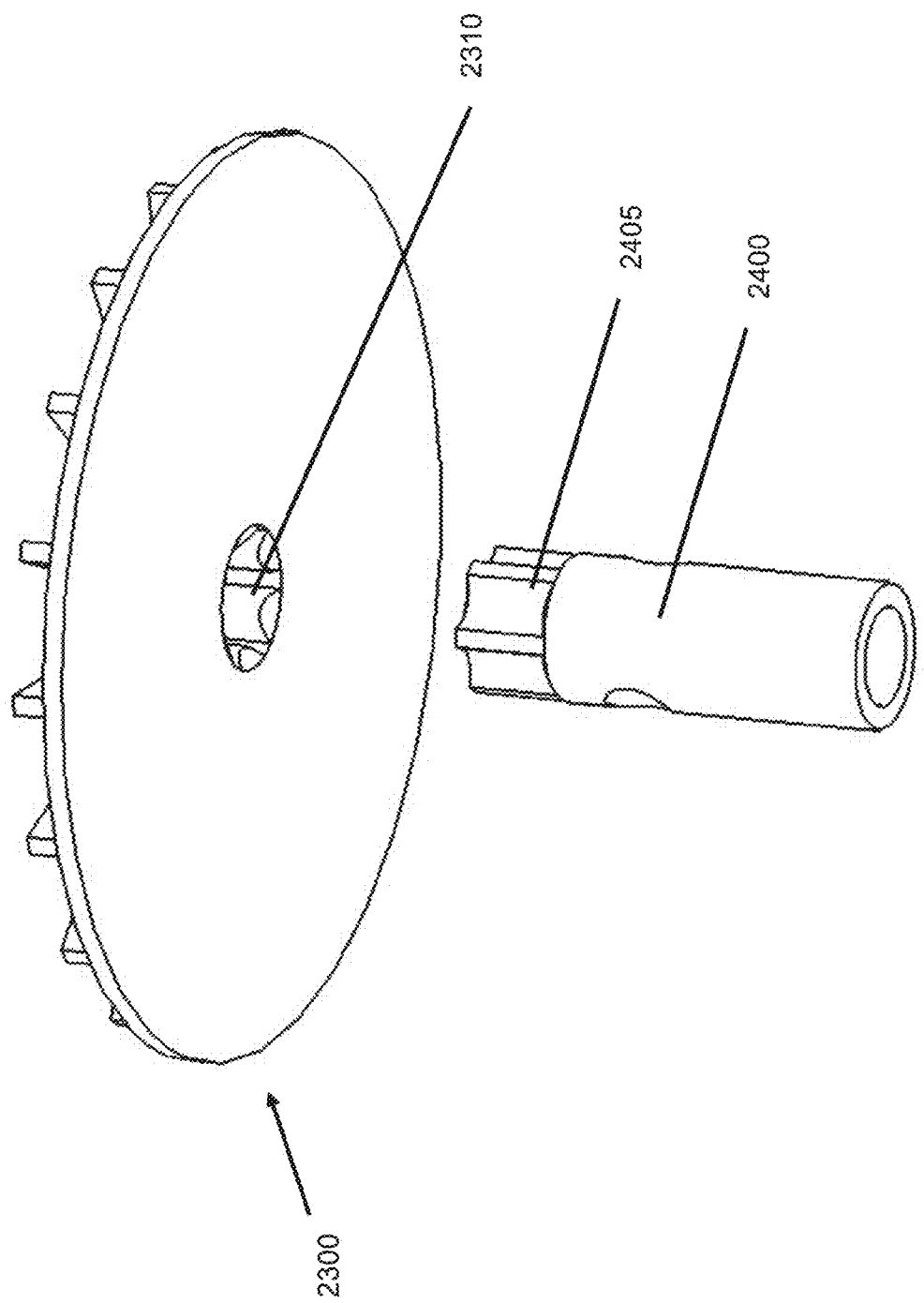
FIG. 24 illustrates an underside view of a frozen content mixing platform preparing to engage a perforator, according to some embodiments.
Figure 25:
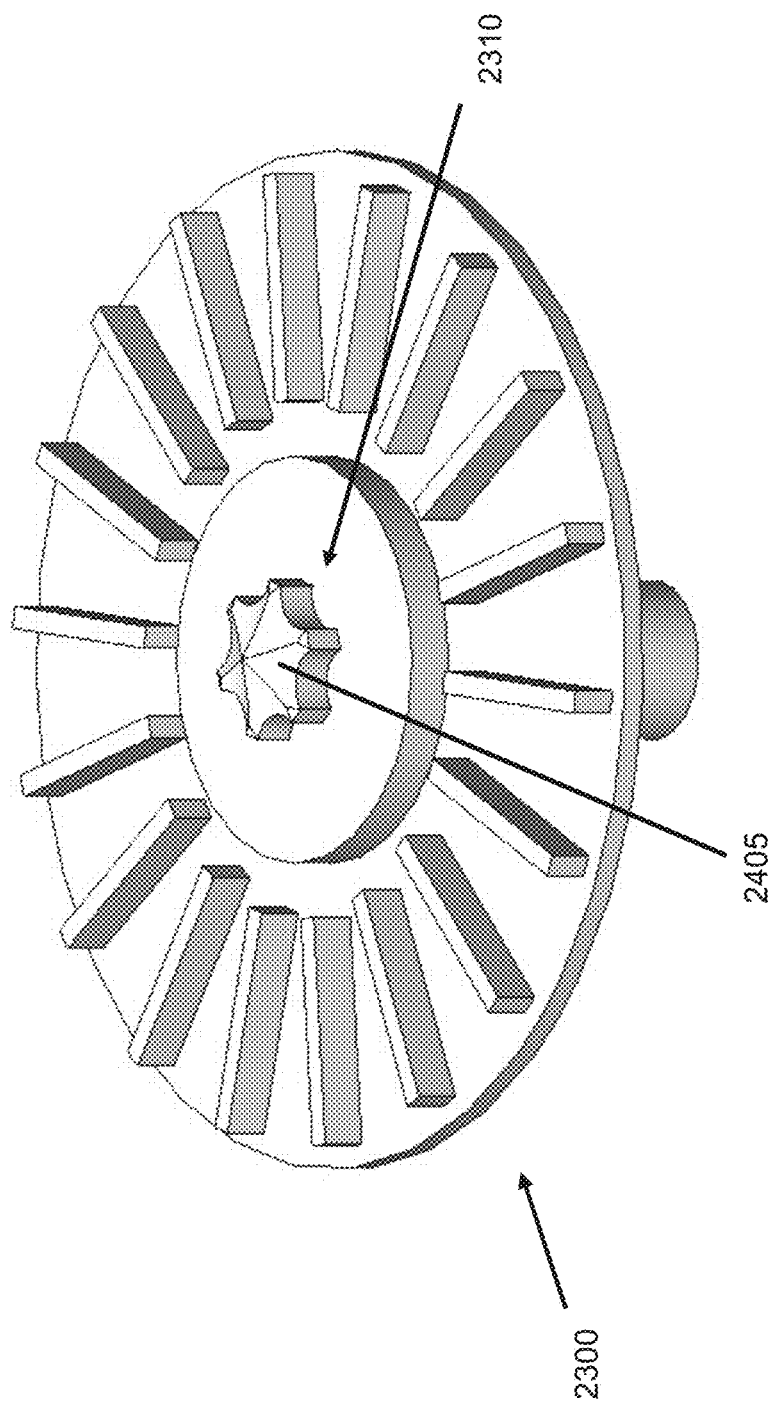
FIG. 25 illustrates engagement between a perforator and a frozen content mixing platform, according to some embodiments.

In other implementations, the platform includes embossing or slightly raised features which assist with melting and mixing the frozen contents with a melting liquid introduced into the receptacle when the assembly is rotated or agitated. In certain implementations, a perforator is designed to engage the platform to impart agitation or a stirring action. For example, as shown in FIG. 23 the top surface of a platform 2300 may have "tabs" 2305 that extend perpendicular to the top surface of the platform. Platform 2300 also has a keyed opening 2310 along its central axis. Keyed opening 2310 is shown in the figure as passing through the entire platform, however, in some embodiments, the opening is closed on the top surface of the platform that is in contact with the frozen liquid contents to prevent frozen contents from filling the opening. FIG. 24 shows an underside view of the platform 2300. A perforator 2400 has a keyed portion 2405 that has a shape that is complementary to keyed opening 2310 of the platform. FIG. 25 shows the keyed portion 2405 of the perforator engaged with the keyed opening feature 2310 of the platform 2300. This allows the perforator to impart a spinning, reciprocal, or other agitating motion to the platform by way of a drive mechanism such that the perforator spins the platform and frozen contents within the receptacle.

FIG. 26 shows a cross-sectional view of a receptacle 2600 with a frozen liquid contents 2605 disposed on a platform 2610 that has tabs and a keyed opening, as described above. The figure shows a perforator 2615 with a keyed portion 2620 positioned to perforate an end layer of the receptacle 2600. FIG. 27 shows a cross-section view of the receptacle 2600, with frozen liquid contents 2605, disposed on platform 2610. Perforator 2615 has perforated the end layer of the receptacle and engaged the platform via the keyed opening of the platform and keyed portion of the perforator (at 2700). The perforator 2615 has raised the platform 2610 and frozen liquid contents 2605 to create space between the platform and end layer as well as to create flow paths around the frozen liquid contents 2705. When the receptacle 2600 and/or platform 2610 are rotated about its central axis by the perforator 2615, the tabs encourage the frozen contents 2605 to spin with the receptacle. As the frozen contents releases from the platform and liquid covers the top surface of the platform, the tabs introduce turbulence in the liquid and encourage mixing of still frozen portions of the frozen contents and the liquid in the receptacle. FIG. 28 shows receptacle 2600 of FIG. 27 after some of the frozen liquid contents 2605 has melted, exposing a portion of tabs 2805 embedded in the frozen contents.

Figure 29B:
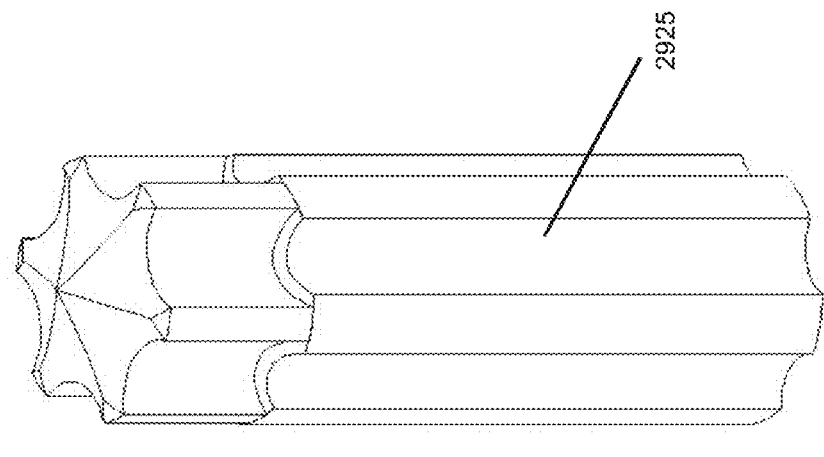
FIGS. 29A and 29B illustrate perforator internal and external channels permitting liquid flow, according to some embodiments.
Figure 29A:
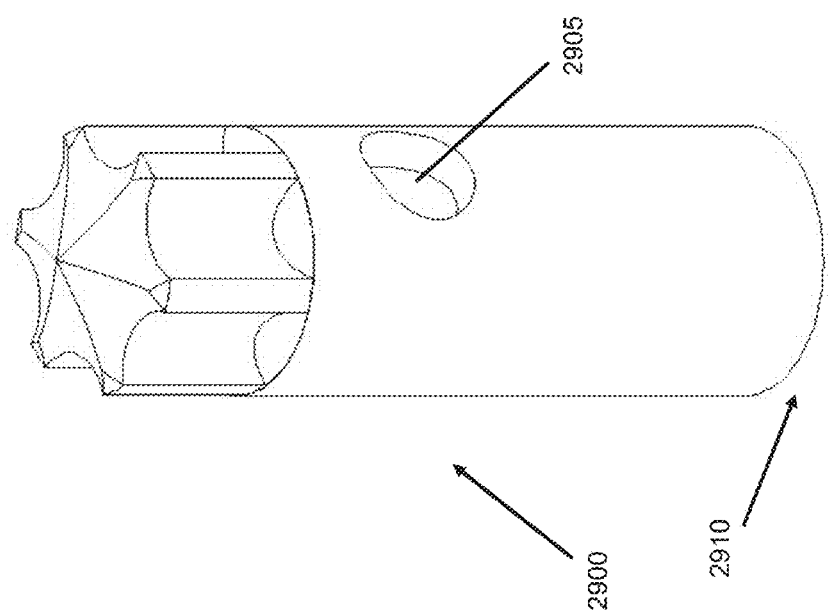

FIG. 29A shows a perforator 2900 with an opening 2905 along the length of the perforator. Opening 2905 communicates with one or more lumens in the perforator (not shown) to allow liquid to exit the receptacle via an opening 2910 at the base of the perforator 2900 that communicated with the lumen(s). Similarly, FIG. 29B shows a perforator 2920 that has channels 2925 on the outside of the perforator to enable liquid to exit the receptacles along the channels.

Figure 30B:
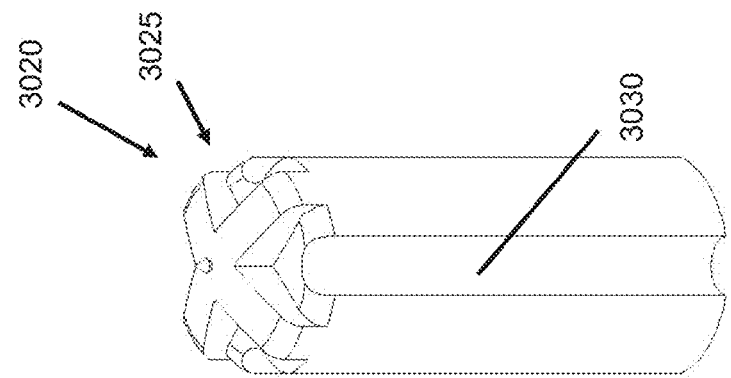
FIGS. 30A-D illustrate various perforators having channels or shapes to permit liquid flow through or past the perforator, according to some embodiments.
Figure 30A:
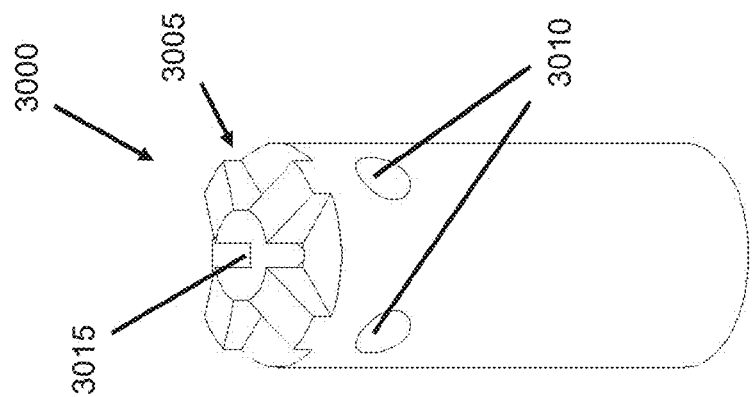
Figure 30D:
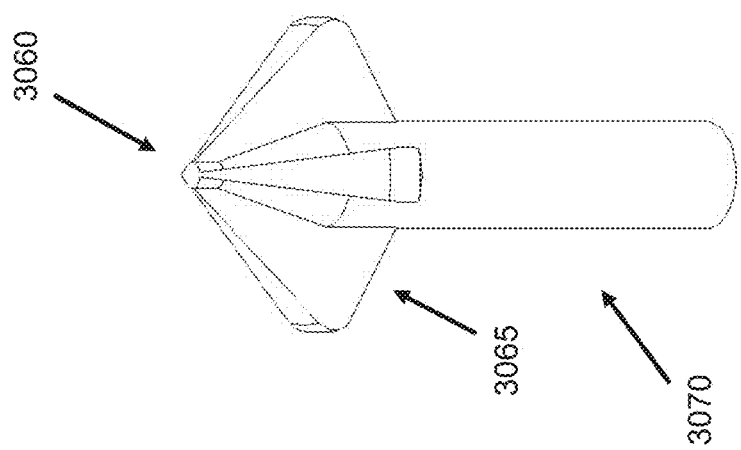
Figure 30C:
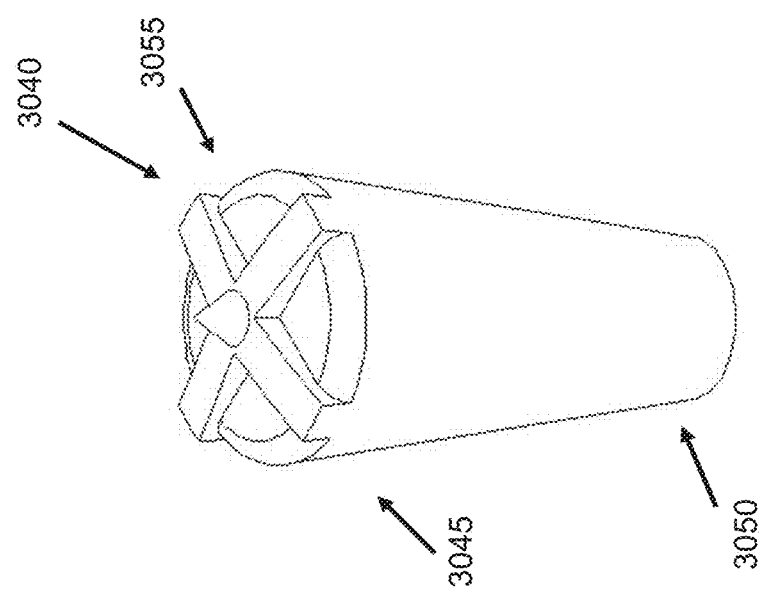

FIG. 30A shows a perforator 3000 that has a cruciform keyed portion 3005, side openings 3010, and a top opening 3015. Side openings 3010 and top opening 3015 communicate with a central lumen that passes through the perforator to a base of the perforator. FIG. 30B shows a perforator 3020 that also has a cruciform keyed portion 3025. Perforator 3020 has channels 3030 along the outside surface of the perforator. FIG. 30C shows a tapered perforator 3040 with a greater dimension at its distal end 3045 relative to the dimension at its proximate end 3050. Perforator 3040 also has a cruciform keyed portion 3055. Such a perforator would create a hole in an end layer of a receptacle that is larger than the proximate portion of the perforator, thereby leaving a flow path around the perforator for liquid to exit the receptacle. Similarly, FIG. 30D shows a perforator 3060 that has a cruciform head portion 3065 that has a larger dimension than a stem portion 3070. The head portion 3065 creates an perforation that is larger than the stem's diameter, creating a flow path for liquid to exit a receptacle. The cruciform portions of the above described perforators are designed to engage cruciform-shaped opening in platforms.

Figure 31:
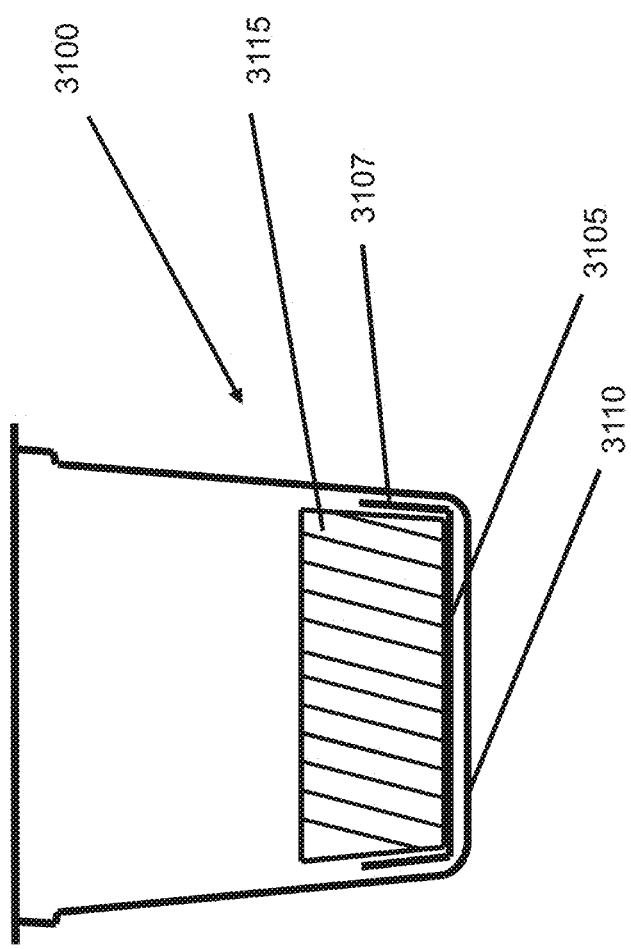
FIG. 31 illustrates a side cross-sectional view of a receptacle with a raised lip, according to some embodiments.

FIG. 31 illustrates a side cross-section view of a receptacle 3100 with an inner platform 3105 that is in the form of a cup with a raised lip 3107. Raised lip 3107 is shown spaced apart from frozen liquid contents 3115 and the side wall of the receptacle for illustration purposes only. In the envisioned embodiments, the raised lip 3107 may contact the receptacle side wall or be spaced apart. Moreover, the frozen liquid contents may contact the interior of the raised lip 3107. Raised lip 3107 may extend only partially along the side of the frozen contents, or the raised lip may extend to the top of the frozen contents or beyond. The platform 3105 is located between an end layer 3110 of the receptacle 3100 and the frozen liquid contents 3115. The platform 3105 is shown spaced apart from end layer 3110 and frozen liquid contents 3115. In some embodiments, the platform 3105 rests on and is in contact with the end layer 3110, and the frozen liquid contents 3115 is in contact with the platform 3105 and, optionally, a portion of the end layer 3110. In some implementations, the raised lip 3107 has an interference fit with the side wall of the receptacle, while still enabling the platform to be displaced from its position near the end layer. In some embodiments, the material of the platform 3105 and/or raised lip 3107 is perforated so as to enable any liquid remaining in the space defined by the platform and raised lip to drain.

Any of the receptacle embodiments disclosed herein can, optionally, possess a coating on the inner surface of the mixing chamber formed by the receptacle to promote ease of release of the frozen liquid content from the inner surface. Considerations for selection of the coating include that the coating must be food safe and not exhibit unacceptable levels of chemical leaching into the frozen liquid contents during storage or into the product during the melting and/or diluting process. Similarly, it must not absorb desirable flavor and aroma compounds or oils from the frozen contents, especially during filling and dispensing operations when the contents are in liquid form. Other factors include that the coating must have a favorable coefficient of static friction, porosity measure, and surface roughness measure so as to reduce the force required to release the frozen liquid contents from the receptacle relative to an uncoated surface. The coating must maintain the aforesaid desirable characteristics under the temperature range to which the receptacle will be exposed (e.g., about −20° F. to about 212° F.) In some embodiments, the coefficient of static friction of the coating ranges from 0.05 to 0.7. In other embodiments, the coefficient of static friction of the coating ranges from 0.3 to 0.4. In other embodiments, the coefficient of static friction of the coating ranges from 0.1 to 0.2. In other embodiments, the coefficient of static friction of the coating ranges from 0.05 to 0.1. In other embodiments, the coefficient of static friction of the coating ranges from 0.08 to 0.3. In other embodiments, the coefficient of static friction of the coating ranges from 0.07 to 0.4. In other embodiments, the coefficient of static friction of the coating ranges from 0.1 to 0.7. In some embodiments, the coating includes one or more of polypropylene, ultra-high-molecular-weight polyethylene, polytetrafluoroethylene, fluorinated ethylene propylene, high-density polyethylene, low-density polyethylene and/or mixtures and/or co-polymers of these materials, e.g., polypropylene/polyethylene mixture.

In one embodiment of the invention, a receptacle having any one of the geometries disclosed herein contains a frozen liquid contents that is sized to permit at least 5 mm of space between the frozen liquid contents and the end layer (bottom) of the receptacle while also maintaining at least 5 mm of space between the frozen liquid contents and the cover layer (top) of the receptacle when the contents are displaced from the end layer. In this embodiment, the frozen liquid contents is further sized to provide a final beverage product at a temperature between about 140° F. and 190° F. when the contents (at 15° F.) are combined with 8 ounces of water at 195° F. Further in this embodiment, the frozen liquid contents has a concentration level so as to produce a coffee beverage having a final product strength of between 1.15 TDS and 1.35 TDS when combined with 8 ounces of water. Still further in this embodiment, the frozen liquid contents (at a temperature between 0° F. and 32° F.) has a hardness level such that force from a dispenser and/or known single serve brewer needle (e.g., a hollow needle of about 2.5 mm outer diameter with about a 4 mm long diagonal pointed section) contacting the contents dislodges it from the inner surface of the receptacle rather than embedding in the contents or displacing only a portion of the contents away from the receptacle's surface. In other embodiments, the spacing between the frozen liquid contents and the top and bottom of the receptacle is at least 7 mm. In still other embodiments, the frozen liquid contents has a concentration level so as to produce a coffee beverage having a final product strength of about 1.25 TDS when combined with 8 ounces of water.

Figure 32:
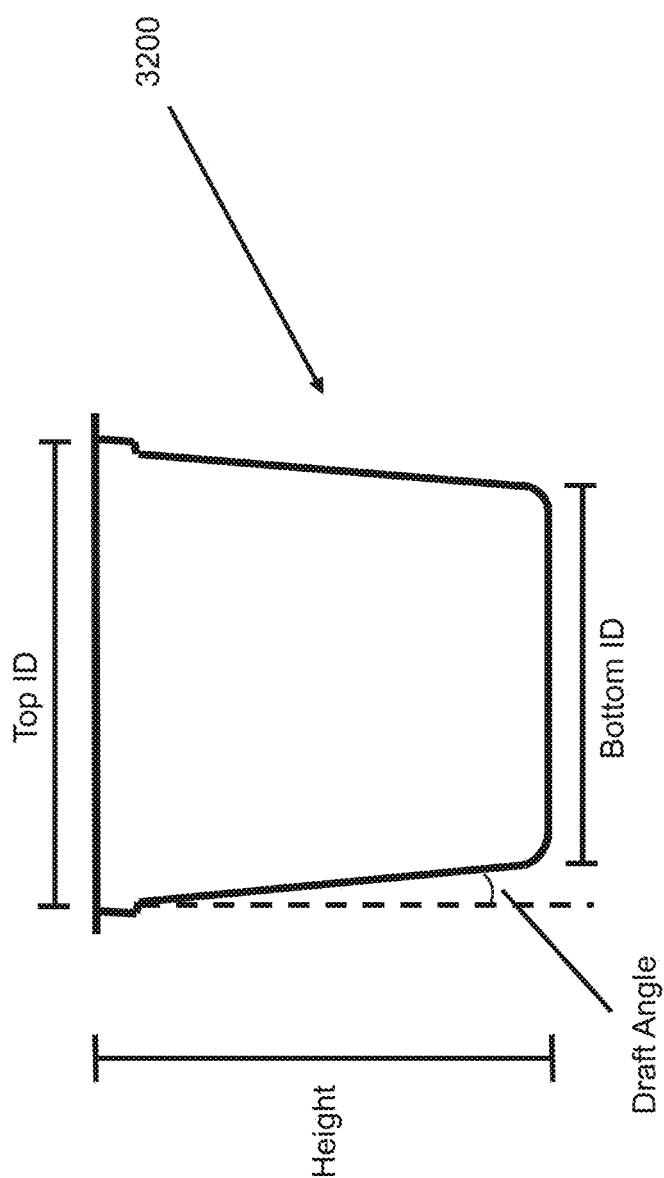
FIG. 32 illustrates a side cross-sectional view of a receptacle, according to some embodiments.

In addition to the receptacle geometry illustrated in FIG. 16, embodiments of the invention include tapered cylindrical receptacles having a profile similar to that of receptacle 3200 shown in FIG. 32 and having heights ranging from 1.65 inches to 1.80 inches, top inner diameters (Top ID) ranging from 1.65 inches to 2.00 inches, draft angles ranging from 4 to 6 degrees, and bottom inner diameters (Bottom ID) ranging from 1.30 inches to 1.75 inches (while maintaining the draft angle within the recited range.) In certain embodiments, the height ranges from 1.70 inches to 1.75 inches, the Top ID ranges from 1.70 inches to 1.95 inches, the draft angle ranges from 4 to 6 degrees, and the Bottom ID ranges from 1.35 inches to 1.70 inches (while maintaining the draft angle within the recited range.) In other embodiments, the height ranges from 1.65 inches to 1.80 inches, the Top ID ranges from 1.75 inches to 1.90 inches, the draft angle ranges from 4 to 6 degrees, and the Bottom ID ranges from 1.40 inches to 1.65 inches (while maintaining the draft angle within the recited range.) In still further embodiments, the height ranges from 1.65 inches to 1.80 inches, the Top ID ranges from 1.80 inches to 1.90 inches, the draft angle ranges from 4 to 6 degrees, and the Bottom ID ranges from 1.45 inches to 1.60 inches (while maintaining the draft angle within the recited range.) In one embodiment, the height is about 1.72 inches, the Top ID is about 1.80 inches, the draft angle is about 5 degrees, and the Bottom ID is about 1.45 inches. Other ranges of these parameters are within the scope of the invention.

Figure 33:
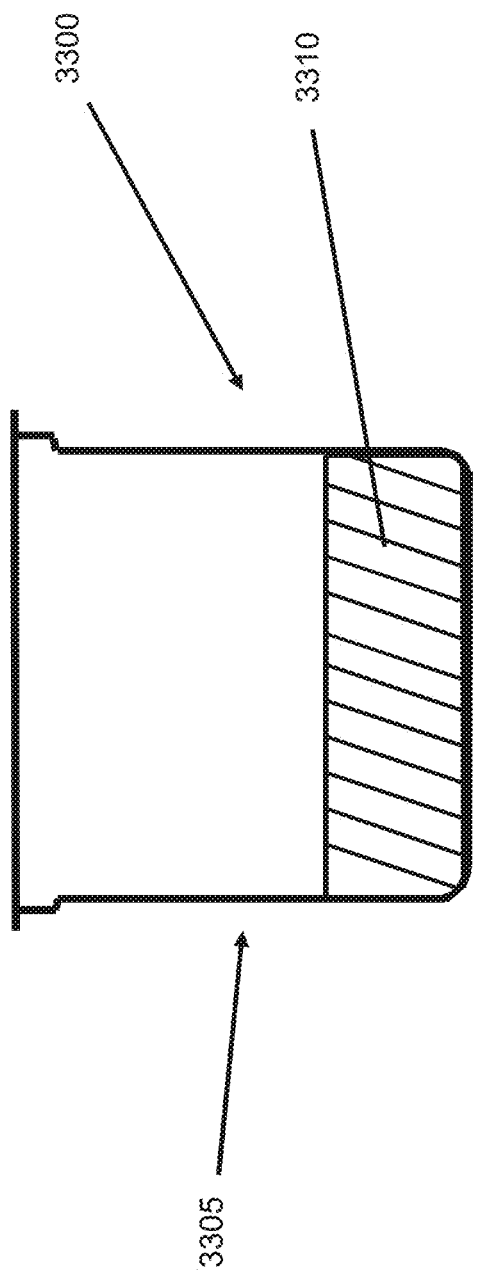
FIG. 33 illustrates a side cross-sectional view of a receptacle, according to some embodiments.

Various embodiments of the receptacles described above disclose a tapered sidewall. However, other embodiments of receptacles have straight sidewalls. FIG. 33 shows a cross-sectional view of a receptacle 3300 with straight sidewalls 3305 that have a uniform diameter from the top end to the bottom end of the receptacle. Embodiments having straight sidewalls can incorporate any of the various platform features described above. When using such embodiments to create a final food or beverage product, a dispenser can at least partially melt the frozen contents 3310 in order to provide a flow path from an inlet near the top of the receptacle, past the frozen contents, to an outlet near the bottom of the receptacle.

Figure 34:
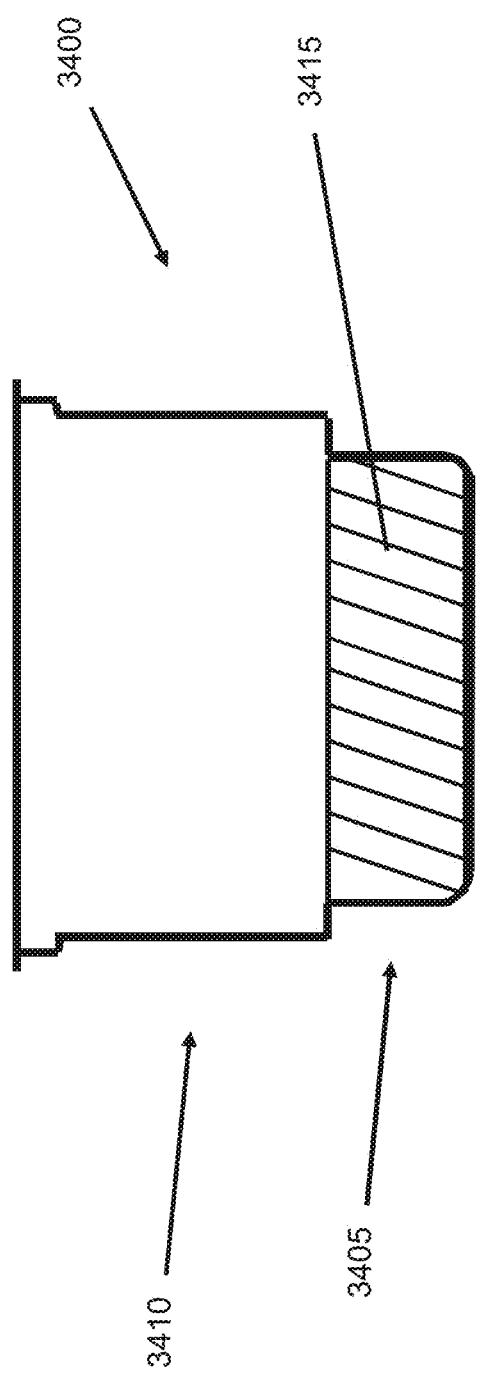
FIG. 34 illustrates a side cross-sectional view of a receptacle, according to some embodiments.

FIG. 34 shows a cross-sectional side view of a receptacle 3400 with a first straight sidewall section 3405 and a second straight sidewall section 3410. First sidewall section 3405 has a smaller diameter than second sidewall section 3410 such that when the frozen content 3415 is displaced, e.g., by an outlet perforator, a flow path through the receptacle is created. A platform with a raised lip, such as the embodiment shown in FIG. 31, can be used with receptacle 3400 to assist in displacing the frozen contents from the first sidewall section 3405 as described in more detail above. In such an embodiment, the raised lip of the platform can conform to the lower straight sidewall section 3405, or the raised lip of the platform can be displaced from the inner surface of the sidewall.

The following non-limiting examples are provided for illustrative purposes only. Other receptacle sizes and other frozen liquid contents remain within the scope of the invention.

EXAMPLE 1

Coffee Beverage

In one embodiment of the invention, a filterless single chamber mixing receptacle contains a frozen liquid contents. The receptacle has a profile similar to that shown in FIG. 32 and has a height of about 1.72 inches, a Top ID of about 1.80 inches, a draft angle of about 5 degrees, and a Bottom ID of about 1.45 inches. The receptacle is sealed on top with a perforable layer and the end layer is perforable (e.g., by a dispenser/brewer needle, such as, but not limited to, the needles described above). The frozen liquid contents is a concentrated coffee extract that is in contact with substantially the entire end layer and a portion of the sidewalls.

In order to produce a final coffee beverage product having a TDS of between 1.15% and about 1.35% TDS (with an optional target of 1.25% TDS), the frozen liquid contents, at 15° F., is melted and diluted with eight ounces of water at 195° F. Table 1 shows several alternative implementations of the frozen liquid contents of this embodiment as well as the impact on various parameters of varying the amount of frozen liquid contents and degree of concentration of the contents.

TABLE 1

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 0.3 | 0.18 | 0.13 | 1.57 | 91 | 57 | 67 | 188 |
| 0.5 | 0.30 | 0.25 | 1.45 | 85 | 35 | 41 | 183 |
| 0.7 | 0.42 | 0.37 | 1.33 | 79 | 25 | 29 | 178 |

TABLE 1-continued

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 0.9 | 0.54 | 0.49 | 1.21 | 73 | 20 | 24 | 175 |
| 1.5 | 0.90 | 0.81 | 0.89 | 56 | 12 | 14 | 162 |
| 2.0 | 1.20 | 1.07 | 0.63 | 41 | 10 | 12 | 153 |
| 2.9 | 1.74 | 1.49 | 0.21 | 14 | 7 | 8 | 137 |

As shown in Table 1, in order to keep the coffee beverage temperature above 140° F. (e.g., to accommodate the addition of milk or cream while maintaining a beverage temperature above 120° F.), the frozen liquid contents weight is between about 0.15 and about 1.2 ounces at a degree of concentration of between about 60% TDS and about 8% TDS (where smaller contents require higher concentration). When included in the receptacle, the length of the empty space above the frozen liquid contents and below the top layer (i.e., headspace) is between about 0.6 and about 1.6 inches, which yields an empty space volume of between about 41% and about 91%.

Applicants have discovered that maintaining a frozen liquid contents height of about 0.5 inches or less from the end layer of the receptacle increases the ease of release of the contents from the end layer. Thus the contents can be further restricted to a height of between about 0.5 and about 0.1 inches, thereby having a corresponding degree of concentration of between about 60% and about 20% TDS. Doing so increases the headspace and empty volume relative to the previous example, which is expected to improve melting and mixing given the increased ratio of water in the mixing chamber relative to the frozen liquid contents.

It may be desired to limit the range of degree of concentration of the frozen liquid contents to no more than 35% TDS. For example, to conserve energy, as creating relatively frozen liquid contents with higher degrees of concentration consume more energy to produce than those with relatively lower degrees of concentration and may require secondary processing such as by reverse osmosis removal of water during the extraction process. In such a case, the frozen liquid contents possesses a weight of about 0.30 to about 0.5 ounces, leaving a headspace of between about 1.2 and about 1.45 inches with an empty volume of about 73% to about 85%.

EXAMPLE 2

Espresso Beverage

In another embodiment of the invention, a filterless single chamber mixing receptacle contains a frozen liquid contents. The receptacle has a profile and dimensions that are the same as the one described in Example 1. In this example, the frozen liquid contents is also a concentrated coffee extract that is in contact with substantially the entire end layer and a portion of the sidewalls.

In order to produce a final espresso beverage product having a TDS of between about 9.15% and about 9.35% TDS (with an optional target of about 9.25% TDS), the frozen liquid contents, at 15° F., is melted and diluted with sufficient water at 195° F. to yield a dispensed volume of four ounces (sometimes described as a double espresso). Table 2 shows several alternative implementations of the frozen liquid contents of this embodiment as well as the impact on various parameters of varying the amount of frozen liquid contents and degree of concentration of the contents.

TABLE 2

| Contents Volume (in³) | Contents Weight (oz) | Contents Height Above End Layer (in) | Empty Space Above Contents (in) | Empty Space In Receptacle Volume (%) | Contents TDS (%) | Contents Brix (°Bx) | Final Product Temperature (° F.) |
|---|---|---|---|---|---|---|---|
| 1.0 | 0.64 | 0.54 | 1.16 | 70 | 58 | 68 | 145 |
| 1.1 | 0.70 | 0.60 | 1.10 | 67 | 53 | 62 | 140 |
| 1.2 | 0.76 | 0.65 | 1.05 | 64 | 48 | 56 | 134 |
| 1.3 | 0.83 | 0.71 | 0.99 | 61 | 45 | 53 | 128 |

Similar results can be obtained by using other receptacle designs disclosed herein with the various implementations of the frozen liquid contents set forth in the Tables 1 and 2 and as described in the accompanying descriptions above. Thus, the scope of the invention is not limited to the use of the specific implementations of frozen liquid contents in the receptacles with the profile as shown in FIG. 32.

As discussed throughout the description, embodiments of the invention provide many benefits. For example, because the receptacles are single chamber mixing vessels, the receptacles do not retain filter material, spent coffee grinds, used tea leaves, or other materials that prevent the receptacles from being easily recycled as a single stream. Moreover, by providing a frozen liquid contents that is created by an extraction process, the byproducts, such as coffee grinds, are maintained at a central facility, which can be more readily recycled or reused (such as a source of biomass energy and/or sustainable soil nutrients.) Further still, a much greater variety of final products can be supported through the use of frozen liquid contents, as described in more detail above. Thus, it is understood that frozen liquid contents having higher or lower TDS values than those given in the illustrative examples above are within the scope of the invention. Further examples include TDS values between 0.5% TDS and 68% TDS, including ranges of 1% TDS to 68% TDS, 2% TDS to 68% TDS, 3% TDS to 68% TDS, 4% TDS to 68% TDS, and 5% TDS to 68% TDS.

Aspects of the techniques and systems related to producing a food or a beverage at a desired temperature and a desired volume and in an automated fashion as disclosed herein may be implemented as a computer program product for use with a computer system or computerized electronic device. Such implementations may include a series of computer instructions, or logic, fixed either on a tangible/non-transitory medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein.

What is claimed is:

1. A receptacle comprising:
    a sidewall extending from a first end of the receptacle to a second end of the receptacle;
    an end layer disposed at the first end of the receptacle;
    a closure disposed at the second end of the receptacle, the sidewall, the end layer, and the closure defining a sealed cavity of the receptacle, wherein the sealed cavity is filterless;
    a frozen content disposed in the sealed cavity of the receptacle; and
    a movable platform disposed in the sealed cavity of the receptacle and in contact with at least a portion of the frozen content proximate to the end layer.

2. The receptacle of claim 1, wherein at least a portion of the sidewall is tapered.

3. The receptacle of claim 1, wherein at least a portion of the sidewall is straight.

4. The receptacle of claim 1, wherein the sidewall has a plurality of straight sidewall sections.

5. The receptacle of claim 1, wherein the end layer is a continuous layer.

6. The receptacle of claim 1, wherein the frozen content is a frozen liquid content.

7. The receptacle of claim 1, the sealed cavity consisting essentially of a single chamber.

8. The receptacle of claim 1, wherein the moveable platform is disposed between the frozen content and the end layer.

9. The receptacle of claim 1, wherein the moveable platform comprises a substantially flat disc.

10. The receptacle of claim 1, wherein at least a portion of the sidewall and at least a portion of the movable platform have an interference fit.

11. The receptacle of claim 1, wherein the end layer defines a depression and wherein at least a portion of the moveable platform is disposed in the depression.

12. The receptacle of claim 11, wherein at least a portion of the end layer defining the depression and at least a portion of the moveable platform have an interference fit.

13. The receptacle of claim 11, wherein the depression is defined by a dome-shaped portion of the end layer, and wherein the portion of the movable platform disposed in the depression has a dome shape that conforms to the dome-shaped portion of the end layer.

14. The receptacle of claim 13, wherein the dome-shaped portion of the end layer has a first stable position that extends away from the sealed cavity and a second stable position that extends into the sealed cavity.

15. The receptacle of claim 1, wherein the end layer comprises a protrusion that extends into the sealed cavity and wherein the moveable platform defines an opening, and wherein the protrusion extends into the opening of the movable platform.

16. The receptacle of claim 15, wherein at least a portion of the protrusion of the end layer extending into the opening of the moveable platform and at least a portion of the moveable platform have an interference fit.

17. The receptacle of claim 1, wherein the movable platform has a periphery and at least a portion of the movable platform proximate to the periphery is joined to an inner surface of the end layer, and wherein the receptacle includes an indication external to the sealed cavity indicating the position of the joint between the end layer and the movable platform.

18. The receptacle of claim 1, wherein the movable platform has a periphery and the movable platform comprises an upturned lip portion around the periphery of the moveable platform.

19. The receptacle of claim 18, wherein at least a portion of the sidewall and at least a portion of the upturned lip have an interference fit.

20. The receptacle of claim 18, wherein the upturned lip portion conforms to at least a portion of the sidewall.

21. The receptacle of claim 1, wherein the moveable platform comprises a substantially flat disc and the moveable platform is disposed between the frozen content and the end layer, and further wherein the frozen content contacts at least a portion of the sidewall proximate to the first end of the receptacle.

22. The receptacle of claim 21, the side wall comprising a coating on at least a portion of an inner surface of the receptacle, the coating reducing adhesion of the frozen content to the inner surface of the receptacle relative to an uncoated surface.

23. The receptacle of claim 1, the sidewall, the end layer, the closure, and the movable platform consisting essentially of a same material.

24. The receptacle of claim 23, wherein the material is aluminum coated with at least one of polypropylene and polyethylene.

25. The receptacle of claim 23, wherein the material is a polymer.

26. The receptacle of claim 1, the sidewall, the end layer, and the closure consisting essentially of a first material and the movable platform consisting essentially of a second material.

27. The receptacle of claim 26, wherein the first material is aluminum coated with at least one of polypropylene and polyethylene and the second material is a polymer.

28. The receptacle of claim 1, the movable platform comprising a plurality of protrusions extending into the frozen content.

* * * * *